US012375699B2

(12) United States Patent
Dinh et al.

(10) Patent No.: US 12,375,699 B2
(45) Date of Patent: Jul. 29, 2025

(54) ARTIFICIAL INTELLIGENCE-BASED IMAGE ENCODING APPARATUS AND METHOD AND DECODING APPARATUS AND METHOD

(71) Applicant: SAMSUNG ELECTRONICS CO., LTD., Suwon-si (KR)

(72) Inventors: Quockhanh Dinh, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 280 days.

(21) Appl. No.: 17/882,293

(22) Filed: Aug. 5, 2022

(65) Prior Publication Data
US 2023/0041187 A1    Feb. 9, 2023

Related U.S. Application Data

(63) Continuation of application No. PCT/KR2022/011070, filed on Jul. 27, 2022.

(30) Foreign Application Priority Data

Aug. 6, 2021   (KR) .................. 10-2021-0104201
Dec. 27, 2021  (KR) .................. 10-2021-0188870

(51) Int. Cl.
H04N 19/436    (2014.01)
G06N 3/045     (2023.01)
(Continued)

(52) U.S. Cl.
CPC .......... *H04N 19/436* (2014.11); *G06N 3/045* (2023.01); *G06N 3/08* (2013.01); *H04N 19/124* (2014.11);
(Continued)

(58) Field of Classification Search
CPC ...... G06N 3/044; G06N 3/045; G06N 3/0455; G06N 3/0464; G06N 3/048; G06N 3/08;
(Continued)

(56) References Cited

U.S. PATENT DOCUMENTS

2014/0192877 A1    7/2014  Xu et al.
2014/0211846 A1*   7/2014  Xu ....................... H04N 19/176
                                                375/240.02
(Continued)

FOREIGN PATENT DOCUMENTS

CN    109842799 B        6/2019
KR    10-2020-0101863 A  8/2020
(Continued)

OTHER PUBLICATIONS

Communication dated Oct. 28, 2022, issued by the International Searching Authority in counterpart International Application No. PCT/KR2022/011070 (PCT/ISA/220, 210, 237).
(Continued)

*Primary Examiner* — Dakshesh D Parikh
(74) *Attorney, Agent, or Firm* — Sughrue Mion, PLLC

(57)  ABSTRACT

A method of decoding an image based on cross-channel prediction using artificial intelligence (AI) includes obtaining cross-channel prediction information by applying feature data for cross-channel prediction to a neural-network-based cross-channel decoder, obtaining a predicted image of a chroma image by performing cross-channel prediction based on a reconstructed luma image and the cross-channel prediction information, obtaining a residual image of the chroma image by applying feature data of the chroma image to a neural-network-based chroma residual decoder, and reconstructing the chroma image based on the predicted image and the residual image.

14 Claims, 31 Drawing Sheets

(51) Int. Cl.
*G06N 3/08* (2023.01)
*H04N 19/124* (2014.01)
*H04N 19/13* (2014.01)
*H04N 19/136* (2014.01)
*H04N 19/186* (2014.01)
*H04N 19/30* (2014.01)
*H04N 19/50* (2014.01)

(52) U.S. Cl.
CPC .......... *H04N 19/13* (2014.11); *H04N 19/136* (2014.11); *H04N 19/186* (2014.11); *H04N 19/30* (2014.11); *H04N 19/50* (2014.11)

(58) Field of Classification Search
CPC ........ G06N 3/088; G06T 9/00; H04N 19/105; H04N 19/124; H04N 19/13; H04N 19/136; H04N 19/146; H04N 19/186; H04N 19/30; H04N 19/436; H04N 19/50; H04N 19/593
See application file for complete search history.

(56) References Cited

U.S. PATENT DOCUMENTS

| | | | |
|---|---|---|---|
| 2015/0124875 A1* | 5/2015 | Xu | H04N 19/573 375/240.12 |
| 2019/0098294 A1 | 3/2019 | Xu et al. | |
| 2020/0236349 A1* | 7/2020 | Zhai | H04N 19/61 |
| 2020/0267388 A1 | 8/2020 | Lainema | |
| 2022/0191523 A1* | 6/2022 | Egilmez | H04N 19/50 |
| 2022/0272355 A1* | 8/2022 | Singh | H04N 19/186 |
| 2023/0388512 A1 | 11/2023 | Jang et al. | |

FOREIGN PATENT DOCUMENTS

| | | |
|---|---|---|
| WO | 2014/000154 A1 | 1/2014 |
| WO | 2020/185047 A1 | 9/2020 |

OTHER PUBLICATIONS

Li et al., "Neural-Network-Based Cross-Channel Intra Prediction," ACM Transactions on Multimedia Computing, Communications, and Applications, vol. 17, No. 3, Article 77, Jul. 2021, Total 24 pages, https://doi.org/10.1145/3434250.

Liu et al. "Deep Learning-Based Video Coding: A Review and a Case Study," arXiv:1904.12462v1 [cs.MM], Apr. 2019, Total 35 pages.

Marc Górriz Blanch et al., "Attention-Based Neural Networks for Chroma Intra Prediction in Video Coding", Journal of Selected Topics in Signal Processing, Oct. 2020, 12 pages, arXiv:2102.04993v1 [eess.IV] (Feb. 9, 2021), DOI: 10.1109/JSTSP.2020.3044482, XP081878114.

M. Akin Yilmaz et al., "End-to-End Rate-Distortion Optimization for Bi-Directional Learned Video Compression", 2020 IEEE International Conference on Image Processing (ICIP), Oct. 25, 2020, pp. 1311-1315, DOI: 10.1109/ICIP40778.2020.9190881, XP033868936.

Linwei Zhu et al., "Deep Learning-Based Chroma Prediction for Intra Versatile Video Coding", IEEE Transactions on Circuits and Systems for Video Technology, vol. 31, No. 8, Aug. 2021 (published Nov. 3, 2020), pp. 3168-3181, DOI: 10.1109/TCSVT.2020.3035356, XP011870243.

Hilmi E. Egilmez et al. from Qualcomm Incorporated, "A DNN Architecture for Intra-Frame Coding in YUV 4:2:0 format with Cross-Component Prediction", Joint Video Experts Team (JVET) of ITU-T SG 16 WP 3 and ISO/IEC JTC 1/SC 29, 21st Meeting, by teleconference, Jan. 6-15, 2021, Document: JVET-U0079-v2, Dec. 31, 2020, 8 pages, XP030293187.

"Test Model 7 of Versatile Video Coding (VTM 7)", Approved WG 11 document, MPEG 128th Meeting: Geneva, Oct. 7-11, 2019, ISO/IEC JTC 1/SC 29/WG 11 (Coding of moving pictures and audio), N18874, Oct. 11, 2019 (published Jan. 14, 2020), 91 pages, XP030225574.

Guo Lu et al., "An End-to-End Learning Framework for Video Compression", IEEE Transactions on Pattern Analysis and Machine Intelligence, vol. 43, No. 10, Oct. 2021 (published Apr. 20, 2020), pp. 3292-3308, DOI: 10.1109/TPAMI.2020.2988453, XP011875084.

Communication issued on Jul. 23, 2024 by the European Patent Office for European Patent Application No. 22853344.4.

Eirikur Agustsson et al., "Scale-space flow for end-to-end optimized video compression", Computer Vision Foundation, CVF, Jun. 16, 2020, 10 pages total.

\* cited by examiner

ARTIFICIAL INTELLIGENCE-BASED IMAGE ENCODING APPARATUS AND METHOD AND DECODING APPARATUS AND METHOD

CROSS-REFERENCE TO RELATED APPLICATIONS

This application is a Continuation Application of International Application PCT/KR2022/011070 filed on Jul. 27, 2022, which claims benefit of Korean Patent Application No. 10-2021-0104201 filed on Aug. 6, 2021, and Korean Patent Application No. 10-2021-0188870 filed on Dec. 27, 2021, at the Korean Intellectual Property Office, the disclosures of which are incorporated herein in their entireties by reference.

TECHNICAL FIELD

The disclosure relates to image encoding and decoding. More specifically, the disclosure relates to a technique for encoding and decoding feature data required for cross-channel prediction of an image by using artificial intelligence (AI), e.g., a neural network, and a technique for encoding and decoding the image.

BACKGROUND ART

Codecs such as H.264 Advanced Video Coding (AVC) and High Efficiency Video Coding (HEVC) may divide an image into blocks and predictively encode and decode each block through inter prediction or intra prediction.

Intra prediction is a method of compressing an image by removing spatial redundancy in the image, and inter prediction is a method of compressing an image by removing temporal redundancy between images.

As a representative example of intra prediction, there is a prediction method of a chroma signal using a cross-component linear model (CCLM). The prediction method of the chroma signal using the CCLM improves encoding prediction performance by removing redundancy that exists between a signal and the chroma signal.

More specifically, the prediction method of the chroma signal using the CCLM predicts the chroma signal through a linear model that calculates correlation between a sample of the chroma signal and a sample of a luma component reconstructed at the same position as the sample of the chroma signal.

As a detailed example of the prediction method of the chroma signal using the CCLM, there is a prediction method of a chroma signal using a multi-directional linear model (MDLM). The prediction method of the chroma signal using the MDLM may support a mode using top and left nearby samples (LM_CCLM), the top nearby sample (T_CCLM), or the left nearby sample (L_CCLM), when inducing a coefficient of the linear model.

SUMMARY

Image encoding and decoding apparatuses and methods according to embodiments of the disclosure enable signaling of an image with a low bitrate through cross-channel prediction.

In addition, image encoding and decoding apparatuses and methods according to embodiments of the disclosure accurately predict and reconstruct a chroma image through cross-channel prediction.

Moreover, image encoding and decoding apparatuses and methods according to embodiments of the disclosure accurately reconstruct an image from a bitstream with a low bitrate.

A method of decoding an image based on cross-channel prediction using artificial intelligence (AI) according to an embodiment of the disclosure includes obtaining feature data for cross-channel prediction from a bitstream, obtaining feature data of a luma image in a current image and feature data of a chroma image in the current image, from the bitstream, reconstructing the luma image by applying the feature data of the luma image to a neural-network-based luma decoder, obtaining cross-channel prediction information by applying the feature data for cross-channel prediction to a neural-network-based cross-channel decoder, obtaining a predicted image of the chroma image by performing cross-channel prediction based on the reconstructed luma image and the cross-channel prediction information, obtaining a residual image of the chroma image by applying the feature data of the chroma image to a neural-network-based chroma residual decoder, and reconstructing the chroma image based on the predicted image and the residual image.

At least one of the feature data for cross-channel prediction, the feature data of the luma image, or the feature data of the chroma image may be obtained through entropy-decoding and inverse-quantization on the bitstream.

The neural-network-based cross-channel decoder may be trained based on first loss information corresponding to a difference between a current training chroma image and a current reconstructed training chroma image corresponding to the current training chroma image, and second loss information corresponding to entropy of the feature data for cross-channel prediction of the current training chroma image.

The method may further include performing down-sampling on the reconstructed luma image when a chroma sub-sampling format of the current image is not YUV (YCbCr) 4:4:4, wherein the obtaining of the predicted image of the chroma image includes obtaining a predicted image of the chroma image by performing cross-channel prediction based on the down-sampled luma image and the cross-channel prediction information.

The method may further include generating multi-channel luma image data by performing space-to-depth transformation on the reconstructed luma image when the chroma sub-sampling format of the current image is not YCbCr 4:4:4, wherein the obtaining of the predicted image of the chroma image includes obtaining a predicted image of the chroma image by performing cross-channel prediction based on the multi-channel luma image and the cross-channel prediction information.

The luma image may include an image of a Y component, and the chroma image may include an image of at least one of a Cb component or a Cr component.

The obtaining of the cross-channel prediction information by applying the feature data for cross-channel prediction to the neural-network-based cross-channel decoder may include obtaining the cross-channel prediction information by applying the feature data for cross-channel prediction and the feature data of the luma image to the neural-network-based cross-channel decoder.

The obtaining of the residual image of the chroma image by applying the feature data of the chroma image to the neural-network-based chroma residual decoder may include obtaining the residual image of the chroma image by further applying at least one of the feature data of the luma image or the feature data for cross-channel prediction to the neural-network-based chroma residual decoder.

The cross-channel prediction information may include information about a scale parameter and information about a bias parameter.

A computer-readable recording medium according to an embodiment of the disclosure has recorded thereon a program for executing the method of decoding an image on a computer.

An apparatus for decoding an image based on cross-channel prediction using artificial intelligence (AI) according to an embodiment of the disclosure includes an obtainer configured to obtain feature data for cross-channel prediction from a bitstream and obtain feature data of a luma image in a current image and feature data of a chroma image in the current image, from the bitstream, and an image decoder configured to reconstruct the luma image by applying the feature data of the luma image to a neural-network-based luma decoder, obtain cross-channel prediction information by applying the feature data for cross-channel prediction to a neural-network-based cross-channel decoder and obtain a predicted image of the chroma image by performing cross-channel prediction based on the reconstructed luma image and the cross-channel prediction information, obtain a residual image of the chroma image by applying the feature data of the chroma image to a neural-network-based chroma residual decoder, and reconstruct the chroma image based on the predicted image of the chroma image and the residual image of the chroma image.

A method of encoding an image based on cross-channel prediction using artificial intelligence (AI) according to an embodiment of the disclosure includes obtaining feature data of a luma image in a current image by applying an original luma image in a current original image to a neural-network-based luma encoder and reconstructing the luma image by applying the feature data of the luma image to a neural-network-based luma decoder, obtaining feature data for cross-channel prediction by applying the reconstructed luma image and an original chroma image in the current original image to a neural-network-based cross-channel encoder, obtaining cross-channel prediction information by applying the obtained feature data for cross-channel prediction to a neural-network-based cross-channel decoder, obtaining a predicted image of the chroma image by performing cross-channel prediction based on the reconstructed luma image and the cross-channel prediction information, obtaining feature data of the chroma image by applying a residual image of the chroma image obtained based on the original chroma image and the predicted image of the chroma image to a neural-network-based chroma residual encoder, and generating a bitstream comprising the feature data of the luma image, the feature data of the chroma image, and the feature data for cross-channel prediction.

At least one of the feature data for cross-channel prediction, the feature data of the luma image, or the feature data of the chroma image may be quantized and entropy-encoded.

The neural-network-based cross-channel encoder may be trained based on first loss information corresponding to a difference between a current training chroma image and a current reconstructed training chroma image corresponding to the current training chroma image and second loss information corresponding to entropy of the feature data for cross-channel prediction of the current training chroma image.

The method may further include performing down-sampling on the reconstructed luma image when a chroma sub-sampling format of the current image is not YCbCr 4:4:4, wherein the obtaining of the predicted image of the chroma image includes obtaining a predicted image of the chroma image by performing cross-channel prediction based on the down-sampled luma image and the cross-channel prediction information.

The method may further include generating multi-channel luma image data by performing space-to-depth transformation on the reconstructed luma image when the chroma sub-sampling format of the current image is not YCbCr 4:4:4, wherein the obtaining of the predicted image of the chroma image includes obtaining a predicted image of the chroma image by performing cross-channel prediction based on the multi-channel luma image and the cross-channel prediction information.

The obtaining of the cross-channel prediction information by applying the feature data for cross-channel prediction to the neural-network-based cross-channel decoder may include obtaining the cross-channel prediction information by applying the feature data for cross-channel prediction and the feature data of the luma image to the neural-network-based cross-channel decoder.

The method may further include obtaining the residual image of the chroma image by applying the feature data of the chroma image to the neural-network-based chroma residual decoder, wherein the obtaining of the residual image of the chroma image by applying the feature data of the chroma image to the neural-network-based chroma residual decoder includes obtaining the residual image of the chroma image by further applying at least one of the feature data of the luma image or the feature data for cross-channel prediction to the neural-network-based chroma residual decoder.

An apparatus for encoding an image based on cross-channel prediction using artificial intelligence (AI) according to an embodiment of the disclosure includes an encoder configured to obtain feature data of a luma image in a current image by applying an original luma image in a current original image to a neural-network-based luma encoder and reconstruct the luma image by applying the feature data of the luma image to a neural-network-based luma decoder, obtain feature data for cross-channel prediction by applying the reconstructed luma image and an original chroma image in the current original image to a neural-network-based cross-channel encoder, obtain cross-channel prediction information by applying the obtained feature data for cross-channel prediction to a neural-network-based cross-channel decoder, obtain a predicted image of the chroma image by performing cross-channel prediction based on the reconstructed luma image and the cross-channel prediction information, and obtain feature data of the chroma image by applying a residual image of the chroma image obtained based on the original chroma image and the predicted image of the chroma image to a neural-network-based chroma residual encoder, and a bitstream generator configured to generate a bitstream comprising the feature data of the luma image, the feature data of the chroma image, and the feature data for cross-channel prediction.

A method of reconstructing an image based on cross-channel prediction using artificial intelligence (AI) according to an embodiment of the disclosure includes obtaining feature data for cross-channel prediction from a bitstream, obtaining feature data of a luma residual image in a current image and feature data of a chroma residual image in the current image, from the bitstream, reconstructing the luma residual image by applying the feature data of the luma residual image to a neural-network-based luma residual decoder, obtaining cross-channel prediction information by applying the feature data for cross-channel prediction to a neural-network-based cross-channel decoder, obtaining a predicted image of the chroma residual image by performing cross-channel prediction based on the reconstructed luma residual image and the cross-channel prediction information, obtaining a residual image of the chroma residual image by applying the feature data of the chroma residual image to a neural-network-based chroma residual decoder, and reconstructing the chroma residual image based on the predicted image of the chroma residual image and the residual image of the chroma residual image.

A method of encoding an image based on cross-channel prediction using artificial intelligence (AI) according to an embodiment of the disclosure includes obtaining feature data of a luma residual image by applying the luma residual image in a current image to a neural-network-based luma residual encoder and reconstructing the luma residual image by applying the feature data of the luma residual image to a neural-network-based luma residual decoder, obtaining feature data for cross-channel prediction by applying the reconstructed luma residual image and a chroma residual image in the current image to a neural-network-based cross-channel encoder, obtaining cross-channel prediction information by applying the obtained feature data for cross-channel prediction to a neural-network-based cross-channel decoder, obtaining a predicted image of the chroma residual image by performing cross-channel prediction based on the reconstructed luma residual image and the cross-channel prediction information, obtaining the feature data of the chroma residual image by applying the chroma residual image obtained based on the residual image of the chroma residual image and the predicted image of the chroma residual image to a neural-network-based chroma residual encoder, and generating a bitstream including the feature data of the luma residual image, the feature data of the chroma residual image, and the feature data for cross-channel prediction.

Image encoding and decoding apparatuses and methods according to embodiments of the disclosure according to an embodiment of the disclosure may enable signaling of an image with a low bitrate through cross-channel prediction.

Moreover, Image encoding and decoding apparatuses and methods according to embodiments of the disclosure according to an embodiment of the disclosure may accurately reconstruct an image from a bitstream with a low bitrate.

DETAILED DESCRIPTION

Figure 1:
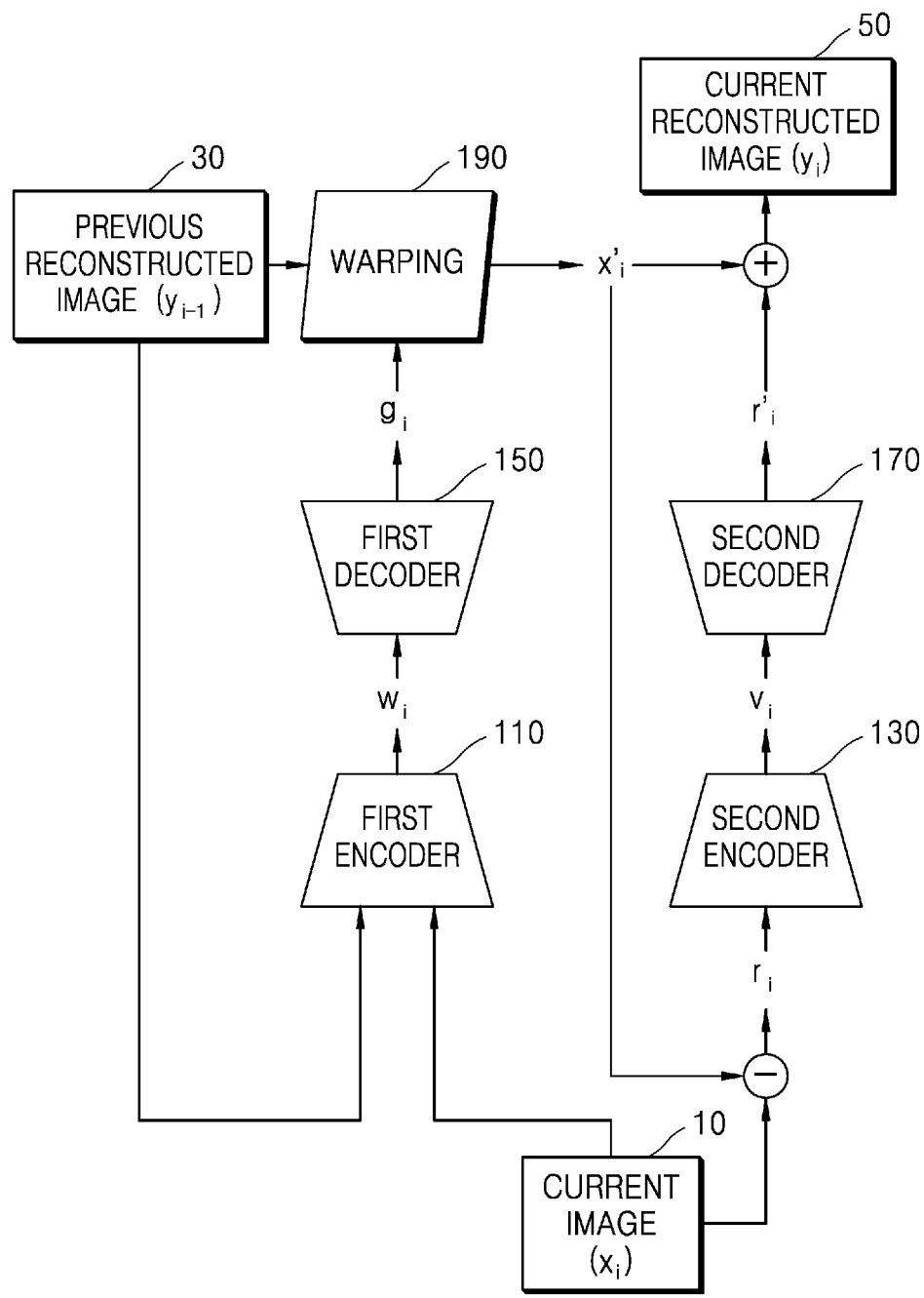
FIG. 1 is a diagram showing an artificial intelligence (AI)-based inter prediction process with respect to an image that is a motif for an AI-based cross-channel prediction process with respect to an image.

Throughout the disclosure, the expression "at least one of a, b or c" indicates only a, only b, only c, both a and b, both a and c, both b and c, all of a, b, and c, or variations thereof.

While embodiments of the disclosure are susceptible to various modifications and alternative forms, specific embodiments thereof are shown by way of example in the drawings and will herein be described in detail. It should be understood, however, that there is no intent to limit embodiments of the disclosure to the particular forms disclosed, but conversely, embodiments of the disclosure are to cover all modifications, equivalents, and alternatives falling within the scope of the disclosure.

In the following description of the disclosure, a detailed description of known functions and configurations incorporated herein will be omitted when it may make the subject matter of the disclosure unclear. Moreover, a number (e.g., a first, a second, etc.) used in a process of describing the present specification is merely an identification symbol for distinguishing one component from another component.

Moreover, herein, when a component is mentioned as being "connected" or "coupled" to another component, it may be directly connected or directly coupled to the another component, but unless described otherwise, it should be understood that the component may also be connected or coupled to the another component via still another component therebetween.

In the disclosure, two or more elements expressed as "units", "modules", or the like may be combined into one element, or one element may be divided into two or more elements for subdivided functions. Each element described herein may not only perform main functions thereof but also additionally perform some or all functions of other elements, and some main functions of each element may be exclusively performed by another element.

As used herein, the term "image" may refer to a still image (or frame), a moving image including a plurality of consecutive still images, or a video.

A "neural network" in the present specification is a representative example of an artificial neural network model that mimics brain nerves, and is not limited to an artificial neural network model using a specific algorithm. The neural network may also be referred to as a deep neural network.

In the present specification, "parameters" are values used for calculation at each layer included in the neural network, and may be used, for example, to apply input values to a certain operation formula. The parameters are values set as a result of training, and may be updated based on separate training data when necessary.

In the present specification, "feature data" refers to data obtained by processing input data by a neural-network-based encoder. The feature data may be 1-dimensional or 2-dimensional data including a plurality of samples. The feature data may be referred to as a latent vector or latent representation. The feature data represents latent features of data output by a decoder described below.

'Feature data for cross-channel prediction' may indicate a scale parameter value and a bias parameter value for cross-channel prediction. Herein, the scale parameter value may be a value on which a multiplication operation is performed for each element with a sample value of a reconstructed luma image, and the bias parameter value may be a value obtained by performing an addition operation for each element on a result obtained by performing a multiplication operation for each element on the scale parameter and a sample value of the reconstructed luma image. The 'feature data for cross-channel prediction' may be referred to as a 'cross-channel flow'.

The 'cross-channel flow' may be a concept corresponding to the optical flow of FIG. 1 having a motion vector for each pixel.

Position differences (motion vectors) between blocks or samples in the current image and reference blocks or reference samples in a previous reconstructed image may be used to encode and decode the current image. These position differences may be referred to as an optical flow. The optical flow may be defined as a set of motion vectors corresponding to samples or blocks in an image.

Similarly with the optical flow, the cross-channel flow may be defined as a set including parameters of a linear model for transforming a sample of a luma component into a sample of a chroma component. In this case, the parameters of the linear model may include scales and biases. Based on the cross-channel flow, a chroma channel (samples of a chroma component) may be predicted from a luma channel (samples of a luma component).

In the present specification, "samples" correspond to data assigned to sampling positions in an image or feature data, and refer to data to be processed. For example, the samples may include samples in a 2-dimensional image.

FIG. 1 illustrates an artificial intelligence (AI)-based inter prediction process with respect to an image that is a motif for an AI-based cross-channel prediction process with respect to an image.

FIG. 1 shows a process of encoding and decoding a current image $x_i$, and a first encoder 110, a second encoder 130, a first decoder 150, and a second decoder 170 are used for inter prediction. The first encoder 110, the second encoder 130, the first decoder 150, and the second decoder 170 are implemented as neural networks.

Inter prediction is a process of encoding and decoding the current image $x_i$ by using temporal redundancy between the current image $x_i$ and a previous reconstructed image $y_{i-1}$.

Position differences (motion vectors) between blocks or samples in the current image $x_i$ and reference blocks or reference samples in the previous reconstructed image $y_{i-1}$ may be used to encode and decode the current image $x_i$. These position differences may be referred to as an optical flow. The optical flow may be defined as a set of motion vectors corresponding to samples or blocks in an image.

The optical flow represents how positions of samples in the previous reconstructed image $y_{i-1}$ are changed in the current image $x_i$, or where samples of the current image $x_i$ are positioned in the previous reconstructed image $y_{i-1}$. For example, when a sample positioned at (1, 1) in the current image $x_i$ is positioned at (2, 1) in the previous reconstructed image $y_{i-1}$, an optical flow or motion vector of the sample may be calculated as (1(=2−1), 0(=1−1)).

In the image encoding and decoding process using AI, the first encoder 110 and the first decoder 150 are used to obtain a current optical flow $g_i$ of the current image $x_i$.

Specifically, the previous reconstructed image $y_{i-1}$ and the current image $x_i$ are input to the first encoder 110. The first encoder 110 outputs feature data $w_i$ of the current optical flow by processing the current image $x_i$ and the previous reconstructed image $y_{i-1}$ based on parameters set as a result of training.

The feature data $w_i$ of the current optical flow may represent latent features of the current optical flow.

The feature data $w_i$ of the current optical flow is input to the first decoder 150. The first decoder 150 outputs the current optical flow $g_i$ by processing the input feature data $w_i$ based on parameters set as a result of training.

The previous reconstructed image $y_{i-1}$ is warped (see reference numeral 190) based on the current optical flow $g_i$, and a current predicted image $x'_i$ is obtained as the result of the warping 190. The warping 190 is a type of geometric transformation for changing positions of samples in an image. A current predicted image $x'_i$ similar to the current image $x_i$ may be obtained by warping 190 the previous reconstructed image $y_{i-1}$ based on the optical flow $g_i$ representing relative positions between samples in the previous reconstructed image $y_{i-1}$ and samples in the current image $x_i$. For example, when a sample positioned at (1, 1) in the previous reconstructed image $y_{i-1}$ is the most similar to a sample positioned at (2, 1) in the current image $x_i$, the position of the sample positioned at (1, 1) in the previous reconstructed image $y_{i-1}$ may be changed to (2, 1) through the warping 190.

Since the current predicted image $x'_i$ generated using the previous reconstructed image $y_{i-1}$ is not the current image $x_i$ itself, current differential image data $r_i$ corresponding to a difference between the current predicted image $x'_i$ and the current image $x_i$ may be obtained.

For example, the current differential image data $r_i$ may be obtained by subtracting sample values in the current predicted image $x'_i$ from sample values in the current image $x_i$.

The current differential image data $r_i$ is input to the second encoder 130. The second encoder 130 outputs feature data $v_i$ of the current differential image data by processing the current differential image data $r_i$ based on parameters set as a result of training.

The feature data $v_i$ of the current differential image data is input to the second decoder 170. The second decoder 170 outputs current differential image data $r'_i$ by processing the input feature data $v_i$ based on parameters set as a result of training.

A current reconstructed image $y_i$ is obtained by combining the current differential data $r_i$ with the current predicted image $x'_i$ generated by warping 190 the previous reconstructed image $y_{i-1}$.

In the inter prediction process shown in FIG. 1, the feature data $w_i$ of the current optical flow obtained by the first encoder 110 is input to the first decoder 150.

When the encoding and decoding process of the current image $x_i$ is viewed in light of the encoding apparatus, the encoding apparatus has to generate a bitstream corresponding to the feature data $w_i$ of the current optical flow to signal the feature data $w_i$ of the current optical flow to the decoding apparatus. However, when motion of an object included in the current image $x_i$ and a previous image $x_{i-1}$ is large, magnitudes of sample values included in the current optical flow are great, such that a bitrate of the bitstream generated based on the feature data $w_i$ representing latent features of the current optical flow may also be high.

Embodiments of the disclosure described below are embodiments of the disclosure regarding a method of performing cross-channel prediction by using a cross-channel flow corresponding to an optical flow of inter prediction. A detailed description of the cross-channel flow and cross-channel prediction based on the cross-channel flow will be made with reference to FIGS. 10A and 10B, etc.

Figure 2A:
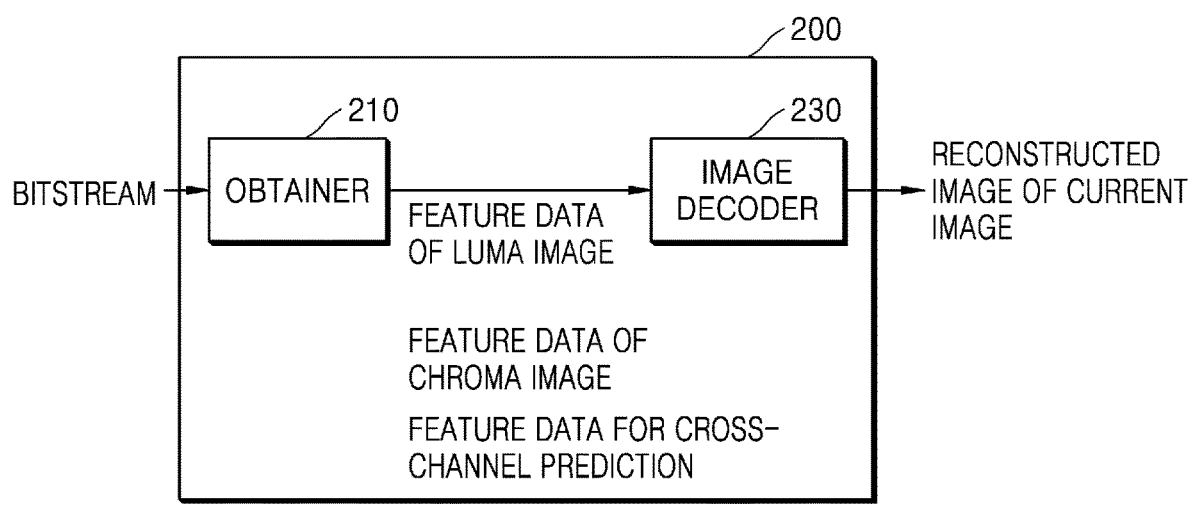
FIG. 2A is a block diagram of an image decoding apparatus according to an embodiment of the disclosure.

FIG. 2A is a block diagram of an image decoding apparatus according to an embodiment of the disclosure.

Referring to FIG. 2A, an image decoding apparatus 200 according to an embodiment of the disclosure includes an obtainer 210 and an image decoder 230.

The obtainer 210 and the image decoder 230 may be implemented as processors, and operate based on instructions stored in a memory (not shown).

Although the obtainer 210 and the image decoder 230 are individually shown in FIG. 2A, the obtainer 210 and the image decoder 230 may be implemented as one processor. In this case, the obtainer 210 and the image decoder 230 may be implemented as a dedicated processor, or a combination of software and a general-purpose processor such as an application processor (AP), a central processing unit (CPU), or a graphics processing unit (GPU). The dedicated processor may include a memory to implement an embodiment of the disclosure, or include a memory processor to use an external memory.

The obtainer 210 and the image decoder 230 may be implemented as a plurality of processors. In this case, the obtainer 310 and the predictive decoder 330 may be implemented as a combination of dedicated processors, or a combination of software and general-purpose processors such as APs, CPUs, or GPUs.

The obtainer 210 obtains a bitstream including a result of encoding a current image.

The obtainer 210 may receive a bitstream from an image encoding apparatus 600 described below, through a network. In an embodiment of the disclosure, the obtainer 210 may obtain a bitstream from a data storage medium including a magnetic medium (e.g., a hard disk, a floppy disk, or magnetic tape), an optical medium (e.g., a compact disc read-only memory (CD-ROM) or a digital versatile disc (DVD)), or a magneto-optical medium (e.g., a floptical disk).

The obtainer 210 may parse the bitstream to obtain feature data of a luma image.

The obtainer 210 may parse the bitstream to obtain feature data of a chroma image. The feature data of the chroma image may include feature data of a residual image of the chroma image. A predicted image of the chroma image may be generated through cross-channel prediction, such that the residual image of the chroma image may be obtained by decoding the feature data of the residual image of the chroma image representing a difference between the original image of the chroma image and the predicted image of the chroma image through cross-channel prediction. A reconstructed image of the chroma image may be generated based on the residual image of the chroma image and the predicted image of the chroma image.

The obtainer 210 may parse the bitstream to obtain feature data for cross-channel prediction. The feature data for cross-channel prediction may include feature data of a cross-channel flow. The cross-channel flow may include a scale parameter and a bias parameter. The scale parameter and the bias parameter may refer to parameters of a linear model for cross-channel prediction.

The feature data of the luma image, the feature data of the chroma image, and the feature data for cross-channel prediction may be obtained as a result of processing performed by a neural-network-based encoder.

In an embodiment of the disclosure, the obtainer 210 may obtain a first bitstream corresponding to the feature data of the luma image, a second bitstream corresponding to the feature data of the chroma image, and a third bitstream corresponding to the feature data for cross-channel prediction. The obtainer 210 may obtain the feature data of the luma image, the feature data of the chroma image, and the feature data for cross-channel prediction by parsing the first bitstream, the second bitstream, and the third bitstream, respectively.

The feature data of the luma image, the feature data of the chroma image, and the feature data for cross-channel prediction are transmitted to the image decoder 230 that may obtain a reconstructed image of the current image by using the feature data of the luma image, the feature data of the chroma image, and the feature data for cross-channel prediction.

The image decoder 230 may obtain a reconstructed image of a current luma image by using the feature data of the luma image.

The image decoder 230 may obtain a predicted image of a current chroma image by using the reconstructed image of the current luma image and the feature data for cross-channel prediction.

The image decoder 230 may obtain a residual image of the current chroma image by using the feature data of the chroma image. The image decoder 230 may obtain a reconstructed image of the current chroma image by using the predicted image of the current chroma image and the residual image of the current chroma image.

The image decoder 230 may obtain a reconstructed image of the current image by using the reconstructed image of the current luma image and the reconstructed image of the current chroma image.

Depending on implementation, the feature data of the residual image data of the current chroma image may not be included in the bitstream. The obtainer 210 may obtain the feature data for cross-channel prediction from the bitstream, and the image decoder 230 may reconstruct the cross-channel flow. In this case, the image decoding apparatus 200 may be referred to as a cross-channel flow decoding apparatus.

A cross-channel flow reconstructed by the image decoder 230 may be transmitted to another device by which the reconstructed image of the current image may be generated based on the cross-channel flow.

More specifically, the other device may generate the reconstructed image of the current chroma image by combining the residual image data of the chroma image obtained from the bitstream with the predicted image of the chroma image generated from the reconstructed image of the current luma image according to the cross-channel flow.

Figure 2B:
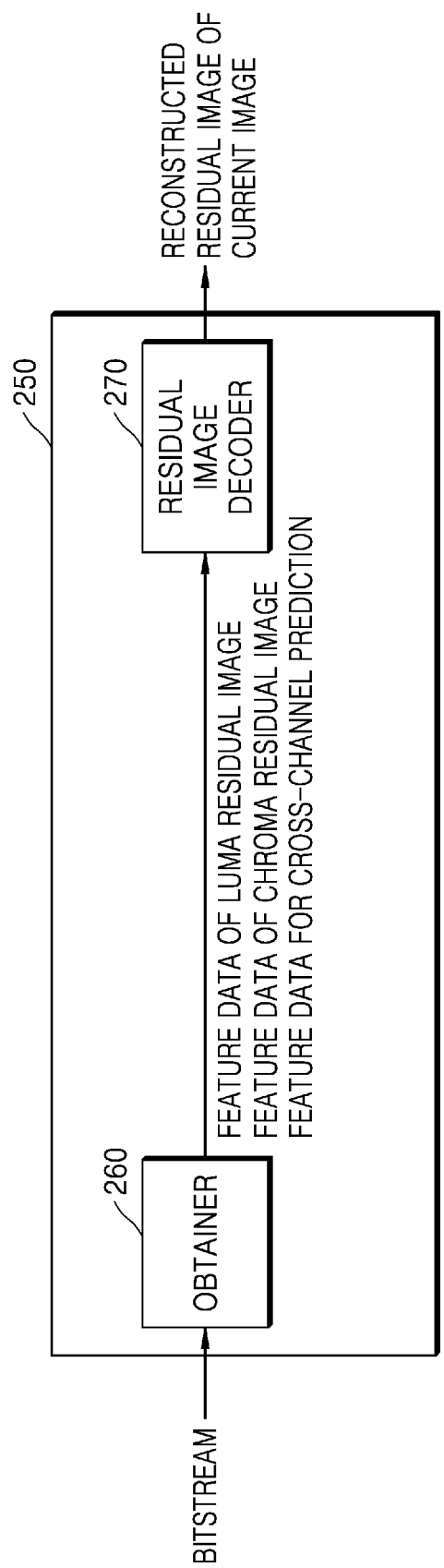
FIG. 2B is a block diagram of an image decoding apparatus according to an embodiment of the disclosure.

FIG. 2B is a block diagram of an image decoding apparatus according to an embodiment of the disclosure.

Referring to FIG. 2B, an image decoding apparatus 250 according to an embodiment of the disclosure includes an obtainer 260 and a residual image decoder 270.

The obtainer 260 and the residual image decoder 270 may be implemented as processors, and operate based on instructions stored in a memory (not shown).

Although the obtainer 260 and the residual image decoder 270 are individually shown in FIG. 2B, the obtainer 260 and the residual image decoder 270 may be implemented as one processor. In this case, the obtainer 260 and the residual image decoder 270 may be implemented as a dedicated processor, or a combination of software and a general-purpose processor such as an AP, a CPU, or a GPU. The dedicated processor may include a memory to implement an embodiment of the disclosure, or include a memory processor to use an external memory.

The obtainer 260 and the residual image decoder 270 may be implemented as a plurality of processors. In this case, the obtainer 260 and the residual image decoder 270 may be implemented as a combination of dedicated processors, or a combination of software and general-purpose processors such as APs, CPUs, or GPUs.

The obtainer 260 obtains a bitstream including a result of encoding a current image.

The obtainer 260 may receive the bitstream from an image encoding apparatus 650 described below, through a network. In an embodiment of the disclosure, the obtainer 260 may obtain a bitstream from a data storage medium including a magnetic medium (e.g., a hard disk, a floppy disk, or magnetic tape), an optical medium (e.g., a CD-ROM or a DVD), or a magneto-optical medium (e.g., a floptical disk).

The obtainer 260 may parse the bitstream to obtain feature data of a luma residual image.

The obtainer 260 may parse the bitstream to obtain feature data of a chroma residual image. The feature data of the chroma residual image may include feature data of a residual image of the chroma residual image.

A predicted image of the chroma residual image may be generated through cross-channel prediction, such that the residual image of the chroma residual image may be obtained by decoding the feature data of the residual image of the chroma residual image representing a difference between the original image of the chroma residual image and the predicted image of the chroma residual image through cross-channel prediction. The reconstructed image of the chroma residual image may be generated based on the residual image of the chroma residual image and the predicted image of the chroma residual image.

The obtainer 260 may parse the bitstream to obtain feature data for cross-channel prediction. The feature data for cross-channel prediction may include feature data of a cross-channel flow. The cross-channel flow may include a scale parameter and a bias parameter.

The feature data of the luma residual image, the feature data of the chroma residual image, and the feature data for cross-channel prediction may be obtained as a result of processing performed by a neural-network-based encoder.

In an embodiment of the disclosure, the obtainer 260 may obtain a first bitstream corresponding to the feature data of the luma residual image, a second bitstream corresponding to the feature data of the chroma residual image, and a third bitstream corresponding to the feature data for cross-channel prediction. The obtainer 260 may obtain the feature data of the luma residual image, the feature data of the chroma residual image, and the feature data for cross-channel prediction by parsing the first bitstream, the second bitstream, and the third bitstream, respectively.

The feature data of the luma residual image, the feature data of the chroma residual image, and the feature data for cross-channel prediction are transmitted to the residual image decoder 270 that may obtain the reconstructed image of the current residual image by using the feature data of the luma residual image, the feature data of the chroma residual image, and the feature data for cross-channel prediction.

The residual image decoder 270 may obtain the reconstructed image of the current luma residual image by using the feature data of the luma residual image.

The residual image decoder 270 may obtain the predicted image of the current chroma residual image by using the reconstructed image of the current luma residual image and the feature data for cross-channel prediction. The residual image decoder 270 may obtain the residual image of the current chroma residual image by using the feature data of the chroma residual image. The residual image decoder 270 may obtain the reconstructed image of the current chroma residual image by using the predicted image of the current chroma residual image and the residual image of the current chroma residual image.

The residual image decoder 270 may obtain a reconstructed residual image of the current image by using the reconstructed image of the current luma residual image and the reconstructed image of the current chroma residual image.

Depending on implementation, the feature data of the residual image data of the current chroma residual image may not be included in the bitstream. The obtainer 260 may obtain the feature data for cross-channel prediction from the bitstream, and the residual image decoder 270 may reconstruct the cross-channel flow. In this case, the image decoding apparatus 250 may be referred to as a cross-channel flow decoding apparatus.

A cross-channel flow reconstructed by the residual image decoder 270 may be transmitted to another device by which the reconstructed image of the current residual image may be generated based on the cross-channel flow.

More specifically, the other device may generate the reconstructed image of the current chroma residual image by combining the residual image data of the chroma residual image obtained from the bitstream with the predicted image of the chroma residual image generated from the reconstructed image of the luma residual reconstructed image according to the cross-channel flow.

The image decoding apparatus 250 may generate the reconstructed image of the current chroma image based on the reconstructed image of the current chroma residual image. The image decoding apparatus 250 may obtain the predicted image of the current chroma image. The predicted image of the current chroma image may be obtained, without being limited to, as described above with reference to the image decoding apparatus 200. For example, the image decoding apparatus 250 may obtain the predicted image of the current chroma image from the reconstructed image of the previous chroma image by using the optical flow described with reference to FIG. 1, when a frame type of the current chroma image is not an I-frame.

Hereinbelow, operations of the obtainer 210 and the image decoders 230 and 270 will be described in detail with reference to FIGS. 3, 4A, and 4B.

Figure 3:
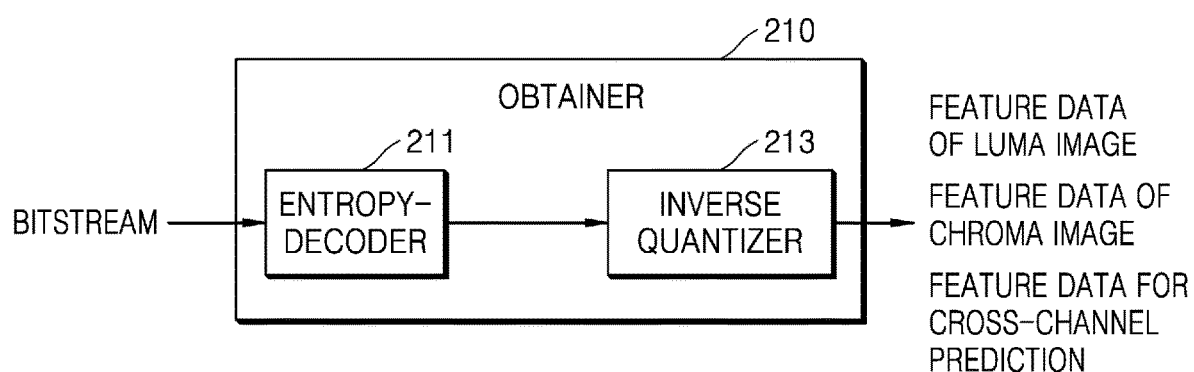
FIG. 3 is a diagram of an obtainer shown in FIG. 2A.

FIG. 3 is a diagram of the obtainer 210 shown in FIG. 2A.

Referring to FIG. 3, the obtainer 210 may include an entropy decoder 211 and an inverse quantizer 213.

The entropy decoder 211 obtains quantized feature data of a luma image, quantized feature data for cross-channel prediction, and quantized feature data of chroma image data, by entropy-coding bins included in a bitstream.

The inverse quantizer 213 obtains the feature data of the luma image, the feature data for cross-channel prediction, and the feature data of the chroma image by inversely quantizing the quantized feature data of the luma image, the quantized feature data for cross-channel prediction, and the quantized feature data of the chroma image, respectively.

Depending on implementation, the obtainer 210 may further include an inverse transformer. The inverse transformer inversely transforms feature data output from the inverse quantizer 213, from a first domain to a second domain. The first domain may be a frequency domain, but the frequency domain is merely an example of the first domain, and the disclosure is not limited thereto. The second domain may be a spatial domain, but the spatial domain is merely an example of the second domain, and the disclosure is not limited thereto.

When the image encoding apparatus 600 described below transforms the feature data of the luma image, the feature data for cross-channel prediction, and the feature data of the chroma image from the second domain to the first domain, the inverse transformer may inversely transform the feature data output from the inverse quantizer 213 from the first domain to the second domain.

Depending on implementation, the obtainer 210 may not include the inverse quantizer 213. That is, the feature data of the luma image, the feature data for cross-channel prediction, and the feature data of the chroma image may be obtained through processing performed by the entropy decoder 211.

Depending on implementation, the obtainer 210 may obtain the feature data of the luma image, the feature data for cross-channel prediction, and the feature data of the chroma image only by inversely binarizing the bins include in the bitstream. This operation is for a case where the image encoding apparatus 600 generates the bitstream by binarizing the feature data of the luma image, the feature data for cross-channel prediction, and the feature data of the chroma image, that is, the image encoding apparatus 600 does not apply entropy-encoding, transformation, and quantization to the feature data of the luma image, the feature data for cross-channel prediction, and the feature data of the chroma image.

Operations of the obtainer 210 are described above with reference to FIG. 3. With the exception of the input data and output data being different, the operations of the obtainer 260 may be similar to those of the obtainer 210 described above, and thus the obtainer 260 will not be described.

Figure 4A:
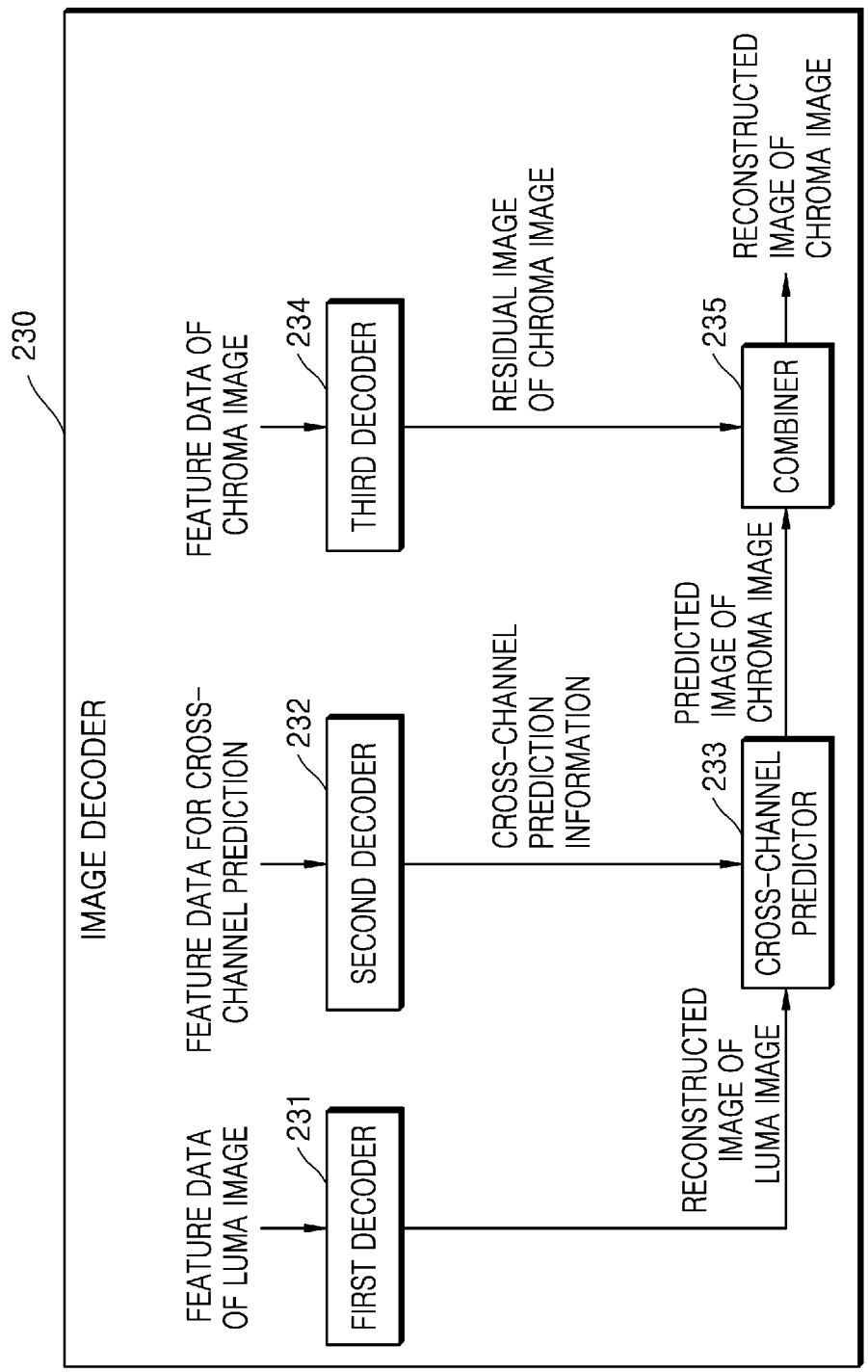
FIG. 4A is a diagram of an image decoder shown in FIG. 2A.

FIG. 4A is a block diagram of the image decoder 230 shown in FIG. 2A.

Referring to FIG. 4A, the image decoder 230 may include the first decoder 231, the second decoder 232, the third decoder 234, a cross-channel predictor 233, and a combiner 235.

The first decoder 231, the second decoder 232, and the third decoder 234 may be stored in a memory. In an embodiment of the disclosure, the first decoder 231, the second decoder 232, and the third decoder 234 may be implemented as at least one dedicated processor for AI.

Depending on implementation, when the frame type of the current chroma image is the I-frame, an operation of the image decoder 230 may be performed to reconstruct the current chroma image.

The feature data of the luma image output by the obtainer 210 is input to the first decoder 231. The feature data for cross-channel prediction output by the obtainer 210 is input to the second decoder 232. The feature data of the current chroma image output by the obtainer 210 is input to the third decoder 234.

Depending on implementation, to reconstruct data for cross-channel prediction, the feature data of the luma image may be concatenated with the feature data for cross-channel prediction and then may be input to the second decoder 232. Herein, the concatenation may refer to a process of combining two or more pieces of feature data in a channel direction. For example, through the concatenation, data having the number of channels equal to a sum of the numbers of channels of two or more pieces of feature data may be obtained.

Depending on implementation, to reconstruct data of the chroma image, the feature data of the luma image or the feature data for cross-channel prediction is concatenated with the feature data of the chroma image and then is input to the third decoder 234.

The first decoder 231 may obtain the reconstructed image of the luma image by processing the feature data of the luma image based on parameters set through training.

When the frame type of the current luma image is an I-frame, the feature data of the current luma image may be input to a first neural network to obtain the reconstructed image of the current luma image.

When the frame type of the current luma image is not the I-frame, the feature data of the current luma image may include the feature data of the residual image of the current luma image. In this case, the predicted image of the current luma image may be generated. The predicted image of the current luma image may be obtained using the reconstructed image of the previous luma image, as described above with reference to FIG. 1.

The first decoder 231 may reconstruct the residual image of the current luma image by processing the feature data of the current luma image based on parameters set through training. The first decoder 231 may generate the reconstructed image of the current luma image by using the predicted image of the current luma image and the residual image of the current luma image.

The third decoder 234 may obtain the residual image (or residual image data) of the chroma image by processing the feature data of the chroma image based on parameters set through training. The feature data of the chroma image may include the feature data of the residual image of the chroma image and may obtain the residual image of the chroma image by processing the feature data of the residual image of the chroma image, but may obtain the residual image of the chroma image by using the feature data of the residual image of the chroma residual image according to the image decoder 270 shown in FIG. 4B described below. The residual image data of the chroma image, which is 1-dimensional or 2-dimensional data, may include a plurality of samples.

The second decoder 232 may obtain data for cross-channel prediction (cross-channel prediction information) by processing feature data for cross-channel prediction based on parameters set through training. The data for cross-channel prediction, which is 1-dimensional or 2-dimensional data, may include a plurality of samples. The data for cross-channel prediction may include a parameter for cross-channel prediction. The parameter for cross-channel prediction may include a scale parameter and a bias parameter. The parameter for cross-channel prediction may be obtained for each chroma component. For example, a parameter for a chroma component Cb and a parameter for a chroma component Cr may be separately obtained. However, without being limited thereto, a common parameter for cross-channel prediction may be obtained for a plurality of chroma components. For example, for the chroma components Cb and Cr, a common parameter for cross-channel prediction may be obtained.

An image of a luma component and an image of a chroma component are for a common object, such that a linear relationship may exist between an image sample of the luma component and an image sample of the chroma component. Such a linear relationship may be expressed as a linear model, and a parameter of the linear model may include a scale parameter and a bias parameter.

Depending on implementation, a color expression scheme of an image may vary. A Y component (luma component) is sensitive to an error, and thus encoding with respect to more samples of the Y component than those of chroma components Cb(U) and Cr(V) may be performed. A method of encoding an image by reducing data of a chroma component in comparison to data of a luma component is referred to as a chroma sub-sampling method.

Examples of the chroma sub-sampling method include YUV 4:4:4, 4:2:2, 4:2:1, 4:1:1, 4:2:0, etc.

To match a resolution of the luma component with a resolution of the chroma component, feature data of a luma image may be down-sampled. A down-sampling method may be one of various methods such as a bi-linear method, a bi-cubic method, etc.

For example, when the chroma sub-sampling method is not YUV 4:4:4, down-sampling may be performed on the feature data of the luma image.

For example, when the chroma sub-sampling method is not YUV 4:2:0, the feature data of the luma image may be down-sampled by 2. That is, when the chroma sub-sampling method is YUV 4:2:0, a height of a chroma component image may be ½ of a height of a luma component image, and a width of the chroma component image may be ½ of a width of the luma component image. Down-sampling may be performed by 2 in a horizontal direction and by 2 in a vertical direction.

The down-sampled feature data of the luma image is concatenated with the feature data for cross-channel prediction, and concatenated data may be processed based on parameters set through training to obtain data for cross-channel prediction.

Depending on implementation, to match the resolution of the luma component with the resolution of the chroma component, space-to-depth transformation may be performed on the feature data of the luma image.

For example, when the chroma sub-sampling method is not YUV 4:4:4, space-to-depth transformation may be performed on the feature data of the luma image. For example, when the chroma sub-sampling method is YUV 4:2:0, space-to-depth transformation of a level 2 may be performed on the feature data of the luma image. That is, space-to-depth transformation is a process of re-arranging the feature data of the luma image in a channel (or depth) direction according to a ratio of the luma image to the chroma image, and re-arranged data of a size down-sampled by 2 per channel from the feature data of the luma image may be generated due to space-to-depth transformation of the level 2.

The transformed feature data of the luma image is concatenated with the feature data for cross-channel prediction, and concatenated data may be processed based on parameters set through training to obtain data for cross-channel prediction.

The cross-channel predictor 233 may generate a predicted image of the chroma image by using the cross-channel prediction information and the reconstructed image of the luma image. The cross-channel predictor 233 may obtain the predicted image of the chroma image by applying the scale parameter and the bias parameter included in the cross-channel prediction information to the reconstructed image of the luma image. The scale parameter may be used for a multiplication operation on samples in the reconstructed image of the luma image. The scale parameter may exist per sample. The bias parameter may be used for an addition operation on a result obtained through the multiplication operation with the scale parameter. The bias parameter may exist per sample.

The cross-channel predictor 233 may obtain the predicted image of the current chroma image by performing the addition operation using the bias parameter after performing the multiplication operation on the reconstructed image of the current luma image using the scale parameter.

When the color expression scheme of the current image is not YUV 4:4:4, down-sampling may be performed on the reconstructed image of the current luma image. Through down-sampling, the resolution of the luma image and the resolution of the chroma image may be matched.

An image obtained after performing the multiplication operation using the scale parameter and the addition operation using the bias parameter on the down-sampled luma image for each sample may be determined as the predicted image of the current chroma image. The resolution of the down-sampled luma image may be the same as the resolution of the chroma image, but the disclosure is not limited thereto, such that the resolution of the down-sampled luma image may be greater than the resolution of the chroma image and less than the resolution of the luma image.

In this case, an image obtained after performing the multiplication operation using the scale parameter and the addition operation using the bias parameter on the down-sampled luma image for each sample may not be determined as the predicted image of the current chroma image. Down-sampling may be further performed on the image obtained after performing an operation, and the down-sampled image may be determined as the predicted image of the current chroma image.

Depending on implementation, the multiplication operation and the addition operation are performed for each sample, but the disclosure is not limited thereto, such that the multiplication operation and the addition operation may be performed for each sample group. A size of a sample group may be, but not limited to, K×K (K is an integer greater than 1). K may be a multiple of 2 or a multiplier of 2.

The predicted image of the chroma image obtained by the cross-channel predictor 233 and the residual image of the chroma image obtained by the third decoder 234 may be provided to the combiner 235.

The combiner 235 may generate the reconstructed image of the chroma image by combining the predicted image of the chroma image with the residual image of the chroma image. The combiner 235 may generate sample values of the reconstructed image of the chroma image by summing the sample values of the predicted image of the chroma image with sample values of the residual image of the chroma image.

The image decoder 230 may generate the reconstructed image of the current image by using the reconstructed image of the current luma image and the reconstructed image of the current chroma image. For output to a display device, the color expression method may be changed. For example, the display device may support red/green/blue (RGB) scheme, and the current luma image and chroma image are based on a YUV scheme, such that the color expression method may be changed.

Depending on implementation, the image decoder 230 may obtain the cross channel-prediction information from the feature data for cross-channel prediction and provide the cross-channel prediction information to another device. In this case, the first decoder 231, the cross-channel predictor 233, the third decoder 234, and the combiner 235 may not be included in the image decoder 230.

Depending on implementation, when the residual image data of the chroma image may be obtained from a bitstream, the third decoder 234 may not be included in the image decoder 230. That is, the image decoder 230 may generate the reconstructed image of the chroma image by combining the residual image data of the chroma image obtained from the bitstream with the predicted image of the chroma image.

According to an embodiment of the disclosure, the bitstream is generated based on cross-channel prediction, thus achieving a lower bitrate than when the bitstream is predicted without cross-channel prediction.

Figure 4B:
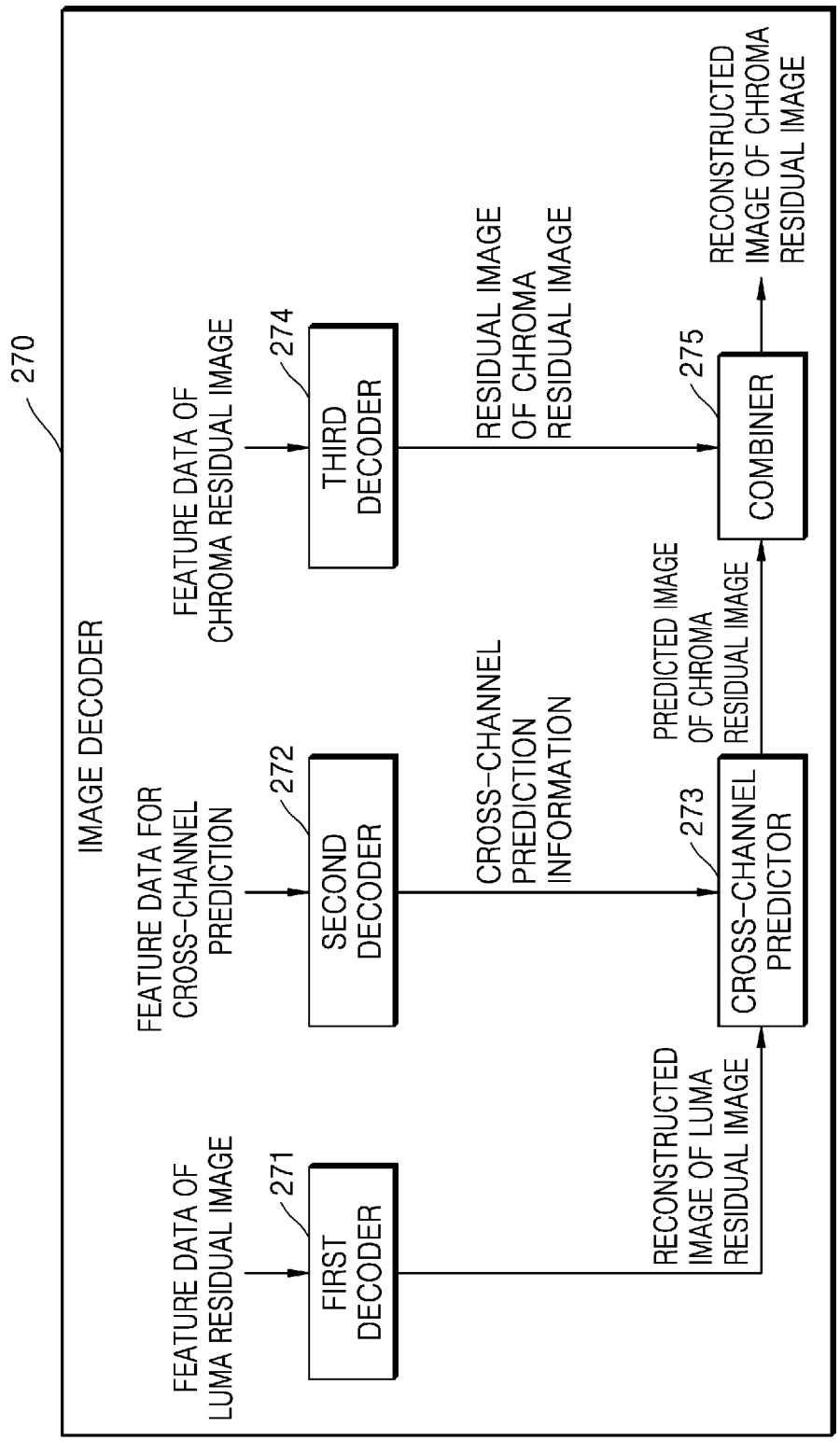
FIG. 4B is a diagram of an image decoder shown in FIG. 2B.

Next, FIG. 4B is a block diagram of the image decoder 270 shown in FIG. 2B.

Referring to FIG. 4B, the image decoder 270 may include a first decoder 271, a second decoder 272, a third decoder 274, a cross-channel predictor 273, and a combiner 275.

The first decoder 271, the second decoder 272, and the third decoder 274 may be stored in a memory. In an embodiment of the disclosure, the first decoder 271, the second decoder 272, and the third decoder 274 may be implemented as at least one dedicated processor for AI.

Depending on implementation, when the frame type of the current chroma image is not the I-frame, an operation of the image decoder 270 may be performed to reconstruct the residual image of the current chroma image. When the frame type of the current chroma image is the I-frame, the operation of the image decoder 270 may not be performed.

However the disclosure is not limited thereto, and when the frame type of the current chroma image is the I-frame, the operation of the image decoder 270 may be performed to reconstruct the residual image of the current chroma image.

The feature data of the current luma residual image output by the obtainer 260 is input to the first decoder 271. The feature data for cross-channel prediction output by the obtainer 260 is input to the second decoder 272. The feature data of the current chroma residual image output by the obtainer 260 is input to the third decoder 274.

Depending on implementation, to reconstruct the data for cross-channel prediction, the feature data of the current luma residual image may be concatenated with the feature data for cross-channel prediction and then may be input to the second decoder 272.

Depending on implementation, to reconstruct the data of the current chroma residual image, the feature data of the current luma residual image or the feature data for cross-channel prediction may be concatenated with the feature data of the current chroma residual image and then may be input to the third decoder 274.

The first decoder 271 may obtain the reconstructed image of the current luma residual image by processing the feature data of the current luma residual image based on parameters set through training.

When the frame type of the current luma residual image is the I-frame, the feature data of the current luma residual image may be input to the first neural network to obtain the reconstructed image of the current luma residual image.

Depending on implementation, when the frame type of the current luma residual image is not the I-frame, the feature data of the current luma residual image may include the feature data of the residual image of the current luma residual image. In this case, the predicted image of the current luma residual image may be generated. The predicted image of the current luma residual image may be obtained using the reconstructed image of the previous luma residual image, as described above with reference to FIG. 1.

The first decoder 271 may reconstruct the residual image of the current luma residual image by processing the feature data of the current luma residual image based on parameters set through training. The first decoder 271 may generate the reconstructed image of the current luma residual image by using the predicted image of the current luma residual image and the residual image of the current luma residual image.

The third decoder 274 may obtain the residual image of the current chroma residual image by processing the feature data of the current chroma residual image based on parameters set through training. The residual image data of the current chroma residual image, which is 1-dimensional or 2-dimensional data, may include a plurality of samples.

The second decoder 272 may obtain the data for cross-channel prediction by processing the feature data for cross-channel prediction based on parameters set through training. The data for cross-channel prediction, which is 1-dimensional or 2-dimensional data, may include a plurality of samples. The data for cross-channel prediction may include a parameter for cross-channel prediction. The parameter for cross-channel prediction may include a scale parameter and a bias parameter. The parameter for cross-channel prediction may be obtained for each chroma component. For example, a parameter for a chroma component Cb and a parameter for a chroma component Cr may be separately obtained. However, without being limited thereto, a common parameter for cross-channel prediction may be obtained for a plurality of chroma components. For example, for the chroma components Cb and Cr, a common parameter for cross-channel prediction may be obtained.

A residual image of the luma component and a residual image of the chroma component are for a common object, such that a linear relationship may exist between a residual image sample of the luma component and a residual image sample of the chroma component. Such a linear relationship may be expressed as a linear model, and a parameter of the linear model may include a scale parameter and a bias parameter.

Depending on implementation, a color expression scheme of an image may vary. A Y component (luma component) is sensitive to an error, and thus encoding with respect to more samples of the Y component than those of chroma components Cb(U) and Cr(V) may be performed.

The second decoder 272 may down-sample the feature data of the luma residual image to match the resolution of the luma component with the resolution of the chroma component.

The down-sampled feature data of the luma residual image is concatenated with the feature data for cross-channel prediction, and concatenated data may be processed based on parameters set through training to obtain data for cross-channel prediction.

The cross-channel predictor 273 may generate the predicted image of the chroma image by using the cross-channel prediction information and the reconstructed image of the luma residual image. The cross-channel predictor 273 may obtain the predicted image of the chroma residual image by applying the scale parameter and the bias parameter included in the cross-channel prediction information to the reconstructed image of the luma residual image.

The scale parameter may be used for the multiplication operation on samples in the reconstructed image of the luma residual image. In this case, the scale parameter may exist per sample. The bias parameter may be used for an addition operation on a result obtained through the multiplication operation with the scale parameter. In this case, the bias parameter may exist per sample.

The cross-channel predictor 273 may obtain the predicted image of the current chroma residual image by performing the addition operation using the bias parameter after performing the multiplication operation on the reconstructed image of the current luma residual image using the scale parameter.

When the color expression scheme of the current residual image is not YUV 4:4:4, down-sampling may be performed on the reconstructed image of the luma residual image. The resolution of the luma residual image and the resolution of the chroma residual image may be matched with each other through down-sampling, and an image obtained after performing the multiplication operation using the scale parameter and the addition operation using the bias parameter may be performed on the down-sampled luma residual image for each sample may be determined as the predicted image of the current chroma residual image. The resolution of the down-sampled luma residual image may be the same as the resolution of the chroma residual image, but the disclosure is not limited thereto, such that the resolution of the down-sampled luma residual image may be greater than the resolution of the chroma residual image and less than the resolution of the luma residual image.

In this case, an image obtained after performing the multiplication operation using the scale parameter and the addition operation using the bias parameter on the down-sampled luma residual image for each sample may not be determined as the predicted image of the current chroma residual image.

Down-sampling may be further performed on the image obtained after performing an operation, and the down-sampled image may be determined as the predicted image of the current chroma residual image.

Depending on implementation, the multiplication operation and the addition operation are performed for each sample, but the disclosure is not limited thereto, such that the multiplication operation and the addition operation may be performed for each sample group. A size of a sample group may be, but not limited to, K×K (K is an integer greater than 1). K may be a multiple of 2 or a multiplier of 2.

The predicted image of the chroma residual image obtained by the cross-channel predictor 273 and the residual image of the chroma residual image obtained by the third decoder 274 may be provided to the combiner 275.

The combiner 275 may generate the reconstructed image of the chroma residual image by combining the predicted image of the chroma residual image with the residual image of the chroma residual image. The combiner 275 may generate sample values of the reconstructed image of the chroma residual image by summing the sample values of the predicted image of the chroma residual image with sample values of the residual image of the chroma residual image.

The image decoder 270 may generate the predicted image of the current chroma image. The image decoder 270 may generate the predicted image of the current chroma image based on the reconstructed image of the previous chroma image. A method of predicting the current chroma image based on the reconstructed image of the previous chroma image may be similar to the prediction method described with reference to FIG. 1.

Depending on implementation, the image decoder 270 may obtain the cross channel-prediction information from the feature data for cross-channel prediction and provide the cross-channel prediction information to another device. In this case, the first decoder 271, the cross-channel predictor 273, the third decoder 274, and the combiner 275 may not be included in the image decoder 270.

According to an embodiment of the disclosure, the bitstream is generated based on cross-channel prediction, thus achieving a lower bitrate than when the bitstream is predicted without cross-channel prediction.

Figure 5A:
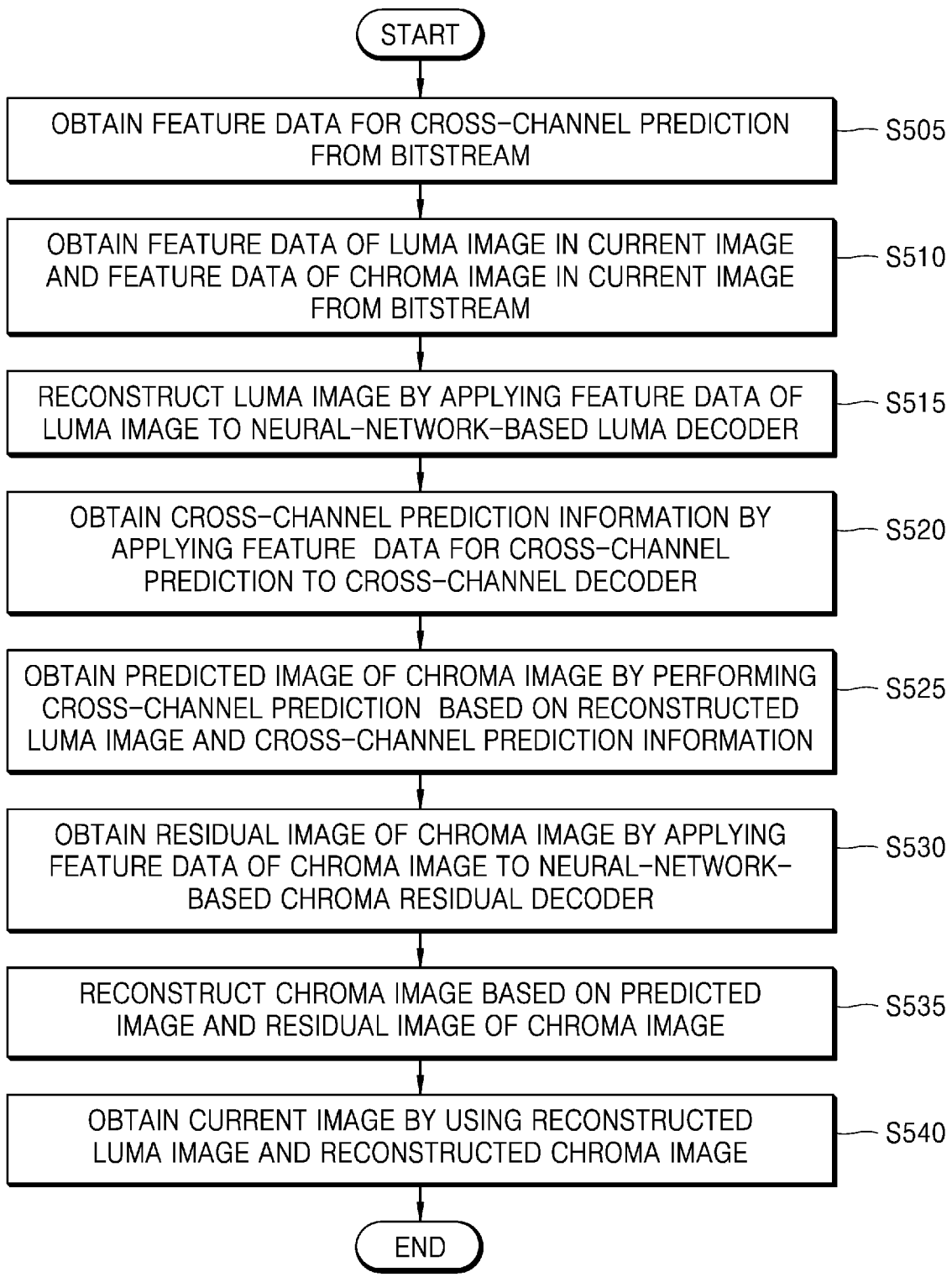
FIG. 5A is a flowchart of an image decoding method according to an embodiment of the disclosure.

FIG. 5A is a flowchart of an image decoding method according to an embodiment of the disclosure.

Referring to FIG. 5A, in operation S505, the image decoding apparatus 200 may obtain feature data for cross-channel prediction from a bitstream.

In operation S510, the image decoding apparatus 200 may obtain feature data of a luma image in the current image and feature data of a chroma image in the current image.

In operation S515, the image decoding apparatus 200 may reconstruct the luma image by applying the feature data of the luma image to a neural-network-based luma decoder.

In operation S520, the image decoding apparatus 200 may obtain cross-channel prediction information by applying the feature data for cross-channel prediction to a cross-channel decoder.

In operation S525, the image decoding apparatus 200 may obtain a predicted image of the chroma image by performing cross-channel prediction based on the reconstructed luma image and the cross-channel prediction information.

In operation S530, the image decoding apparatus 200 may obtain a residual image of the chroma image by applying the feature data of the chroma image to a neural-network-based chroma decoder.

In operation S535, the image decoding apparatus 200 may reconstruct the chroma image based on the predicted image of the chroma image and the residual image of the chroma image.

In operation S540, the image decoding apparatus 200 may obtain the current image by using the reconstructed luma image and the reconstructed chroma image.

Figure 5B:
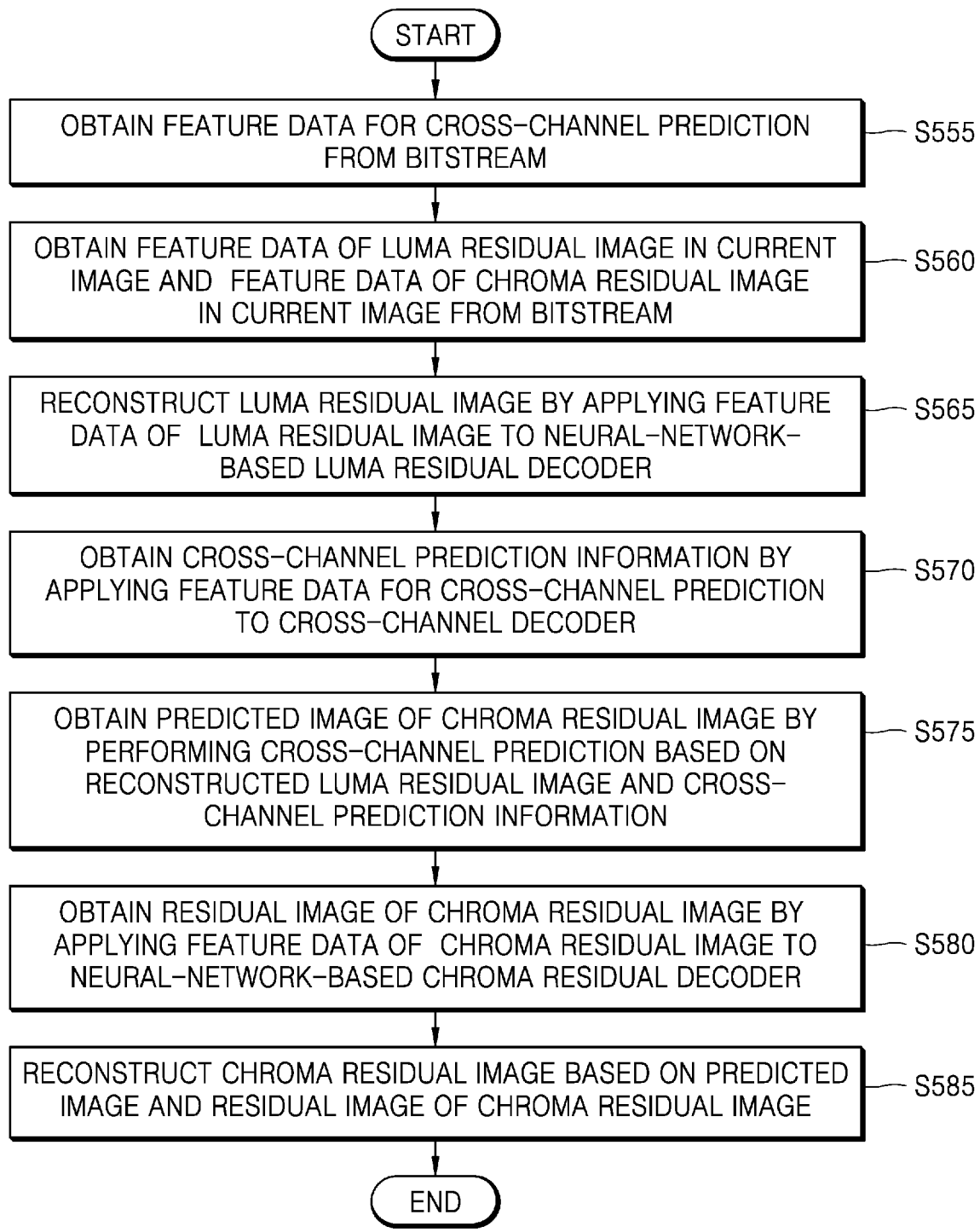
FIG. 5B is a flowchart of an image decoding method according to another embodiment of the disclosure.

FIG. 5B is a flowchart of an image decoding method according to another embodiment of the disclosure.

Referring to FIG. 5B, in operation S555, the image decoding apparatus 250 may obtain feature data for cross-channel prediction from a bitstream.

In operation S560, the image decoding apparatus 250 may obtain feature data of a luma residual image in the current image and feature data of a chroma residual image in the current image.

In operation S565, the image decoding apparatus 250 may reconstruct the luma residual image by applying the feature data of the luma residual image to the neural-network-based luma decoder.

In operation S570, the image decoding apparatus 250 may obtain cross-channel prediction information by applying the feature data for cross-channel prediction to a cross-channel decoder.

In operation S575, the image decoding apparatus 200 may obtain a predicted image of the chroma image by performing cross-channel prediction based on the reconstructed luma image and the cross-channel prediction information.

In operation S580, the image decoding apparatus 250 may obtain a residual image of the chroma residual image by applying the feature data of the chroma residual image to the neural-network-based chroma decoder.

In operation S585, the image decoding apparatus 250 may reconstruct the chroma residual image based on the predicted image of the chroma residual image and the residual image of the chroma residual image.

Figure 6A:
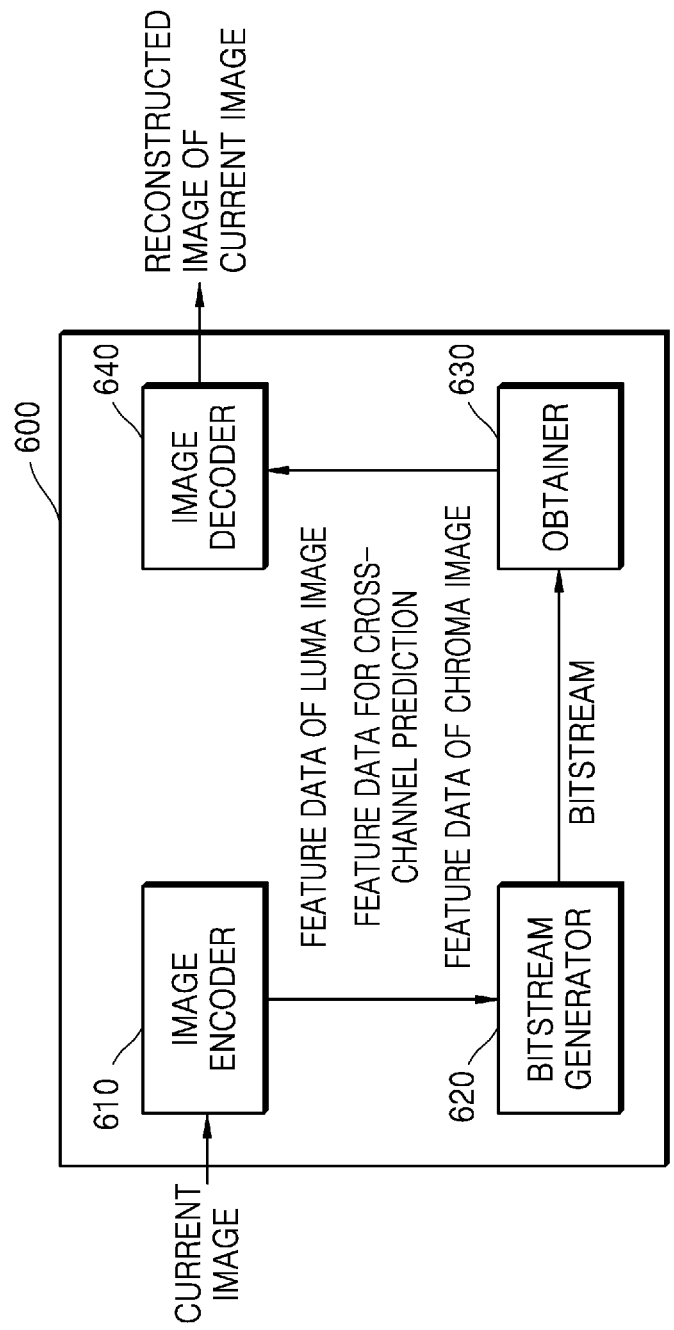
FIG. 6A is a block diagram of an image encoding apparatus according to an embodiment of the disclosure.

FIG. 6A is a block diagram of an image encoding apparatus 600 according to an embodiment of the disclosure.

Referring to FIG. 6A, the image encoding apparatus 600 may include an image encoder 610, a bitstream generator 620, an obtainer 630, and an image decoder 640.

The image encoder 610, the bitstream generator 620, the obtainer 630, and the image decoder 640 may be implemented as processors, and operate based on instructions stored in a memory (not shown).

Although the image encoder 610, the bitstream generator 620, the obtainer 630, and the image decoder 640 are individually shown in FIG. 6A, the image encoder 610, the bitstream generator 620, the obtainer 630, and the image decoder 640 may be implemented as one processor. In this case, the image encoder 610, the bitstream generator 620, the obtainer 630, and the image decoder 640 may be implemented as a dedicated processor, or a combination of software and a general-purpose processor such as an AP, a CPU, or a GPU. The dedicated processor may include a memory to implement an embodiment of the disclosure, or include a memory processor to use an external memory.

The image encoder 610, the bitstream generator 620, the obtainer 630, and the image decoder 640 may be implemented as a plurality of processors. In this case, the image encoder 610, the bitstream generator 620, the obtainer 630, and the image decoder 640 may be implemented as a combination of dedicated processors, or a combination of software and general-purpose processors such as APs, CPUs, or GPUs.

The image encoder 610 may obtain, from the current image, the feature data of the luma image, the feature data for cross-channel prediction, and the feature data of the chroma image.

The image encoder 610 may use a first encoder based on the neural network to obtain the feature data of the luma image. The image encoder 610 may use a second encoder based on the neural network to obtain the feature data for cross-channel prediction. The image encoder 610 may use a third encoder based on the neural network to obtain the feature data of the chroma image.

The feature data of the luma image, the feature data for cross-channel prediction, and the feature data of the chroma image, obtained by the image encoder 610, are transmitted to the bitstream generator 620.

The bitstream generator 620 may generate the bitstream from the feature data of the luma image, the feature data for cross-channel prediction, and the feature data of the chroma image. Depending on implementation, the bitstream generator 620 may generate a first bitstream corresponding to the feature data of the luma image, a second bitstream corresponding to the feature data for cross-channel prediction, and a third bitstream corresponding to the feature data of the chroma image.

The bitstream may be transmitted from the image decoding apparatus 200 through a network. In an embodiment of the disclosure, the bitstream may be recorded on a data storage medium including a magnetic medium (e.g., a hard disk, a floppy disk, or magnetic tape), an optical medium (e.g., a CD-ROM or a DVD), or a magneto-optical medium (e.g., a floptical disk).

The obtainer 630 may obtain, from the bitstream generated by the bitstream generator 620, the feature data of the luma image, the feature data for cross-channel prediction, and the feature data of the chroma image. Depending on implementation, the obtainer 630 may receive, from the image encoder 610, the feature data of the luma image, the feature data for cross-channel prediction, and the feature data of the chroma image.

The feature data of the luma image, the feature data for cross-channel prediction, and the feature data of the chroma image may be transmitted to the image decoder 640. The image decoder 640 may reconstruct the luma image by using the feature data of the luma image. The image decoder 640 may obtain cross-channel prediction information by using the feature data for cross-channel prediction. The image decoder 640 may reconstruct the chroma image by using the cross-channel prediction information and the reconstructed image of the luma image. The image decoder 640 may generate the reconstructed image of the current image by using the reconstructed image of the luma image and the reconstructed image of the chroma image.

Structures and operations of the obtainer 630 and the image decoder 640 are the same as those of the obtainer 210 and the image decoder 230 of FIGS. 2A, 3, and 4A, and thus a detailed description thereof is not provided herein.

In an embodiment of the disclosure, the image encoder 610 may obtain the feature data for cross-channel prediction, and the bitstream generator 620 may generate a bitstream corresponding to the feature data for cross-channel prediction. The obtainer 630 may obtain the feature data for cross-channel prediction from the bitstream. The obtainer 630 may obtain the cross-channel prediction information based on the feature data for cross-channel prediction.

That is, the cross-channel prediction information is encoded through the image encoder 610, the bitstream generator 620, the obtainer 630, and the image decoder 640, and in this case, the image encoding apparatus 600 may be referred to as a cross-channel prediction encoding apparatus.

The cross-channel prediction information reconstructed by the image decoder 640 may be transmitted to another device by which the chroma image may be encoded. More specifically, the other device may encode data of the residual image of the chroma image corresponding to a difference between the predicted image of the chroma image obtained from the luma reconstructed image based on the cross-channel prediction information, and the original image of the chroma image.

Figure 6B:
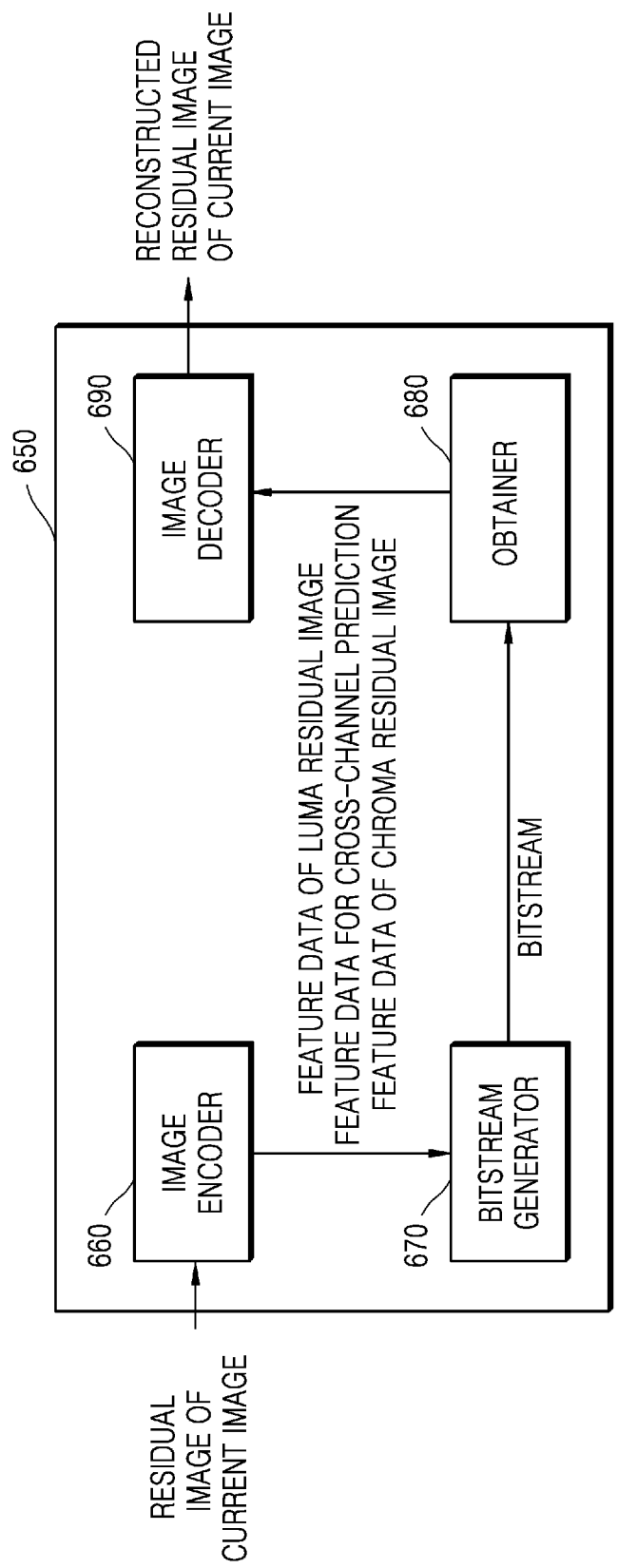
FIG. 6B is a block diagram of an image encoding apparatus according to an embodiment of the disclosure.

FIG. 6B is a block diagram of an image encoding apparatus 650 according to an embodiment of the disclosure.

Referring to FIG. 6B, the image encoding apparatus 650 may include an image encoder 660, a bitstream generator 670, an obtainer 680, and an image decoder 690.

The image encoder 660, the bitstream generator 670, the obtainer 680, and the image decoder 690 may be implemented as processors, and operate based on instructions stored in a memory (not shown).

Although the image encoder 660, the bitstream generator 670, the obtainer 680, and the image decoder 690 are individually shown in FIG. 6B, the image encoder 660, the bitstream generator 670, the obtainer 680, and the image decoder 690 may be implemented as one processor. In this case, the image encoder 660, the bitstream generator 670, the obtainer 680, and the image decoder 690 may be implemented as a dedicated processor, or a combination of software and a general-purpose processor such as an AP, a CPU, or a GPU. The dedicated processor may include a memory to implement an embodiment of the disclosure, or include a memory processor to use an external memory.

The image encoder 660, the bitstream generator 670, the obtainer 680, and the image decoder 690 may be implemented as a plurality of processors. In this case, the image encoder 660, the bitstream generator 670, the obtainer 680, and the image decoder 690 may be implemented as a combination of dedicated processors, or a combination of software and general-purpose processors such as APs, CPUs, or GPUs.

The image encoder 660 may obtain the feature data of the luma residual image, the feature data for cross-channel prediction, and the feature data of the chroma residual image from the residual image of the current image.

The image encoder 660 may use the first encoder based on the neural network to obtain the feature data of the luma residual image. The image encoder 610 may use the second encoder based on the neural network to obtain the feature data for cross-channel prediction. The image encoder 660 may use the third encoder based on the neural network to obtain the feature data of the chroma residual image.

The feature data of the luma residual image, the feature data for cross-channel prediction, and the feature data of the chroma residual image, obtained by the image encoder 660, are transmitted to the bitstream generator 670.

The bitstream generator 670 may generate the bitstream from the feature data of the luma residual image, the feature data for cross-channel prediction, and the feature data of the chroma residual image. Depending on implementation, the bitstream generator 670 may generate a first bitstream corresponding to the feature data of the luma residual image, a second bitstream corresponding to the feature data for cross-channel prediction, and a third bitstream corresponding to the feature data of the chroma residual image.

The bitstream may be transmitted from the image decoding apparatus 250 through the network. In an embodiment of the disclosure, the bitstream may be recorded on a data storage medium including a magnetic medium (e.g., a hard disk, a floppy disk, or magnetic tape), an optical medium (e.g., a CD-ROM or a DVD), or a magneto-optical medium (e.g., a floptical disk).

The obtainer 680 may obtain the feature data of the luma residual image, the feature data for cross-channel prediction, and the feature data of the chroma residual image from the bitstream generated by the bitstream generator 670. Depending on implementation, the obtainer 680 may receive, from the image encoder 660, the feature data of the luma residual image, the feature data for cross-channel prediction, and the feature data of the chroma residual image.

The feature data of the luma residual image, the feature data for cross-channel prediction, and the feature data of the chroma residual image may be transmitted to the image decoder 690. The image decoder 690 may reconstruct the luma residual image by using the feature data of the luma residual image. The image decoder 690 may obtain the cross-channel prediction information by using the feature data for cross-channel prediction. The image decoder 690 may reconstruct the chroma residual image by using the cross-channel prediction information and the reconstructed image of the luma residual image.

Structures and operations of the obtainer 680 and the image decoder 690 are the same as those of the obtainer 260 and the image decoder 270 of FIGS. 2B, 3, and 4B, and thus a detailed description thereof is not provided herein.

In an embodiment of the disclosure, the image encoder 660 may obtain the feature data for cross-channel prediction, and the bitstream generator 670 may generate a bitstream corresponding to the feature data for cross-channel prediction. The obtainer 680 may obtain the feature data for cross-channel prediction from the bitstream. The obtainer 680 may obtain the cross-channel prediction information based on the feature data for cross-channel prediction.

That is, the cross-channel prediction information is encoded through the image encoder 660, the bitstream generator 670, the obtainer 680, and the image decoder 690, and in this case, the image encoding apparatus 650 may be referred to as a cross-channel prediction encoding apparatus.

The cross-channel prediction information reconstructed by the image decoder 690 may be transmitted to another device by which the chroma residual image may be encoded. More specifically, the other device may encode data of the residual image of the chroma residual image corresponding to a difference between the predicted image of the chroma residual image obtained from the luma residual image based on the cross-channel prediction information, and the original image of the chroma residual image.

Structures of the image encoder 610 and the bitstream generator 620 will be described in more detail with reference to FIGS. 7 and 8.

Figure 7:
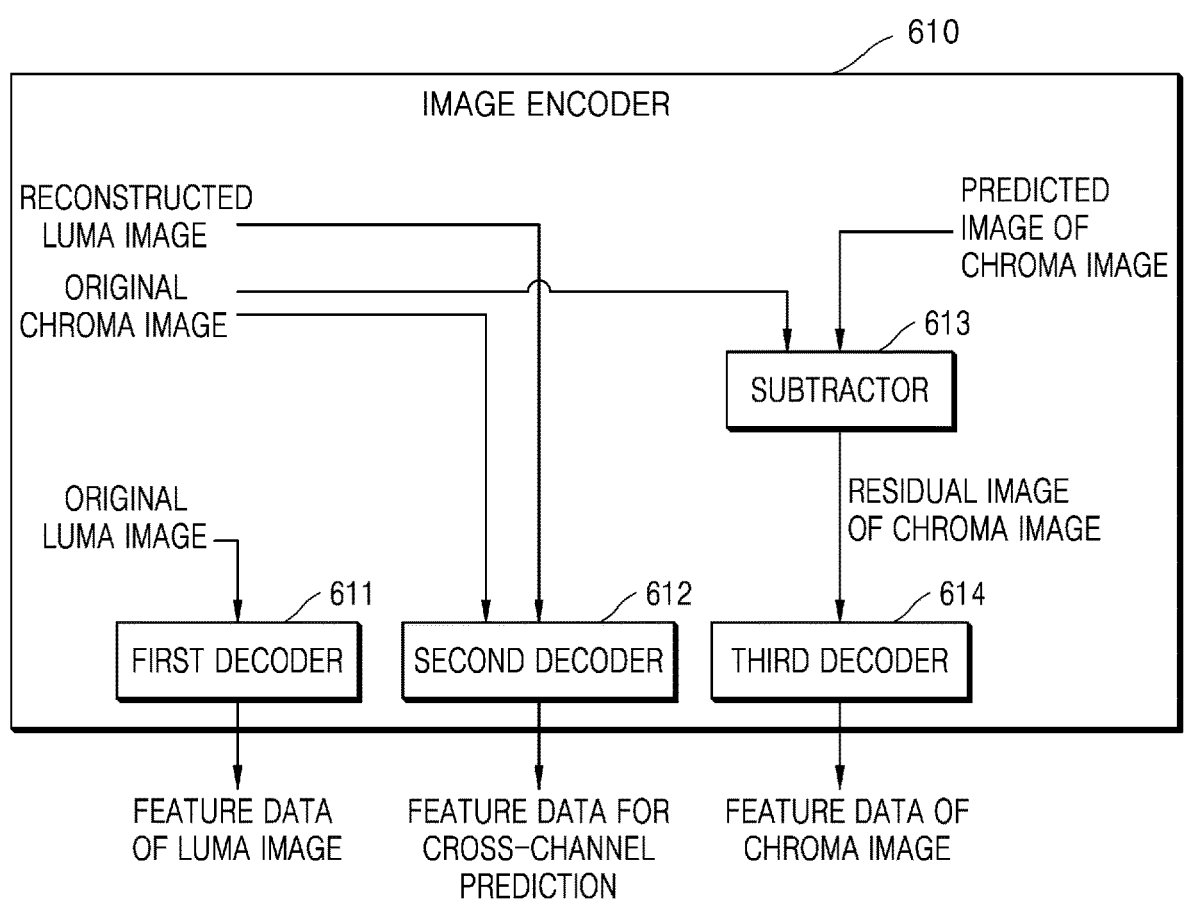
FIG. 7 is a block diagram of an image encoder shown in FIG. 6A.

FIG. 7 is a block diagram of the image encoder 610 shown in FIG. 6A.

Referring to FIG. 7, the image encoder 610 may include a first encoder 611, a second encoder 612, a third encoder 614, and a subtractor 613.

The first encoder 611 and the second encoder 612 may be stored in a memory. In an embodiment of the disclosure, the first encoder 611 and the second encoder 612 may be implemented as at least one dedicated processor for AI.

The image decoder 640 may include a cross-channel predictor, and the image encoding apparatus 600 may obtain the predicted image of the chroma image in the same manner as the cross-channel predictor 233 of the image decoding apparatus 200 through the cross-channel predictor included in the image decoder 640. The generated predicted image of the chroma image is provided to the subtractor 613.

The original luma image is input to the first encoder 611. The first encoder 611 outputs the feature data of the current luma image from the current original luma image based on a parameter set as a result of training. When the frame type of the current luma image is not the I-frame, the feature data of the current luma image may include the feature data of the residual image of the current luma image. The first encoder 611 may generate the predicted image of the current luma image from the current original luma image and the reconstructed image of the previous luma image and obtain the residual image of the current luma image from the current original luma image and the predicted image of the current luma image. In this case, a method of generating the predicted image of the current luma image and a method of generating the residual image of the current luma image may be based on the method described above with reference to FIG. 1.

The original chroma image and the reconstructed luma image are input to the second encoder 612. The second encoder 612 may output feature data for cross-channel prediction from the original chroma image and the reconstructed image of the luma image based on parameters set as a result of training. The feature data for cross-channel prediction is provided to the image decoder 640, and the predicted image of the chroma image may be obtained based on the feature data for cross-channel prediction and the reconstructed image of the luma image as described above.

The subtractor 613 may obtain the residual image data of the chroma image between the original image of the chroma image and the predicted image of the chroma image. The subtractor 613 may obtain the residual image data of the chroma image by subtracting sample values of the predicted image of the chroma image from sample values of the original image of the chroma image.

The residual image data of the chroma image is input to the third encoder 614, and the third encoder 614 outputs the feature data of the chroma image by processing the residual image data of the chroma image based on parameters set as a result of training. The feature data of the chroma image may include the feature data of the residual image of the chroma image.

The bitstream generator 620 generates the bitstream based on the feature data of the luma image, the feature data of the chroma image, and the feature data for cross-channel prediction, output from the image encoder 610.

Figure 8:
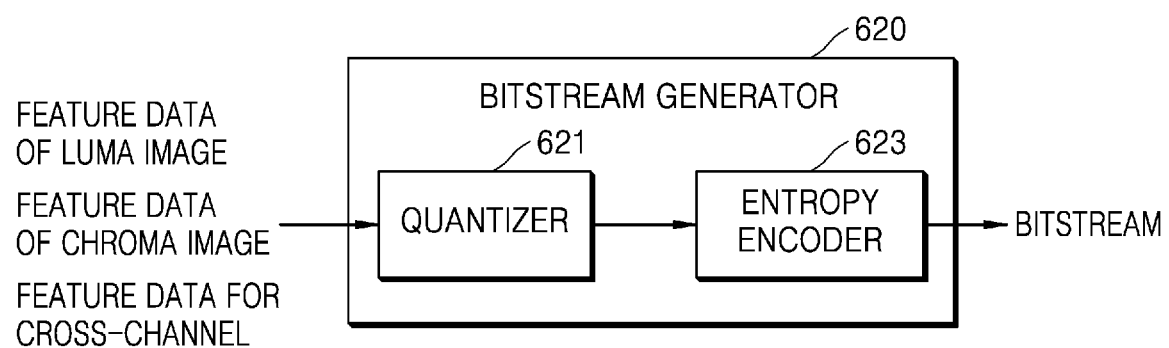
FIG. 8 is a block diagram of a bitstream generator shown in FIG. 6.

FIG. 8 is a block diagram of the bitstream generator 620 shown in FIG. 6.

Referring to FIG. 8, the bitstream generator 620 includes a quantizer 621 and an entropy encoder 623.

The quantizer 621 quantizes the feature data of the luma image, the feature data for cross-channel prediction, and the feature data of the chroma image.

The entropy encoder 623 generates the bitstream by entropy-coding the quantized feature data of the luma image, the quantized feature data for cross-channel prediction, and the quantized feature data of the chroma image.

Depending on implementation, the bitstream generator 620 may further include a transformer. The transformer transforms the quantized feature data of the luma image, the quantized feature data for cross-channel prediction, and the quantized feature data of the chroma image from the second domain to the first domain, and provides the transformed feature data to the quantizer 621.

Depending on implementation, the bitstream generator 620 may not include the quantizer 621. That is, the bitstream corresponding to the feature data of the luma image, the feature data for cross-channel prediction, and the feature data of the chroma image may be obtained through processing performed by the entropy encoder 623.

Moreover, depending on implementation, the bitstream generator 620 may generate the bitstream by performing binarization on the feature data of the luma image, the feature data for cross-channel prediction, and the feature data of the chroma image. That is, when the bitstream generator 620 performs binarization only, the quantizer 621 and the entropy encoder 623 may not be included in the bitstream generator 620.

Structures of the image encoder 610 and the bitstream generator 620 shown in FIG. 6A have been described so far with reference to FIGS. 7 and 8. Structures of the image encoder 660 and the bitstream generator 670 shown in FIG. 6B are also similar to those of the image encoder 610 and the bitstream generator 620 described above, and thus will not be described in detail.

Figure 9A:
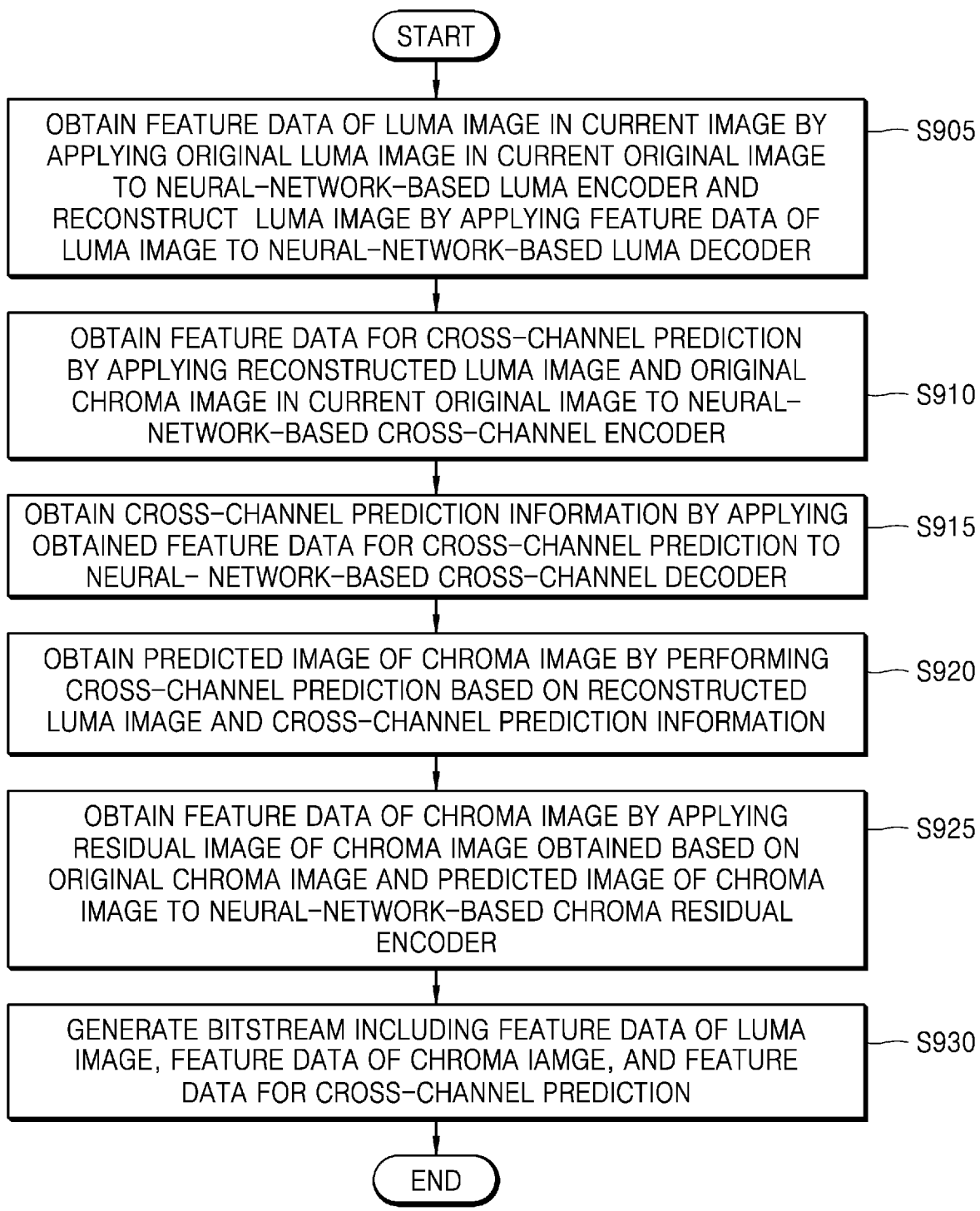
FIG. 9A is a flowchart of an image encoding method according to an embodiment of the disclosure.

FIG. 9A is a flowchart of an image encoding method according to an embodiment of the disclosure.

Referring to FIG. 9A, in operation S905, the image encoding apparatus 600 may obtain feature data of a luma image in the current image by applying an original luma image in the current original image to a neural-network-based luma encoder and reconstruct the luma image by applying the feature data of the luma image to the neural-network-based luma encoder.

In operation S910, the image encoding apparatus 600 may obtain feature data for cross-channel prediction by applying the reconstructed luma image and the original chroma image in the current original image to a neural-network-based cross-channel encoder.

In operation S915, the image encoding apparatus 600 may obtain cross-channel prediction information by applying the obtained feature data for cross-channel prediction to a neural-network-based chroma decoder.

In operation S920, the image encoding apparatus 600 may obtain a predicted image of the chroma image by performing cross-channel prediction based on the reconstructed luma image and the cross-channel prediction information.

In operation S925, the image encoding apparatus 600 may obtain feature data of the chroma image by applying a residual image of the chroma image, obtained based on the original chroma image and the predicted image of the chroma image, to a neural-network-based chroma encoder.

In operation S930, the image encoding apparatus 600 may generate a bitstream including the feature data of the luma image, the feature data of the chroma image, and the feature data for cross-channel prediction.

Figure 9B:
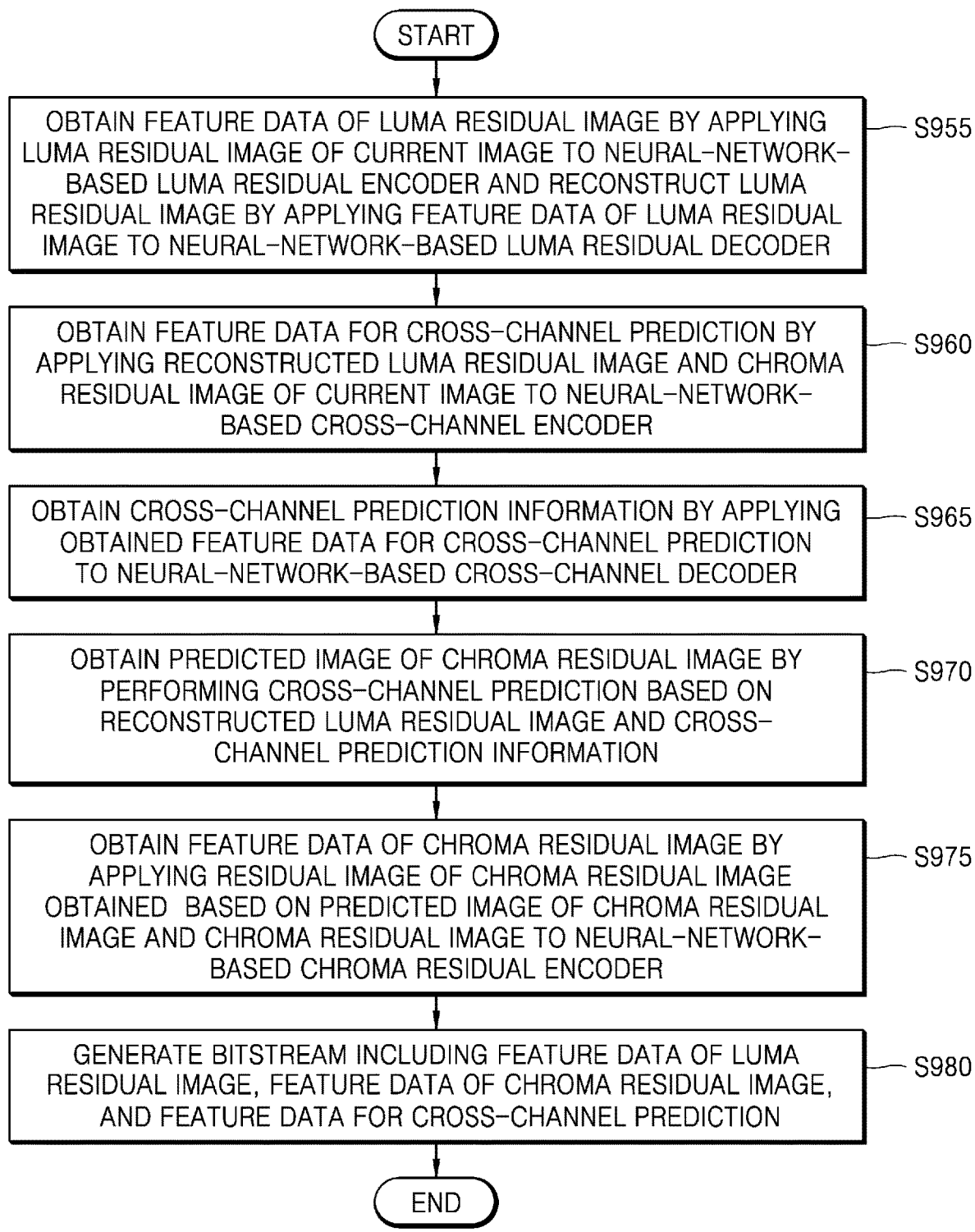
FIG. 9B is a flowchart of an image encoding method according to an embodiment of the disclosure.

FIG. 9B is a flowchart of an image encoding method according to an embodiment of the disclosure.

Referring to FIG. 9B, in operation S955, the image encoding apparatus 650 may obtain feature data of a luma residual image by applying a residual image of a current image to a neural-network-based luma encoder, and reconstruct the luma residual image by applying the feature data of the luma residual image to a neural-network-based luma decoder.

In operation S960, the image encoding apparatus 650 may obtain feature data for cross-channel prediction by applying the reconstructed luma residual image and a chroma residual image of the current image to a neural-network-based cross-channel encoder.

In operation S965, the image encoding apparatus 650 may obtain cross-channel prediction information by applying the obtained feature data for cross-channel prediction to a neural-network-based chroma decoder.

In operation S970, the image encoding apparatus 650 may obtain a predicted image of the chroma residual image by performing cross-channel prediction based on the reconstructed luma residual image and the cross-channel prediction information.

In operation S925, the image encoding apparatus 650 may obtain feature data of the chroma residual image by applying a residual image of the chroma residual image, obtained based on the predicted image of the chroma residual image and the chroma residual image, to a neural-network-based chroma encoder.

In operation S980, the image encoding apparatus 650 may generate a bitstream including the feature data of the luma residual image, the feature data of the chroma residual image, and the feature data for cross-channel prediction.

Figure 10A:
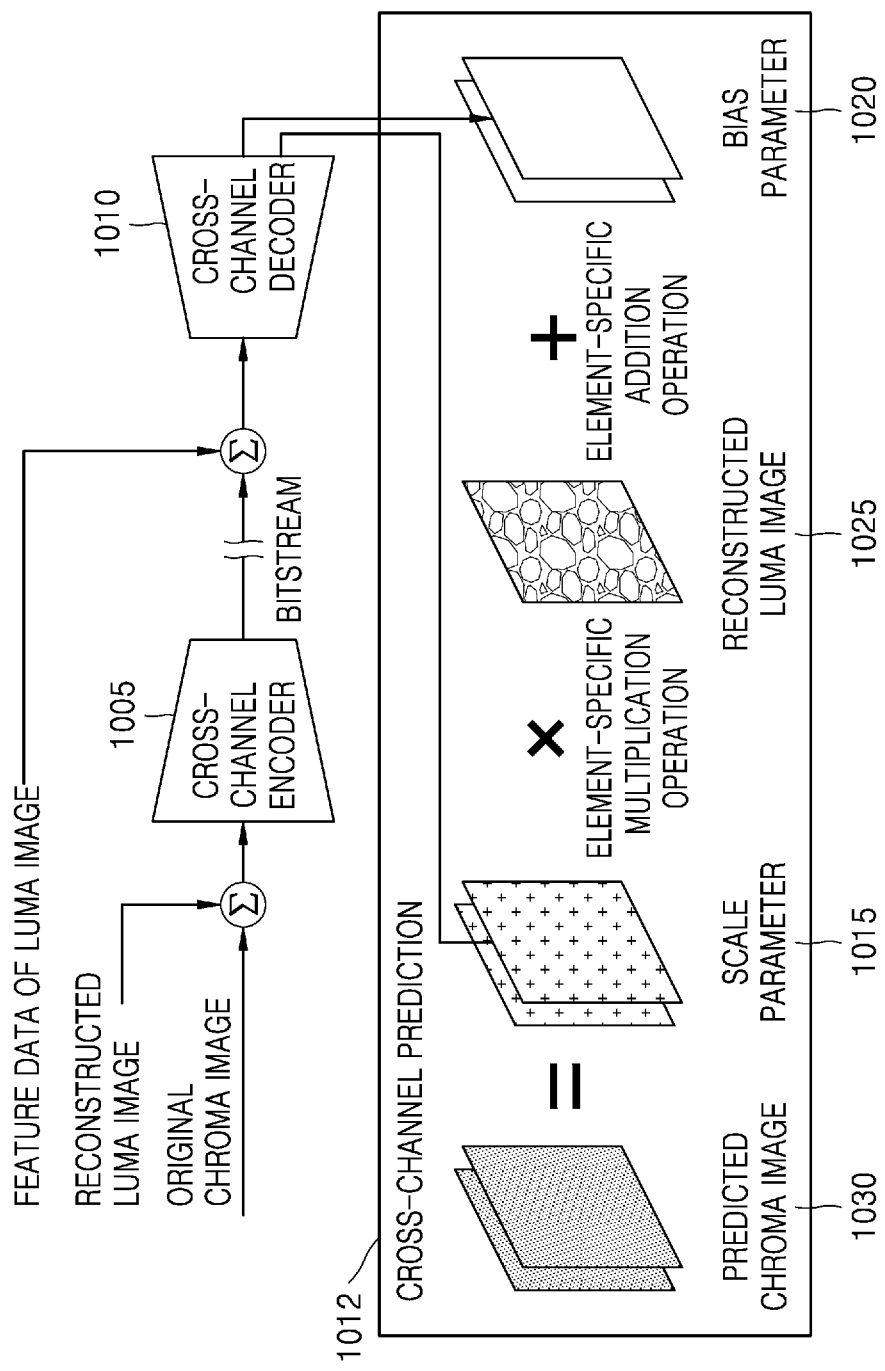
FIG. 10A is a diagram for describing cross-channel prediction according to an embodiment of the disclosure.

FIG. 10A is a diagram for describing cross-channel prediction according to an embodiment of the disclosure.

Referring to FIG. 10A, a reconstructed luma image and the original chroma image are concatenated with each other and then input to a cross-channel encoder 1005. Feature data for cross-channel prediction, output from the cross-channel encoder 1005, is included in a bitstream. The feature data for cross-channel prediction included in the bitstream is concatenated with feature data of a luma image and then input to a cross-channel decoder 1010. A scale parameter 1015 and a bias parameter 1020 are output from the cross-channel decoder 1010 for each element (i.e., each sample). Cross-channel prediction 1012 may be performed using the scale parameter 1015, a reconstructed luma image 1025, and the bias parameter 1020. The multiplication operation may be performed on the scale parameter 1015 and the reconstructed luma image 1025 for each element. By performing the addition operation on a resultant value of the multiplication operation and the bias parameter 1020, a predicted chroma image 1030 may be generated. The scale parameter 1015 and the bias parameter 1020 may exist for each chroma component. For example, the scale parameter 1015 and the bias parameter 1020 may exist separately for Cb and Cr components. Thus, the predicted chroma image 1030 may also be generated separately for the Cb and Cr components.

Figure 10B:
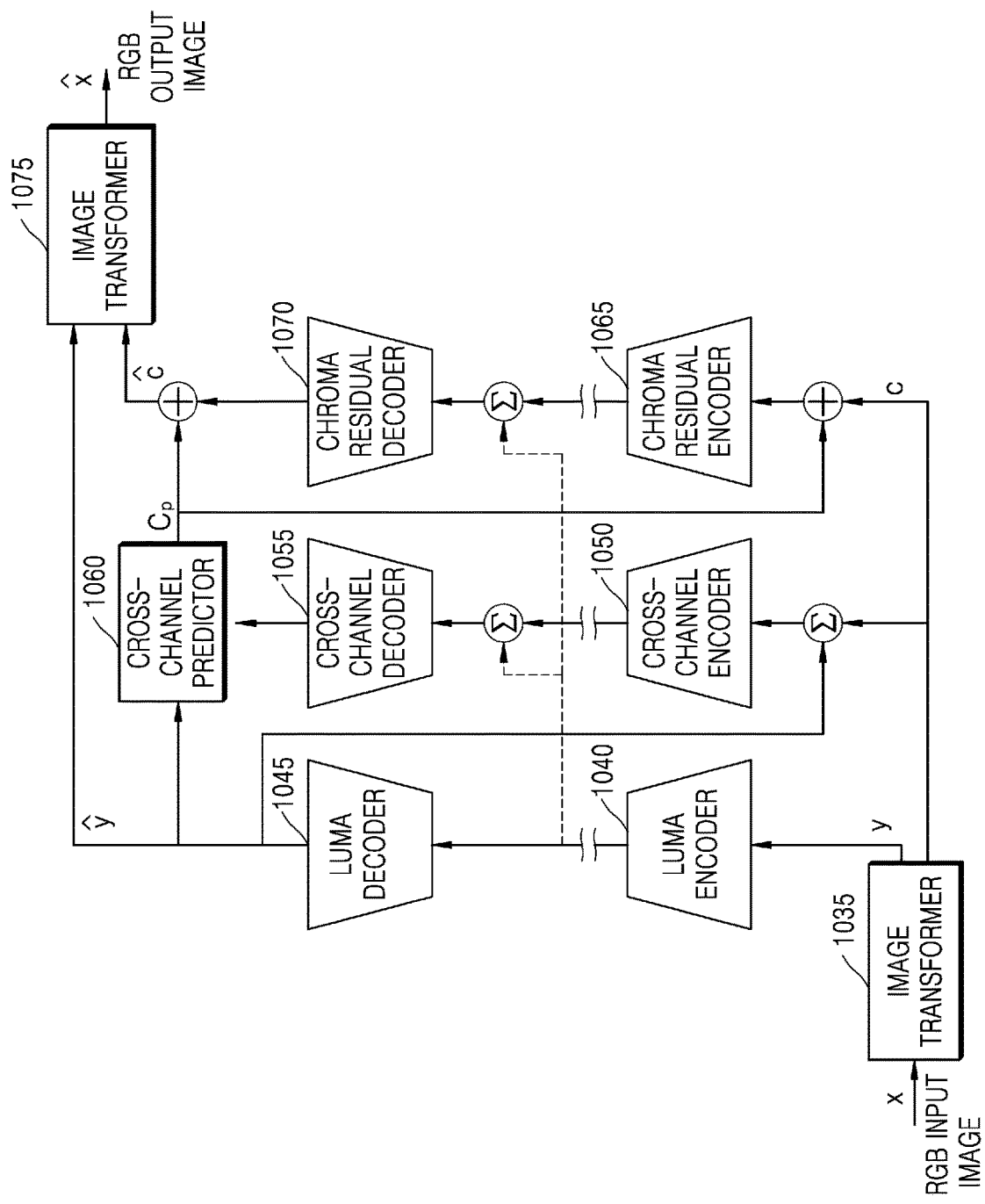
FIG. 10B is a diagram for describing a pair of an image encoding apparatus and an image decoding apparatus for cross-channel prediction, according to an embodiment of the disclosure.
Figure 10C:
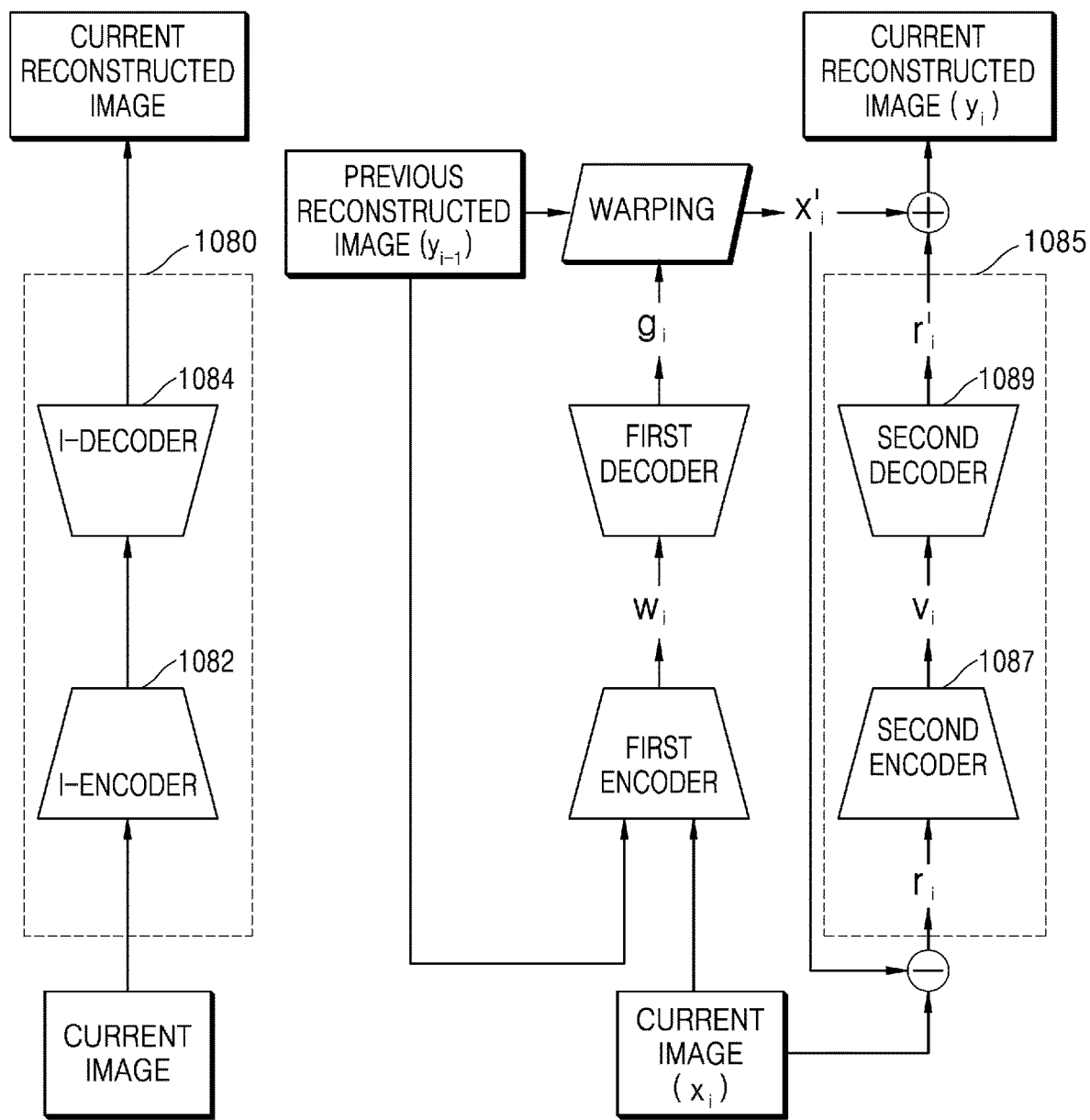
FIG. 10C is a diagram for describing a pair of an image encoding apparatus and an image decoding apparatus including the pair of the image encoding apparatus and the image decoding apparatus for cross-channel prediction, according to an embodiment of the disclosure.

FIG. 10B is a diagram for describing a pair of an image encoding apparatus and an image decoding apparatus for cross-channel prediction, according to an embodiment of the disclosure.

Referring to FIG. 10B, an RGB input image x is input to an image transformer 1035, and the image transformer 1035 may output a luma image y and a chroma image c.

The luma image y is input to a luma encoder 1040, and feature data of the luma image y may be output. The feature data of the luma image y is input to a luma decoder 1045. The luma decoder 1045 may output a reconstructed luma image ŷ.

The reconstructed luma image Y and the chroma image c are concatenated with each other and then input to a cross-channel encoder 1050. The cross-channel encoder 1050 may obtain feature data for cross-channel prediction. The feature data for cross-channel prediction may be input to a cross-channel decoder 1055. According to an embodiment of the disclosure, feature data for cross-channel prediction and feature data of a luma image are concatenated with each other and then input to the cross-channel decoder 1055.

The cross-channel decoder 1055 may output cross-channel prediction information. The cross-channel prediction information and a reconstructed luma image ŷ may be input to a cross-channel predictor 1060. The cross-channel predictor 1060 may output a chroma predicted image $c_p$.

The chroma predicted image $c_p$ is subtracted from the chroma image c and then input to a chroma residual encoder 1065. The chroma residual encoder 1065 may output feature data of a chroma residual image.

The feature data of the chroma residual image may be input to a chroma residual decoder 1070. According to an embodiment of the disclosure, the feature data of the chroma residual image and the feature data of the luma image y may be concatenated with each other and then input to the chroma residual decoder 1070. The chroma residual decoder 1070 may output a chroma residual image.

A chroma reconstructed image Ĉ may be generated by summing the chroma residual image and the chroma predicted image $c_p$.

The luma reconstructed image ŷ and the chroma reconstructed image Ĉ are input to an image transformer 1075. The image transformer 1075 may be output to an RGB output image x̂.

It has been described that the RGB input image is transformed into a luma image and a chroma image such as a YUV image and then input to the luma encoder 1040, the cross-channel encoder 1050, and the chroma residual encoder 1065. In addition, it has been described that the luma reconstructed image output from the luma decoder 1045 and the chroma reconstructed image output by the chroma residual decoder 1070 and the cross-channel predictor 1060 are transformed into an RGB output image and then output.

However, the disclosure is not limited thereto, such that without transformation in the image transformers 1035 and 1075, the luma image and the chroma image may be input and output.

Moreover, a description has been made on the assumption that the input image and the output image mean the entire images, but the input image and the output image may mean residual images. That is, the RGB input image may be an RGB residual image, and the RGB output image may be a reconstructed RGB residual image. The luma image y may be a luma residual image, the chroma image c may be a chroma residual image. The chroma predicted image may be a predicted image of the chroma residual image, and the chroma residual image may be a residual image of the chroma residual image.

FIG. 10O is a diagram for describing a pair of an image encoding apparatus and an image decoding apparatus including the pair of the image encoding apparatus and the image decoding apparatus for cross-channel prediction described with reference to FIG. 10B.

Referring to FIG. 10O, when the current image is the I-frame, the current image may be encoded and decoded to generate a current reconstructed image, without referring to a previous reconstructed image. An I-encoder 1082 and an !-decoder 1084, included in a first box 1080, may be replaced with the pair of the image encoding apparatus and the image decoding apparatus described with reference to FIG. 10B. An input image to the replaced pair of the image encoding apparatus and the image decoding apparatus may be a YUV input image (or an RGB input image), and an output image therefrom may be a YUV output image (or an RGB output image).

When the current image is not the I-frame, the current image may be encoded and decoded with reference to the previous reconstructed image to generate a current reconstructed image.

A second encoder 1087 and a second decoder 1089, included in a second box 1085, may be replaced with the pair of the image encoding apparatus and the image decoding apparatus described with reference to FIG. 10B. In this case, an input image to the replaced pair of the image encoding apparatus and the image decoding apparatus may be a residual image $r_i$ of the YUV input image and an output image therefrom may be a residual image $r'_i$ of the YUV output image. The components other than the second decoder 1089 and the second encoder 1087 have been described with reference to FIG. 1.

Similarly with the pair of the image encoding apparatus and the image decoding apparatus described with reference to FIG. 10B, a pair of an image encoding apparatus and an image decoding apparatus to be described with reference to FIGS. 11B, 12B, 13 to 18 may also be included in the first box 1080 or the second box 1085.

Figure 11A:
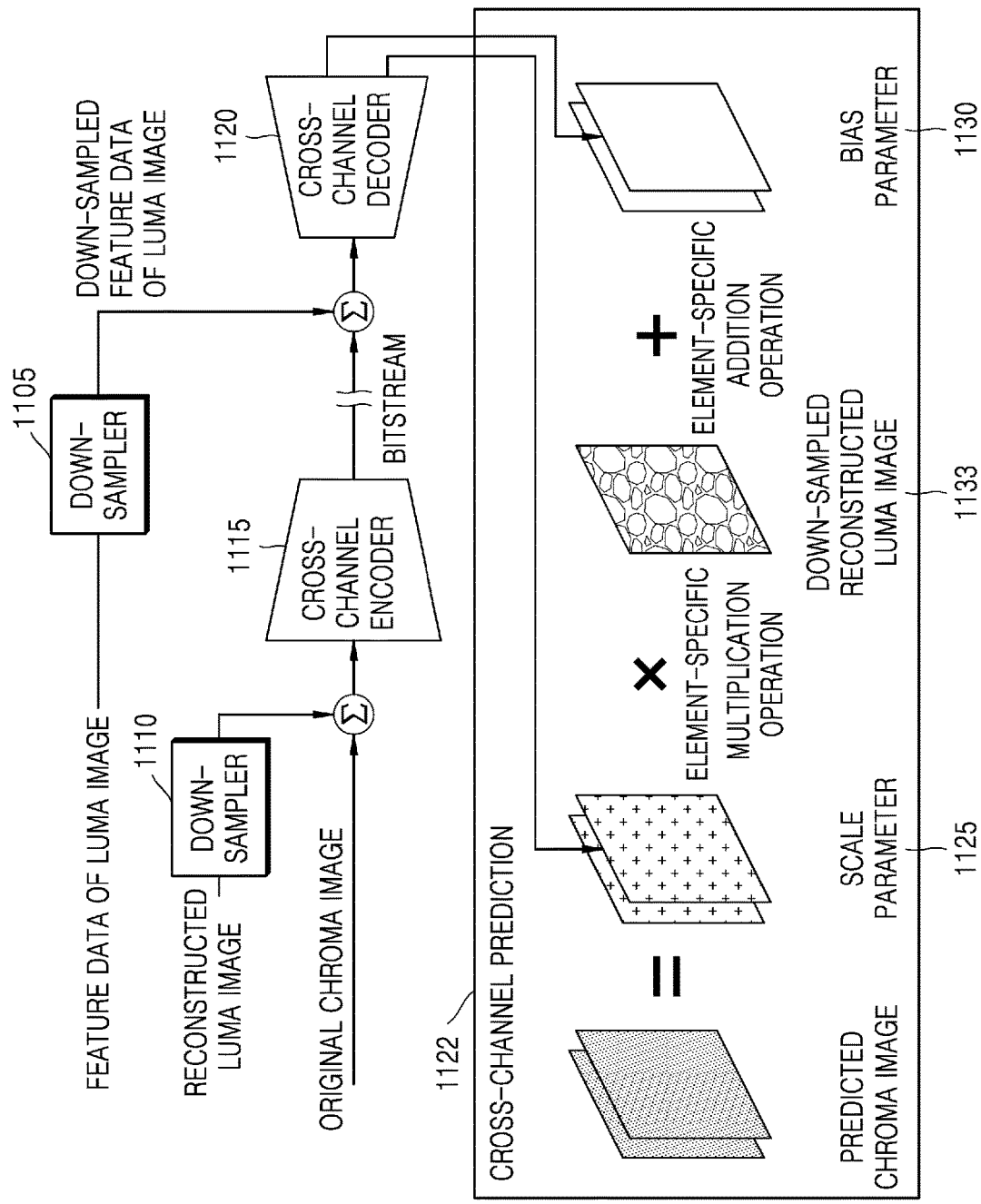
FIG. 11A is a diagram for describing cross-channel prediction according to an embodiment of the disclosure.

FIG. 11A is a diagram for describing cross-channel prediction according to an embodiment of the disclosure.

Referring to FIG. 11A, unlike in FIG. 10A, down-samplers 1105 and 1110 may be included. Feature data of a luma image may be transformed into down-sampled feature data of the luma image through the down-sampler 1105. A reconstructed luma image may be transformed into a down-sampled reconstructed luma image through the down-sampler 1110.

Unlike in FIG. 10A, the down-sampled reconstructed luma image instead of the reconstructed luma image may be concatenated with the original chroma image and then input to a cross-channel encoder 1115. The down-sampled feature data of the luma image in place of the feature data of the luma image may be concatenated with feature data for cross-channel prediction and then input to a cross-channel decoder 1120.

The cross-channel decoder 1120 may output a scale parameter 1125 and a bias parameter 1130.

Cross-channel prediction 1122 may include an element-specific multiplication operation of the scale parameter 1125 and the down-sampled reconstructed luma image 1133 and an element-specific addition operation by the bias parameter 1130.

Unlike in FIG. 10A, by performing down-sampling, a resolution of a luma component and a resolution of a chroma component may be matched with each other. When the color expression scheme is YUV 4:4:4, a resolution of a Y component and a resolution of a UN component are the same as each other, such that separate down-sampling may not be performed as in FIG. 10A. However, when the color expression scheme is not YUV 4:4:4 (e.g., 4:2:0), down-sampling may be performed as in FIG. 11A because the resolution of the Y component and the resolution of the UN component are different from each other.

Figure 11B:
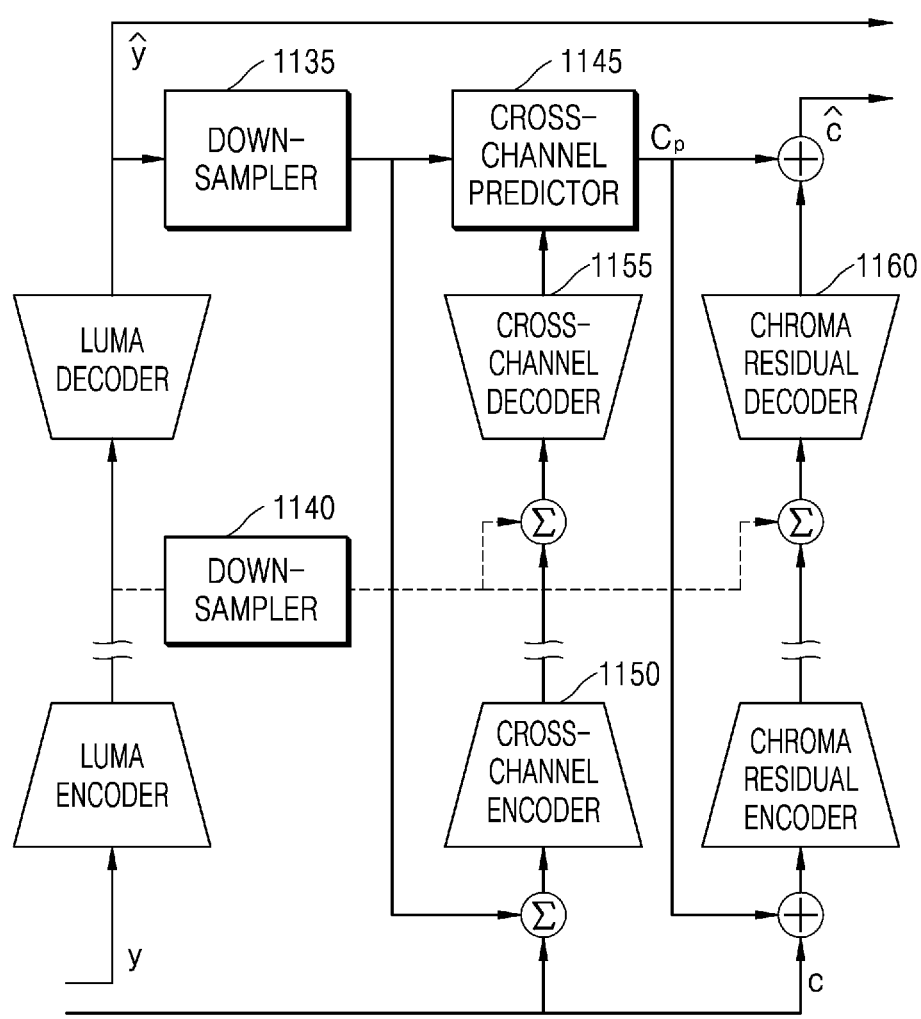
FIG. 11B is a diagram for describing a pair of an image encoding apparatus and an image decoding apparatus for cross-channel prediction, according to an embodiment of the disclosure.

FIG. 11B is a diagram for describing a pair of an image encoding apparatus and an image decoding apparatus for cross-channel prediction, according to an embodiment of the disclosure.

Referring to FIG. 11B, unlike in FIG. 10B, down-samplers 1135 and 1140 may be included. The down-sampler 1135 may down-sample a luma reconstructed image 9, and the down-sampler 1140 may down-sample feature data of a luma image. The down-sampled luma reconstructed image may be input to a cross-channel predictor 1145. The down-sampled feature data of the luma image may be concatenated with the chroma image c and then input to a cross-channel encoder 1150.

Depending on implementation, the down-sampled feature data of the luma image may be concatenated with the feature data for cross-channel prediction and then input to a cross-channel decoder 1155. Depending on implementation, the down-sampled feature data of the luma image may be concatenated with the feature data of the chroma image and then input to a chroma residual decoder 1160.

As a result, unlike in FIG. 10B, the pair of the image encoding apparatus and the image decoding apparatus of FIG. 11B may include the down-samplers 1135 and 1140 to perform down-sampling on the luma image, matching the resolution of the luma image with the resolution of the chroma image and thus generating an accurate predicted image of the chroma image.

Figure 12A:
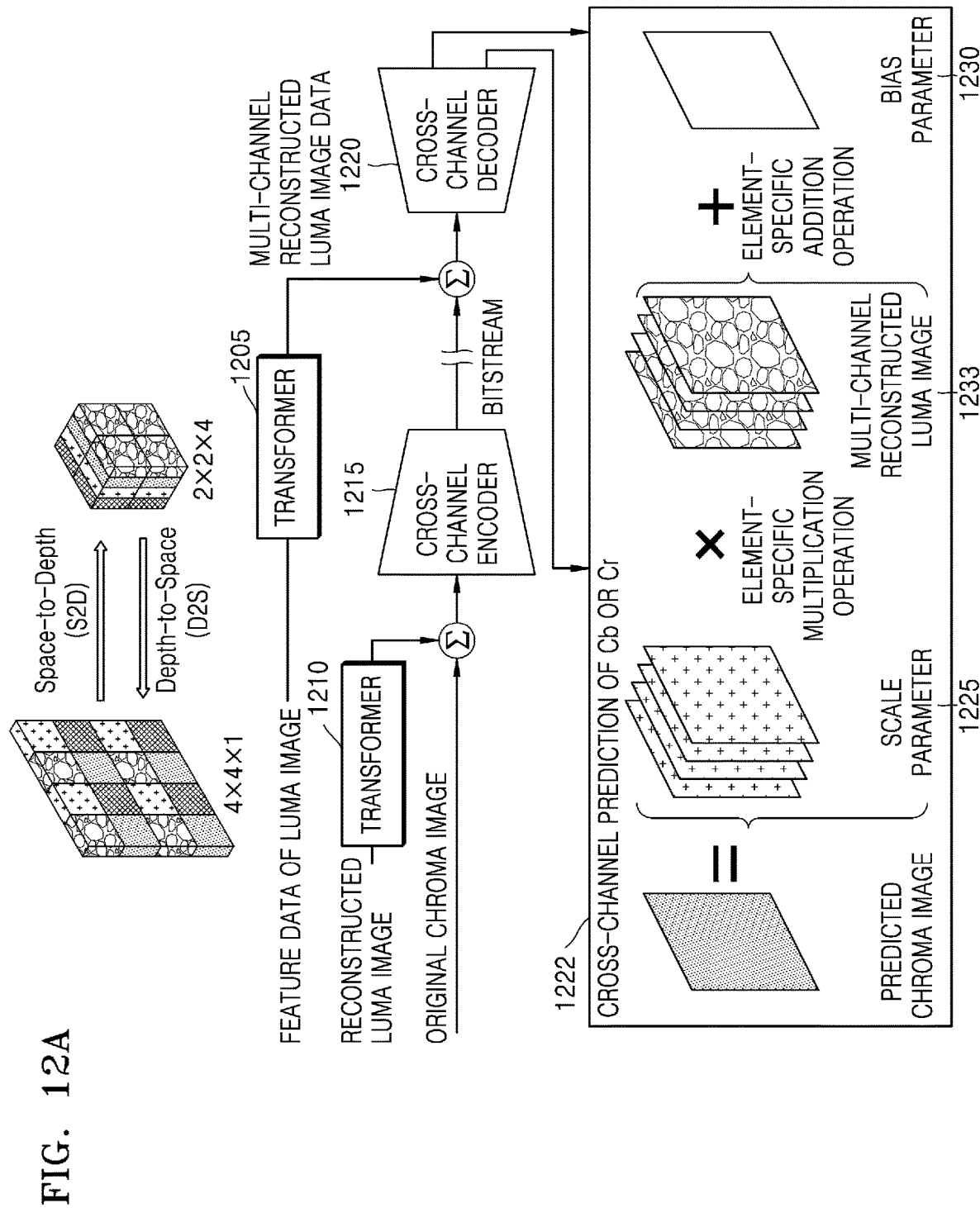
FIG. 12A is a diagram for describing cross-channel prediction according to an embodiment of the disclosure.

FIG. 12A is a diagram for describing cross-channel prediction according to an embodiment of the disclosure.

Referring to FIG. 12A, unlike in FIG. 10A, transformers 1205 and 1210 may be included. Feature data of a luma image may be transformed into multi-channel reconstructed luma image data (or multi-channel luma image data) through the transformer 1205. The reconstructed luma image may be transformed into a multi-channel reconstructed luma image through the transformer 1210. Transformation of the transformers 1205 and 1210 may be space-to-depth transformation that means a process of transforming (or re-arranging) spatial data having the number of channels, 1 into depth data having a number of plural channels, in which a total size of data is not changed. For example, when space-to-depth transformation is performed on data of 4×4×1, data of 2×2×4 may be output and the size of the input data may be equal to the size of the output data.

Unlike in FIG. 10A, a multi-channel reconstructed luma image, instead of the reconstructed luma image, may be concatenated with the original chroma image and then input to a cross-channel encoder 1215. In addition, multi-channel feature data of the luma image in place of the feature data of the luma image may be concatenated with feature data for cross-channel prediction and then input to a cross-channel decoder 1220.

The cross-channel decoder 1220 may output a scale parameter 1225 and a bias parameter 1230.

Cross-channel prediction 1222 may include an element-specific multiplication operation of the scale parameter 1225 and a multi-channel reconstructed luma image 1233 and an element-specific addition operation by the bias parameter 1230. A resultant value for multi-channels may be calculated through the element-specific multiplication operation of the scale parameter 1225 and the multi-channel reconstructed luma image 1233, and the resultant value for the multi-channels may be summed for each element to calculate a resultant value for one channel. The element-specific addition operation of the resultant value for one channel and the bias parameter 1230 may be performed. The cross-channel prediction 1222 shown in FIG. 12A is prediction on one chroma component, and the cross-channel prediction 1222 may be performed for prediction on another chroma component.

Unlike in FIG. 10A, by performing space-to-depth transformation, the resolution of the luma component may be matched with the resolution of the chroma component. When the color expression scheme is YUV 4:4:4, a resolution of a Y component and a resolution of a UN component are the same as each other, such that separate space-to-depth transformation may not be performed as in FIG. 10A. However, when the color expression scheme is not YUV 4:4:4 (e.g., 4:2:0, 4:2:2, 4:1:1), space-to-depth transformation may be performed as in FIG. 12A because the resolution of the Y component and the resolution of the UN component are different from each other. For example, when the color expression scheme is YUV 4:2:0, space-to-depth transformation of the level 2 may be performed.

Figure 12B:
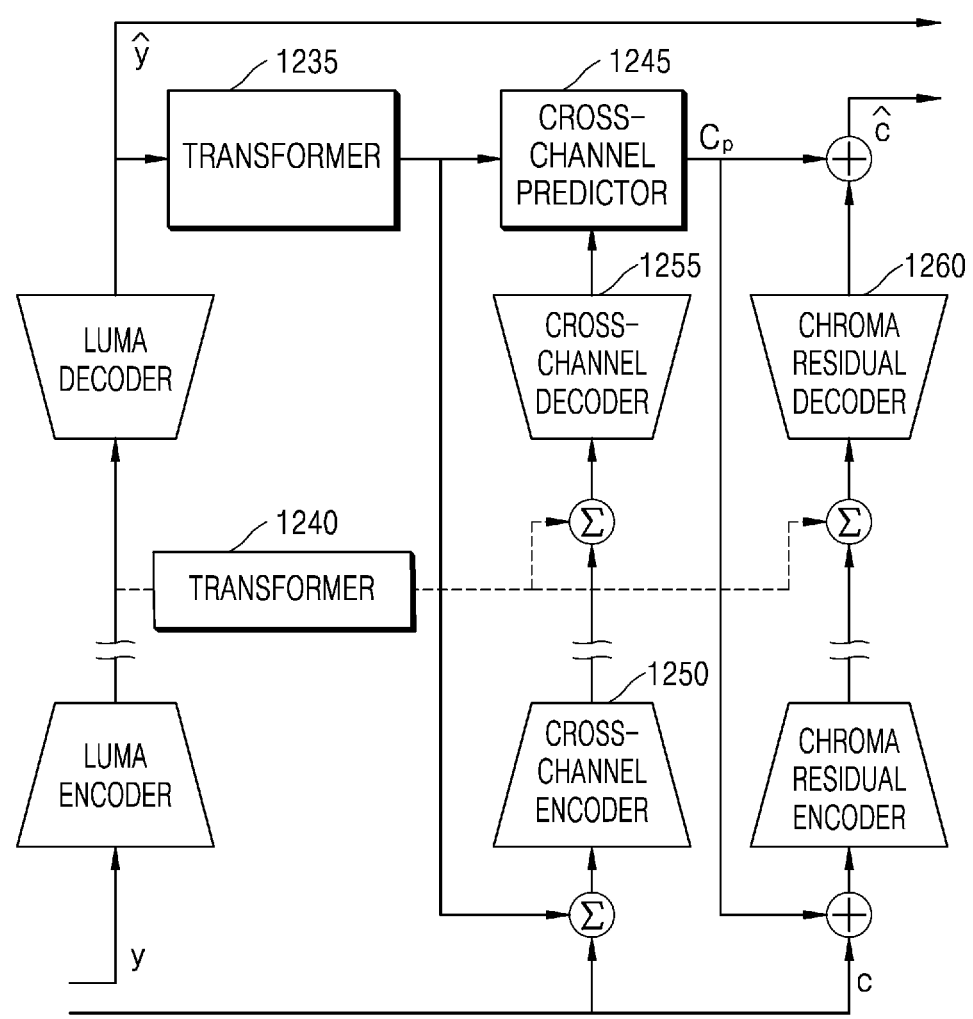
FIG. 12B is a diagram for describing a pair of an image encoding apparatus and an image decoding apparatus for cross-channel prediction, according to an embodiment of the disclosure.

FIG. 12B is a diagram for describing a pair of an image encoding apparatus and an image decoding apparatus for cross-channel prediction, according to an embodiment of the disclosure.

Referring to FIG. 12B, unlike in FIG. 10B, transformers 1235 and 1240 may be included. The transformer 1235 may transform a luma reconstructed image ŷ, and the transformer 1240 may transform feature data of a luma image. The transformed luma reconstructed image may be input to a cross-channel predictor 1245. The transformed feature data of the luma image may be concatenated with the chroma image c and then input to a cross-channel encoder 1250.

Depending on implementation, the transformed feature data of the luma image may be concatenated with the feature data for cross-channel prediction and then input to a cross-channel decoder 1255. Depending on implementation, the transformed feature data of the luma image may be concatenated with the feature data of the chroma image and then input to a chroma residual decoder 1260.

As a result, unlike in FIG. 10B, the pair of the image encoding apparatus and the image decoding apparatus of FIG. 12B may include the transformers 1235 and 1240 to perform transformation on the luma image, matching the resolution of the luma image with the resolution of the chroma image and thus generating an accurate predicted image of the chroma image.

The down-samplers 1135 and 1140 and the transformers 1235 and 1240 described with reference to FIGS. 11B and 12B may be included in a pair of an image encoding apparatus and an image decoding apparatus described below with reference to FIGS. 13 to 18.

Figure 13:
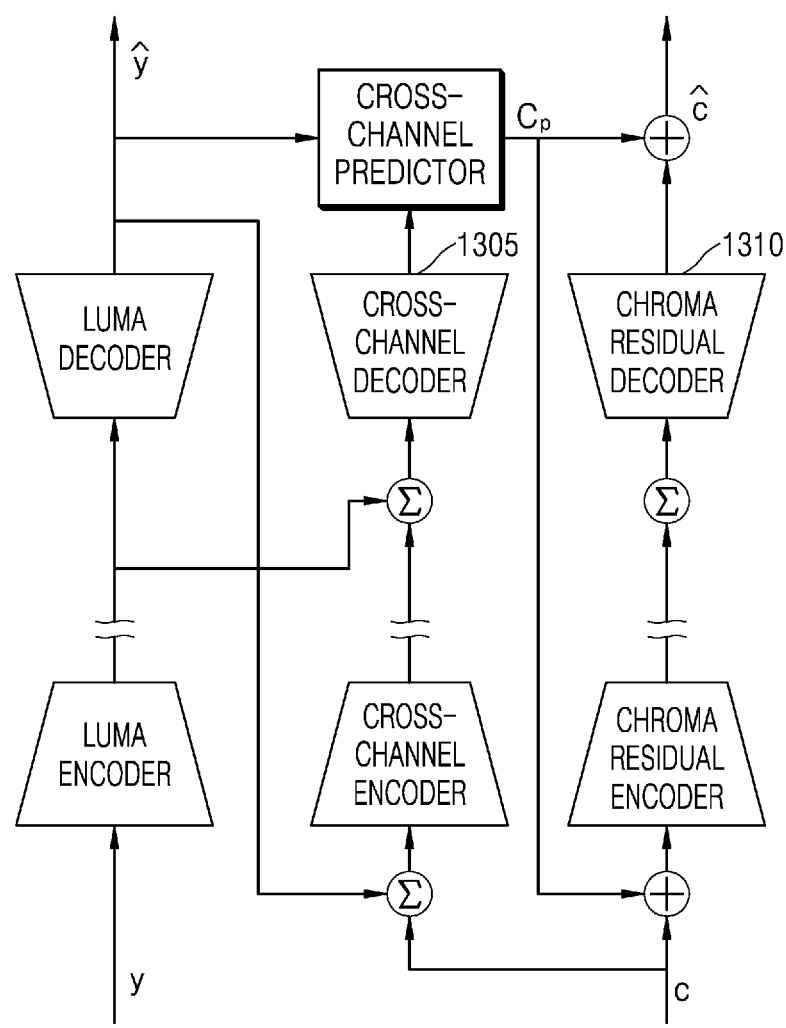
FIG. 13 is a diagram for describing a pair of an image encoding apparatus and an image decoding apparatus according to an embodiment of the disclosure.

FIG. 13 is a diagram for describing a pair of an image encoding apparatus and an image decoding apparatus according to an embodiment of the disclosure.

Referring to FIG. 13, feature data of a luma image may be concatenated with feature data for cross-channel prediction and then input to a cross-channel decoder 1305. The feature data of the luma image may be concatenated with feature data of a chroma image and may not be input to a chroma residual decoder 1310. That is, the feature data of the chroma image may be input to the chroma residual decoder 1310.

Figure 14:
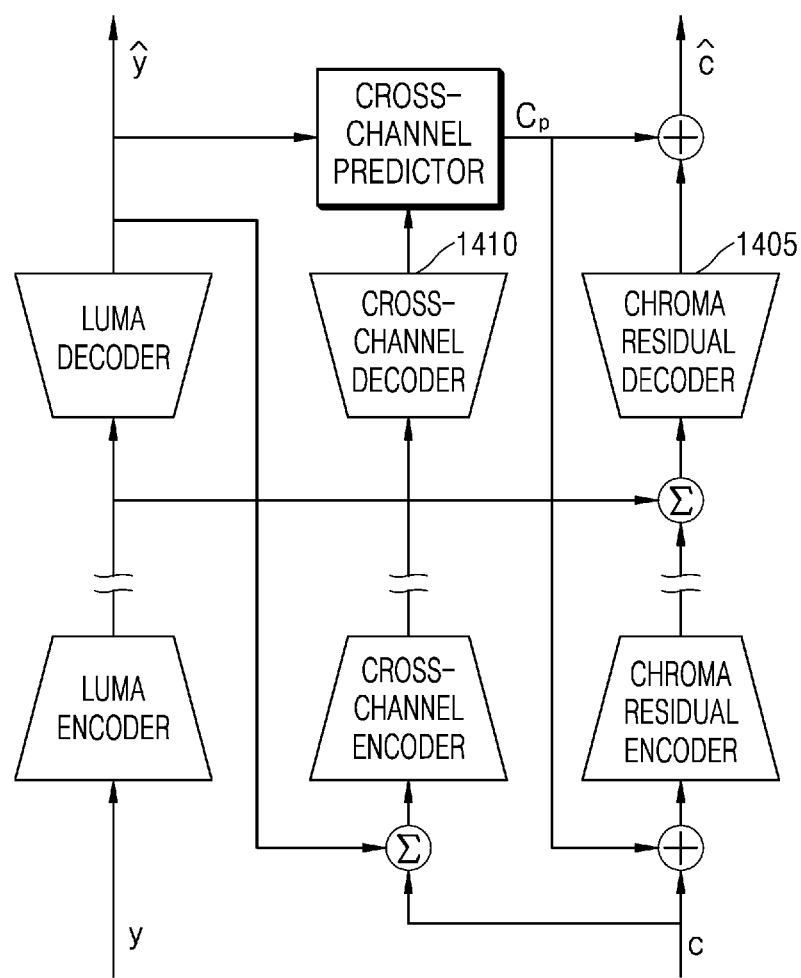
FIG. 14 is a diagram for describing a pair of an image encoding apparatus and an image decoding apparatus according to an embodiment of the disclosure.

FIG. 14 is a diagram for describing a pair of an image encoding apparatus and an image decoding apparatus according to an embodiment of the disclosure.

Referring to FIG. 14, feature data of a luma image may be concatenated with feature data of a chroma image and then input to a chroma residual decoder 1405.

The feature data of the luma image may not be concatenated with the feature data for cross-channel prediction. Data for the feature data for the cross-channel prediction may be input to a cross-channel decoder 1410.

Figure 15:
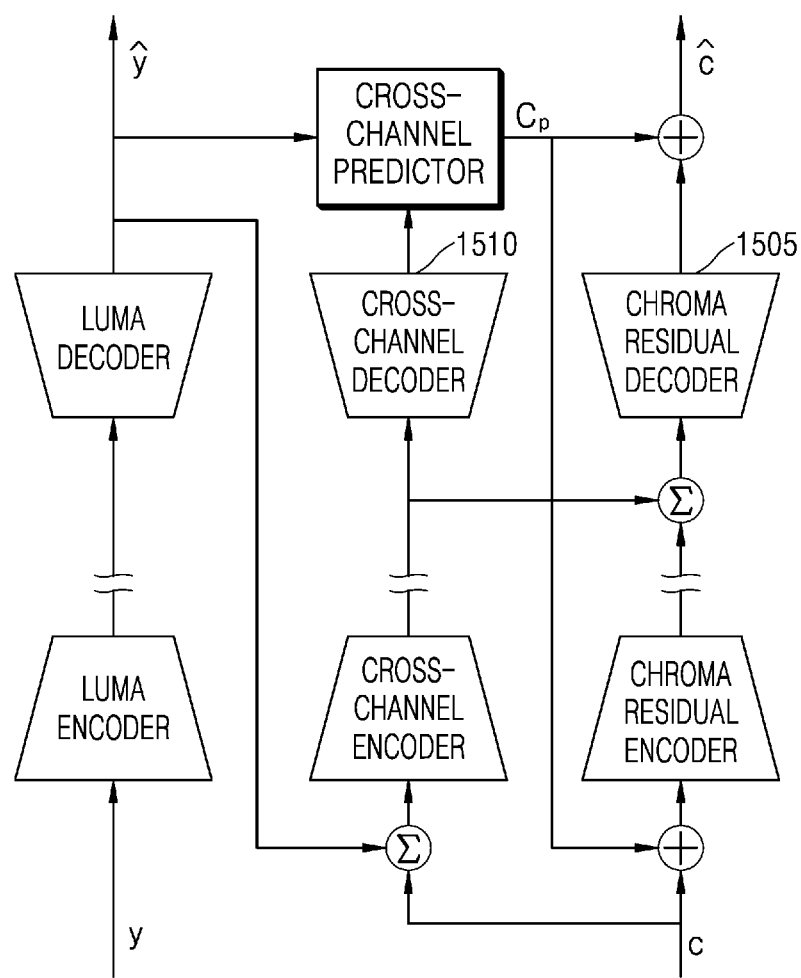
FIG. 15 is a diagram for describing a pair of an image encoding apparatus and an image decoding apparatus according to an embodiment of the disclosure.

FIG. 15 is a diagram for describing a pair of an image encoding apparatus and an image decoding apparatus according to an embodiment of the disclosure.

Referring to FIG. 15, feature data of a luma image may not be concatenated with feature data of a chroma image and may not be input to a chroma residual decoder 1505.

Feature data for cross-channel prediction may be concatenated with the feature data of the chroma image and then input to a chroma residual decoder 1505.

The feature data of the luma image may not be concatenated with the feature data for cross-channel prediction and may not be input to a cross-channel decoder 1510. The feature data for cross-channel prediction may be input to a cross-channel decoder 1510.

Figure 16:
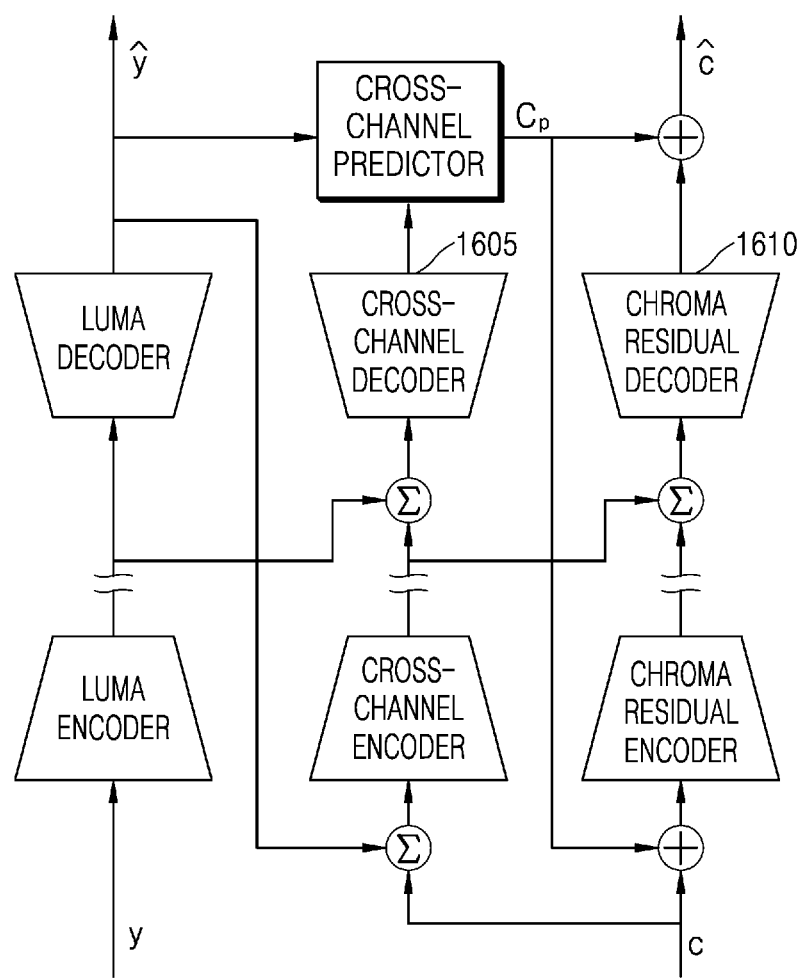
FIG. 16 is a diagram for describing a pair of an image encoding apparatus and an image decoding apparatus according to an embodiment of the disclosure.

FIG. 16 is a diagram for describing a pair of an image encoding apparatus and an image decoding apparatus, according to an embodiment of the disclosure.

Referring to FIG. 16, feature data of a luma image may be concatenated with feature data for cross-channel prediction and then input to a cross-channel decoder 1605.

The feature data of the luma image may not be concatenated with feature data of a chroma image and may not be input to a chroma residual decoder 1610.

The feature data of the chroma image may be concatenated with the feature data for cross-channel prediction and then input to a chroma residual decoder 1610.

Figure 17:
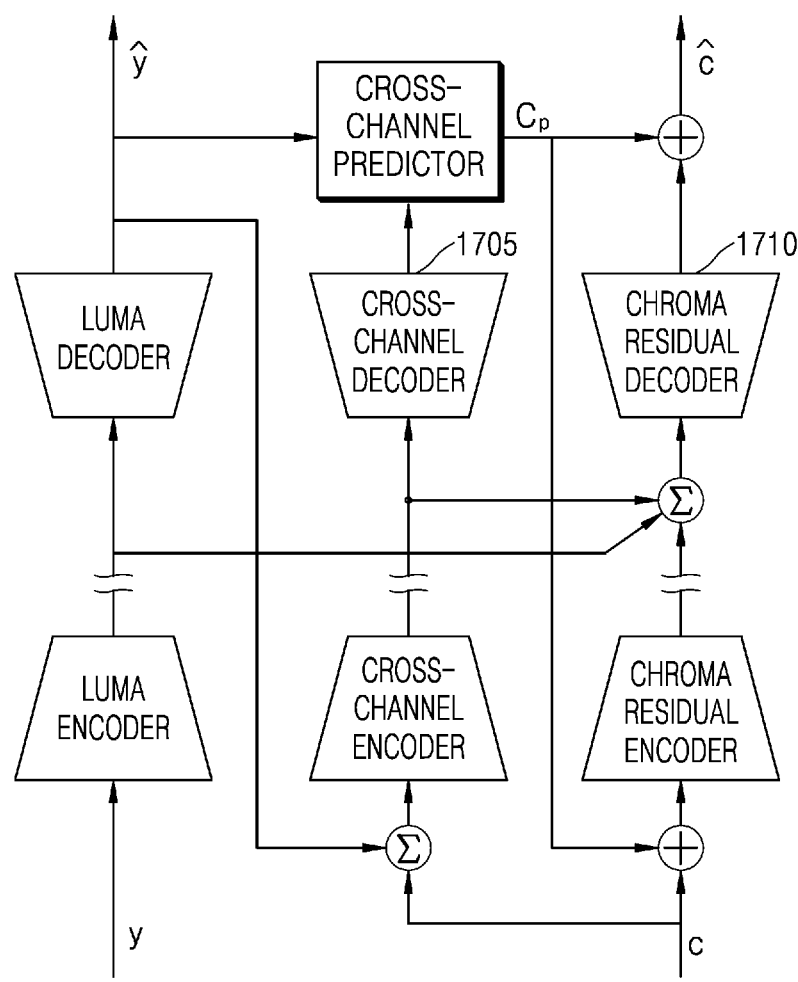
FIG. 17 is a diagram for describing a pair of an image encoding apparatus and an image decoding apparatus according to an embodiment of the disclosure.

FIG. 17 is a diagram for describing a pair of an image encoding apparatus and an image decoding apparatus according to an embodiment of the disclosure.

Referring to FIG. 17, feature data of a luma image may not be concatenated with feature data for cross-channel prediction and may not be input to a cross-channel decoder 1705. The feature data for cross-channel prediction may be input to a cross-channel decoder 1705.

The feature data for cross-channel prediction may be concatenated with feature data of a chroma image and then input to a chroma residual decoder 1710.

Figure 18:
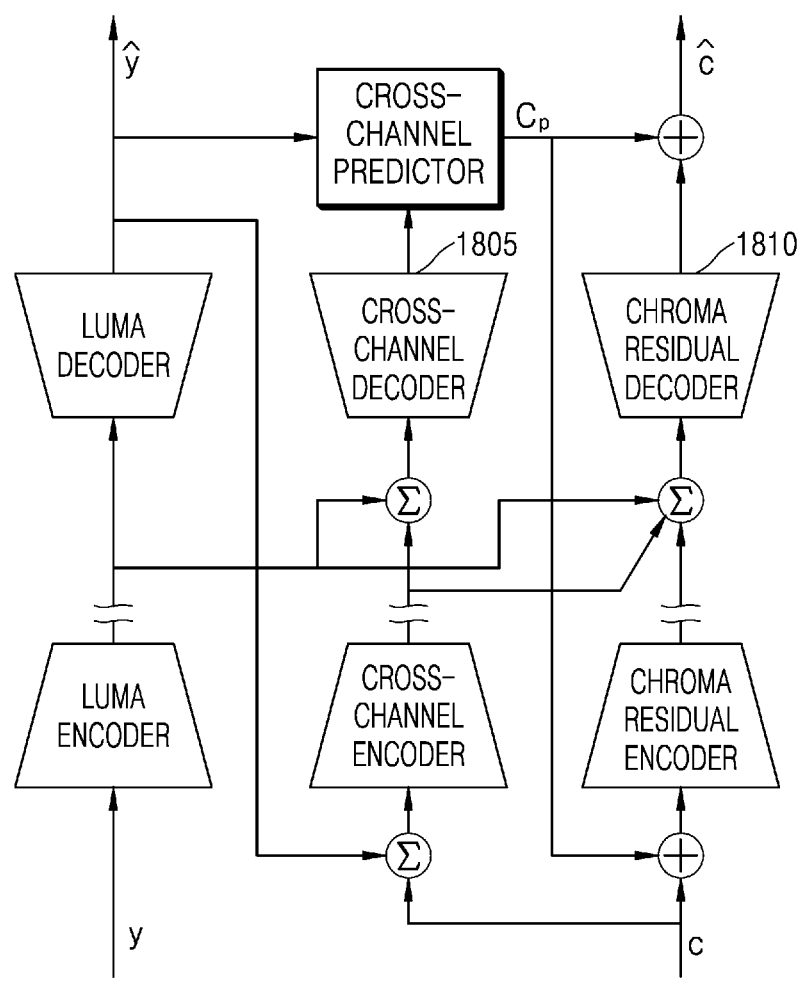
FIG. 18 is a diagram for describing a pair of an image encoding apparatus and an image decoding apparatus according to an embodiment of the disclosure.

FIG. 18 is a diagram for describing a pair of an image encoding apparatus and an image decoding apparatus according to an embodiment of the disclosure.

Referring to FIG. 18, feature data of a luma image may be concatenated with feature data for cross-channel prediction and then input to a cross-channel decoder 1805.

All of the feature data of the luma image, the feature data for cross-channel prediction, and the feature data of the chroma image may be concatenated with one another and then input to a chroma residual decoder 1810.

As described above with reference to FIGS. 13 to 18, various combinations of feature data may be input to a cross-channel decoder or a chroma residual decoder, thereby improving the accuracy of a predicted image of a chroma image based on cross-channel prediction, and encoding/decoding efficiency may be improved by reducing a size of feature data of a residual image of the chroma image.

Figure 19:
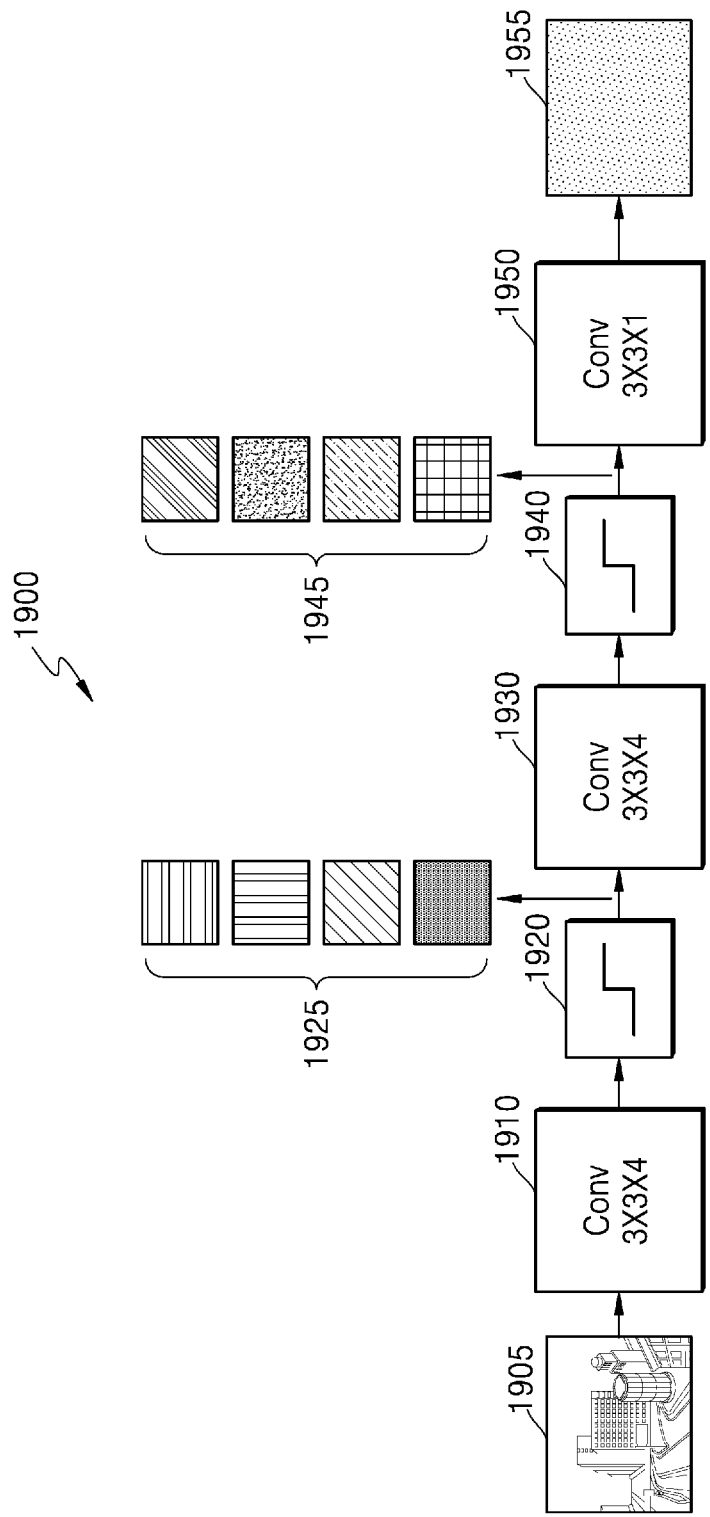
FIG. 19 is a diagram showing an example of an architecture of a neural network, according to an embodiment of the disclosure.

FIG. 19 is a diagram showing an example of an architecture of a neural network 1900, according to an embodiment of the disclosure.

As shown in FIG. 19, input data 1905 is input to a first convolutional layer 1910. Herein, the input data 1905 varies depending on whether the neural network 1900 serves as the first decoder 231, the second decoder 232, the third decoder 234, the first decoder 271, the second decoder 272, the third decoder 274, the first encoder 611, the second encoder 612, or the third encoder 614.

For example, when the neural network 1900 serves as the first decoder 231, the input data 1905 may correspond to feature data of a luma image and, when the neural network 1900 serves as the second decoder 232, the input data 1905 may correspond to feature data for cross-channel prediction.

3×3×4 marked on the first convolutional layer 1910 shown in FIG. 19 represents that convolution is performed on one piece of input data 1905 by using four 3×3 filter kernels. Four feature maps are generated by the four filter kernels as the convolution result.

The feature maps generated by the first convolutional layer 1910 represent unique features of the input data 1905. For example, each feature map may represent vertical features, horizontal features, or edge features of the input data 1905.

A convolution operation performed by the first convolutional layer 1910 will now be described in detail with reference to FIG. 20.

One feature map 2050 may be generated by performing multiplication and addition operations between parameters of a 3×3 filter kernel 2030 used by the first convolutional layer 1910, and sample values in the input data 1905 corresponding thereto. Because the first convolutional layer 1910 uses four filter kernels 2030, four feature maps 1945 may be generated by performing the convolution operation using the four filter kernels 2030.

Figure 20:
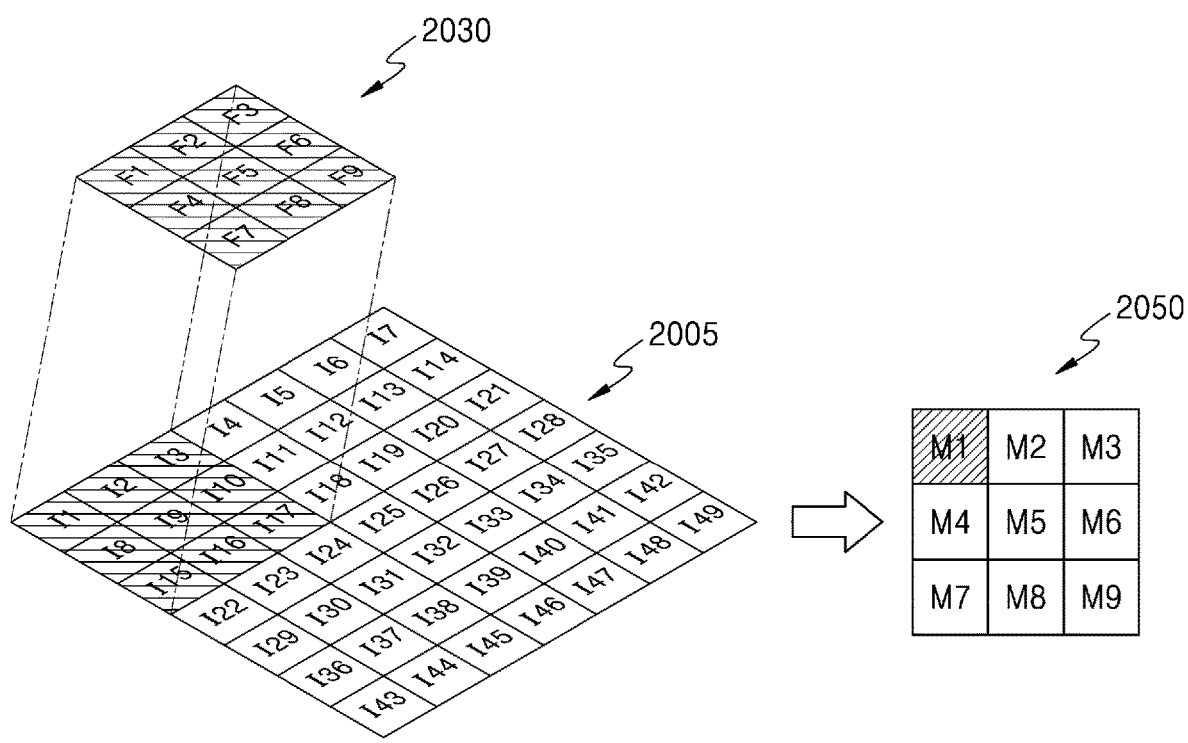
FIG. 20 is a diagram for describing a convolution operation in a first convolutional layer according to an embodiment of the disclosure.

I1 to I49 marked on input data 2005 in FIG. 20 indicate samples of the input data 1905, and F1 to F9 marked on the filter kernel 2030 indicate samples (also referred to as parameters) of the filter kernel 2030. M1 to M9 marked on the feature map 2050 indicate samples of the feature map 2050.

In the convolution operation, sample values I1, I2, I3, I8, I9, I10, I15, I16, and I17 of the input data 1905 may be multiplied by F1, F2, F3, F4, F5, F6, F7, F8, and F9 of the filter kernel 2030, respectively, and a value obtained by combining (e.g., adding) the resultant values of the multiplication operation may be assigned as the value of M1 of the feature map 2050. When a stride for a convolution operation is 2, sample values I3, I4, I5, I10, I11, I12, I17, I18, and I19 of the input data 1905 may be multiplied by F1, F2, F3, F4, F5, F6, F7, F8, and F9 of the filter kernel 2030, respectively, and a value obtained by combining the resultant values of the multiplication operation may be assigned as the value of M2 of the feature map 2050.

By performing the convolution operation between the sample values in the input data 1905 and the samples of the filter kernel 2030 while the filter kernel 2030 is moving based on the stride to the last sample of the input data 1905, the feature map 2050 having a certain size may be obtained.

According to the disclosure, values of parameters of the neural network 1900, e.g., samples of the filter kernel 2030 (e.g., F1, F2, F3, F4, F5, F6, F7, F8, and F9 of the filter kernel 2030) used by convolutional layers of the neural network 1900, may be optimized by training the neural network 1900.

Although the convolutional layers included in the neural network 1900 may perform the convolution operation described in relation to FIG. 20, the convolution operation described in relation to FIG. 20 is merely an example, and is not limited thereto.

Referring back to FIG. 19, the feature maps of the first convolutional layer 1910 are input to a first activation layer 1920.

The first activation layer 1920 may give non-linear features to each feature map. The first activation layer 1920 may include a sigmoid function, a hyperbolic tangent (tan h) function, a rectified linear unit (ReLU) function, etc., but is not limited thereto.

When the first activation layer 1920 gives non-linear features, it means that some sample values of the feature maps are changed and output. In this case, the change is performed by applying non-linear features.

The first activation layer 1920 determines whether to transmit the sample values of the feature maps to a second convolutional layer 1930. For example, some sample values of the feature maps are activated by the first activation layer 1920 and transmitted to the second convolutional layer 1930, and other sample values are inactivated by the first activation layer 1920 and not transmitted to the second convolutional layer 1930. The unique features of the input data 1905 represented by the feature maps are emphasized by the first activation layer 1920.

Feature maps 1925 output from the first activation layer 1920 are input to the second convolutional layer 1930. Any one of the feature maps 1925 illustrated in FIG. 19 is a result of processing the feature map 2050 of FIG. 20 by the first activation layer 1920.

3×3×4 marked on the second convolutional layer 1930 represents that convolution is performed on the input feature maps 1925 by using four 3×3 filter kernels. The output of the second convolutional layer 1930 is input to a second activation layer 1940. The second activation layer 1940 may give non-linear features to the input feature maps.

Feature maps 1945 output from the second activation layer 1940 are input to a third convolutional layer 1950. 3×3×1 marked on the third convolutional layer 1950 represents that convolution is performed to generate one piece of output data 1955 by using one 3×3 filter kernel.

The output data 1955 is input to the first convolutional layer 1910 of the neural network 1900. Herein, the output data 1955 varies depending on whether the neural network 1900 serves as the first decoder 231, the second decoder 232, the third decoder 234, the first decoder 271, the second decoder 272, the third decoder 274, the first encoder 611, the second encoder 612, or the third encoder 614.

For example, when the neural network 1900 serves as the first decoder 231, the output data 1955 may be a reconstructed image of a luma image and, when the neural network 1900 serves as the second decoder 232, the output data 1955 may be cross-channel prediction information.

Although the neural network 1900 includes three convolutional layers and two activation layers in FIG. 19, FIG. 19 is merely an example and, depending on implementation, the numbers of convolutional layers and activation layers included in the neural network 1900 may be variously changed.

Depending on implementation, the neural network 1900 may be implemented as a recurrent neural network (RNN). This means that the neural network 1900 according to an embodiment of the disclosure is changed from a convolutional neural network (CNN) architecture to an RNN architecture.

In an embodiment of the disclosure, the image decoding apparatuses 200 and 250 and the image encoding apparatuses 600 and 650 may include at least one arithmetic logic unit (ALU) for the above-described convolution and activation operations.

The ALU may be implemented as a processor. For the convolution operation, the ALU may include a multiplier for multiplying sample values of a filter kernel by the input data 1905 or sample values of a feature map output from a previous layer, and an adder for adding the resultant values of multiplication.

For the activation operation, the ALU may include a multiplier for multiplying input sample values by weights used for a predetermined sigmoid, tan h, or ReLU function, and a comparer for comparing the multiplication result to a certain value to determine whether to transmit input sample values to a next layer.

A method of training neural networks used in an image encoding and decoding process will now be described with reference to FIGS. 21 and 22.

Figure 21:
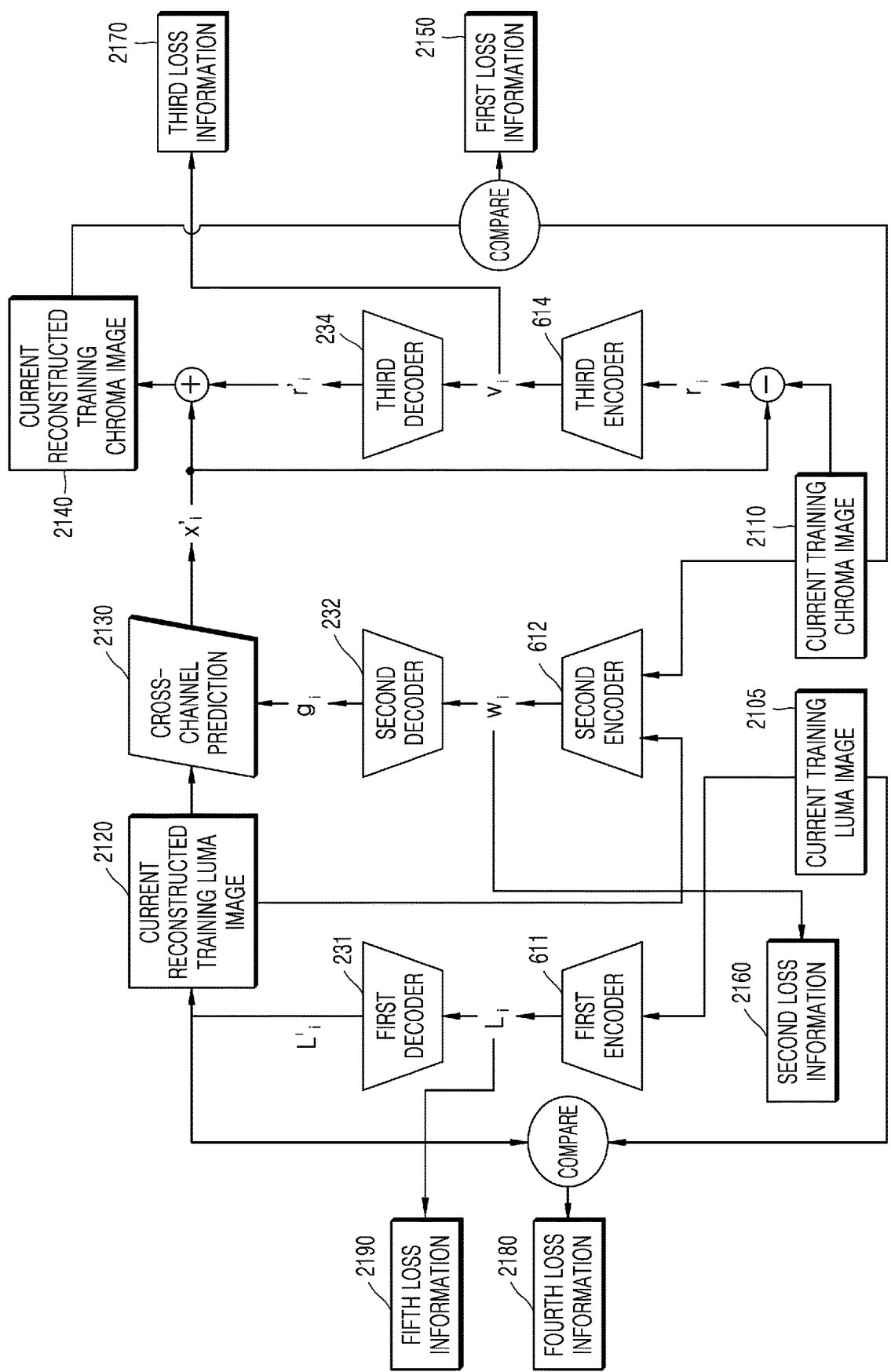
FIG. 21 is a diagram for describing a method of training a first decoder, a first encoder, a second decoder, a second encoder, a third decoder, and a third encoder.

FIG. 21 is a diagram for describing a method of training the first decoder 231, the first encoder 611, the second decoder 232, the second encoder 612, the third decoder 234, and the third encoder 614.

In FIG. 21, a current training luma image 2105, a current training chroma image 2110, a current reconstructed training luma image 2120, and a current reconstructed training chroma image 2140 correspond to a current luma image, a current chroma image, a current reconstructed luma image, and a current reconstructed chroma image.

In training neural networks used in the first decoder 231, the second decoder 232, the third decoder 234, the first encoder 611, the second encoder 612, and the third encoder 614, similarity between the current reconstructed training luma image 2120 and the current training luma image 2105, similarity between the current reconstructed training chroma image 2140 and the current training chroma image 2110, a bitrate of a bitstream to be generated by encoding the current training luma image 2105, a bitrate of a bitstream to be generated by encoding the current reconstructed training luma image 2120 and the current training chroma image 2110, and a bitrate of a bitstream to be generated by encoding the current training chroma image 2110 need to be considered.

To this end, in an embodiment of the disclosure, the neural networks used in the first decoder 231, the first encoder 611, the second decoder 232, the second encoder 612, the third decoder 234, and the third encoder 614 may be trained, based on first loss information 2150 corresponding to the similarity between the current training chroma image 2110 and the current reconstructed training chroma image 2140, fourth loss information 2180 corresponding to the similarity between the current training luma image 2105 and the current reconstructed training luma image 2120, and second loss information 2160, third loss information 2170, and fifth loss information 2190 respectively corresponding to the bitrates of the bitstreams.

Referring to FIG. 21, the current training luma image 2105 is input to the first encoder 611. The first encoder 611 processes the current training luma image 2105 to output feature data $L_i$ of a luma image.

The feature data $L_i$ of the luma image is input to the first decoder 231, and the first decoder 231 outputs the current reconstructed training luma image 2120.

The current reconstructed training luma image 2120 and the current training chroma image 2110 are input to the second encoder 612. The second encoder 612 may output feature data $W_i$ for cross-channel prediction by processing the current reconstructed training luma image 2120 and the current training chroma image 2110.

The feature data $w_i$ for cross-channel prediction is input to the second decoder 232, and the second decoder 232 may output cross-channel prediction information $g_i$.

Cross-channel prediction 2130 is performed using the current reconstructed training luma image 2120 and the cross-channel prediction information $g_i$, and a predicted training image $x'_i$ of the current chroma image may be generated.

Residual image data $r_i$ of the current training chroma image, which corresponds to a difference between the predicted training image $x'_i$ of the current chroma image and the current training chroma image 2110, is obtained.

The residual image data $r_i$ of the current training chroma image is input to the third encoder 614, and the third encoder 614 outputs feature data $V_i$ of residual image data of the current training chroma image by processing the residual image data $r_i$ of the current training chroma image.

The feature data $V_i$ of the residual image data of the current training chroma image is input to the third decoder 234.

The third decoder 234 outputs a residual training image $r'_i$ of the current chroma image by processing the feature data $V_i$ of the residual image data of the current training chroma image, and the current reconstructed training chroma image 2140 is obtained by summing the predicted training image $x'_i$ and the residual training image $r'_i$.

To train the neural networks used in the first encoder 611, the second encoder 612, the third encoder 614, the first decoder 231, the second decoder 232, and the third decoder 234, at least one of the first loss information 2150, the second loss information 2160, the third loss information 2170, the fourth loss information 2180, or the fifth loss information 2190 may be obtained.

The first loss information 2150 corresponds to a difference between the current training chroma image 2110 and the current reconstructed training chroma image 2140. The difference between the current training chroma image 2110 and the current reconstructed training chroma image 2140 may include at least one of an L1-norm value, an L2-norm value, a structural similarity (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value between the current training chroma image 2110 and the current reconstructed training chroma image 2140.

The first loss information 2150 is related to the quality of the current training chroma image 2110, such that the first loss information 2150 may also be referred to as quality loss information.

Similarly with the first loss information 2150, the fourth loss information 2180 corresponds to the difference between the current training luma image 2105 and the current reconstructed training luma image 2120.

The second loss information 2160 corresponds to entropy of feature data $W_i$ for cross-channel prediction or a bitrate of a bitstream corresponding to the feature data $W_i$ for cross-channel prediction.

The third loss information 2170 corresponds to entropy of feature data $V_i$ of the residual image data of the current training chroma image or a bitrate of a bitstream corresponding to the feature data $V_i$ of the residual image data of the current training chroma image.

The fifth loss information 2190 corresponds to entropy of feature data $L_i$ of the current training luma image or a bitrate of a bitstream corresponding to the feature data $L_i$ of the current training luma image.

When the bitstream includes both the feature data $W_i$ for cross-channel prediction and the feature data $V_i$ of the residual image data of the current training chroma image, sixth loss information corresponding to a bitrate of a corresponding bitstream may be calculated. In this case, the second loss information 2160 and the third loss information 2170 may not be used for training.

When the bitstream includes all of the feature data $W_i$ for cross-channel prediction, the feature data $V_i$ of the residual image data of the current training chroma image, and the feature data $L_i$ of the current training luma image, seventh loss information corresponding to a bitrate of a corresponding bitstream may be calculated. In this case, the second loss information 2160, the third loss information 2170, and the fifth loss information 2190 may not be used for training.

The second loss information 2160, the third loss information 2170, and the fifth loss information 2190 are related to the efficiency of encoding the current training luma image 2105 and the current training chroma image 2110, such that the second loss information 2160, the third loss information 2170, and the fifth loss information 2190 may be referred to as compression loss information.

The neural networks used in the first decoder 231, the second decoder 232, the third decoder 234, the first encoder 611, the second encoder 612, and the third encoder 614, the first decoder 231, the second decoder 232, and the third decoder 234 are trained to reduce or minimize final loss information calculated from at least one of the first loss information 2150, the second loss information 2160, the third loss information 2170, the fourth loss information 2180, or the fifth loss information 2190.

More specifically, the neural networks used in the first decoder 231, the second decoder 232, the third decoder 234, the first encoder 611, the second encoder 612, and the third encoder 614 are trained to reduce or minimize final loss information while changing a value of a preset parameter.

In an embodiment of the disclosure, the final loss information may be calculated based on Equation 1.

Final Loss Information=$a$×First Loss Information+$b$×Second Loss Information+$c$×Third Loss Information+$d$×Fourth Loss Information+$e$×Fifth Loss Information [Equation 1]

In Equation 1, a, b, c, d, and e denote weights applied to the first loss information 2150, the second loss information 2160, the third loss information 2170, the fourth loss information 2180, and the fifth loss information, respectively.

Based on Equation 1, it is shown that the neural networks used in the first decoder 231, the second decoder 232, the third decoder 234, the first encoder 611, the second encoder 612, and the third encoder 614 are trained in such a manner that the current reconstructed training luma image 2120 is as similar as possible to the current training luma image 2105, the current reconstructed training chroma image 2140 is as similar as possible to the current training chroma image 2110, and the size of a bitstream corresponding to data output from the first encoder 611, the second encoder 612, and the third encoder 614 is minimized.

Without being limited to training of the neural networks used in the first decoder 231, the second decoder 232, the third decoder 234, the first encoder 611, the second encoder 612, and the third encoder 614 together based on the final loss information of Equation 1, the neural networks used in the first decoder 231, the second decoder 232, the third decoder 234, the first encoder 611, the second encoder 612, and the third encoder 614 may be separately trained on the basis of a plurality of pieces of final loss information based on at least some of the first loss information 2150, the second loss information 2160, the third loss information 2170, the fourth loss information 2180, and the fifth loss information 2190.

Figure 22:
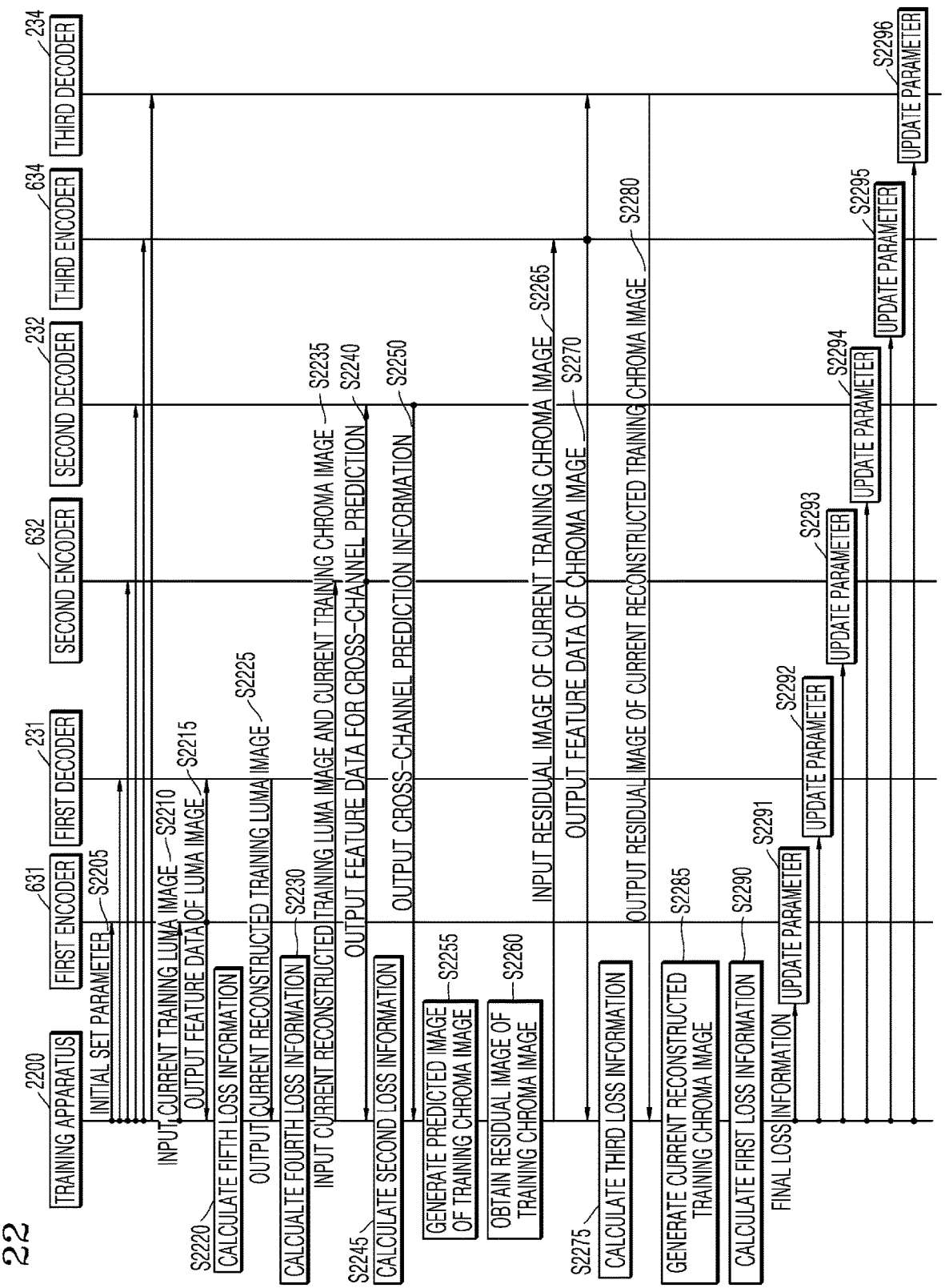
FIG. 22 is a diagram for describing a process, performed by a training apparatus, of training neural networks used in the first decoder, the second decoder, the third decoder, the first encoder, the second encoder, and the third encoder.

FIG. 22 is a diagram for describing a process, performed by a training apparatus 2200, of training a neural network used in the first decoder 231, the second decoder 232, the third decoder 234, the first encoder 611, the second encoder 612, and the third encoder 614.

The training procedure described above in relation to FIG. 21 may be performed by the training apparatus 2200. The training apparatus 2200 may be, for example, the image encoding apparatus 600 or 650 or a separate server. Parameters obtained as a result of training are stored in the image encoding apparatuses 600 and 650 and the image decoding apparatuses 200 and 250.

Referring to FIG. 22, the training apparatus 2200 initially sets parameters of the neural networks used in the first decoder 231, the second decoder 232, the third decoder 234, the first encoder 611, the second encoder 612, and the third encoder 614. Thus, the first decoder 231, the second decoder 232, the third decoder 234, the first encoder 611, the second encoder 612, and the third encoder 614 may operate based on the initially set parameters.

The training apparatus 2200 may input the current training luma image to the first encoder 631 in operation S2210.

The first encoder 631 may output the feature data $L_i$ of the luma image to the training apparatus 2200 and the first decoder 231 by processing input data, in operation S2215.

The training apparatus 2200 may calculate the fifth loss information 2190 from the feature data $L_i$ of the luma image, in operation S2220.

The first decoder 231 may output the current reconstructed training luma image 2120 to the training apparatus 2200 by processing the feature data $L_i$ of the luma image, in operation S2225.

The training apparatus 2200 may calculate the fourth loss information 2180 from the current reconstructed training luma image 2120, in operation S2230.

The training apparatus 2200 may input the current reconstructed training luma image 2120 and the current training chroma image 2110 to the second encoder 632, in operation S2235.

The second encoder 632 may output the feature data $W_i$ for cross-channel prediction to the training apparatus 2200 and the second decoder 232 by processing the current reconstructed training luma image 2120 and the current training chroma image 2110, in operation S2240.

The training apparatus 2200 may calculate the second loss information 2160 from the feature data $W_i$ for cross-channel prediction, in operation S2245.

The second decoder 232 may output the cross-channel prediction information $g_i$ to the training apparatus 2200 by processing the feature data $W_i$ for cross-channel prediction, in operation S2250.

The training apparatus 2200 may generate the predicted image $x'_i$ of the training chroma image by performing the cross-channel prediction 2130 using the cross-channel prediction information $g_i$ and the current reconstructed training luma image 2120, in operation S2255.

The training apparatus 2200 may generate the residual image $r_i$ of the current training chroma image by using the current training chroma image 2110 and the predicted image $x'_i$ of the training chroma image, in operation S2260.

The training apparatus 2200 may input the residual image $r_i$ of the current training chroma image to the third encoder 634, in operation S2265.

The third encoder 634 may output the feature data $V_i$ of the chroma image to the training apparatus 2200 and the third decoder 234 by processing the residual image $r_i$ of the current chroma image, in operation S2270.

The training apparatus 2200 may calculate the third loss information 2170 from the feature data $V_i$ of the chroma image, in operation S2275.

The third decoder 234 may output the residual image r'$_i$ of the current reconstructed training chroma image to the training apparatus 2200 by processing the feature data V$_i$ of the chroma image, in operation S2280.

The training apparatus 2200 may generate the current reconstructed training chroma image 2140 from the predicted image x'$_i$ of the current reconstructed training chroma image and the residual image r'$_i$ of the current reconstructed training chroma image, in operation S2285.

The training apparatus 2200 may calculate the first loss information from the current reconstructed training chroma image 2140 and the current training chroma image 2110, in operation S2290.

The training apparatus 2200 calculates final loss information by combining at least one of the first loss information 2150, the second loss information 2160, the third loss information 2170, the fourth loss information 2180, or the fifth loss information 2190, and the neural networks used in the first decoder 231, the second decoder 232, the third decoder 234, the first encoder 611, the second encoder 612, and the third encoder 614 update the initially set parameters through a back propagation process based on the final loss information, in operations S2291, S2292, S2293, S2294, S2295, and S2296.

Thereafter, the training apparatus 2200, the first decoder 231, the second decoder 232, the third decoder 234, the first encoder 611, the second encoder 612, and the third encoder 614 update parameters while repeating operations S2110 to S2296 until the final loss information is minimized. In this case, the first decoder 231, the second decoder 232, the third decoder 234, the first encoder 611, the second encoder 612, and the third encoder 614 may operate based on the parameters updated in a previous operation.

Meanwhile, the afore-described embodiments of the disclosure may be written as a computer-executable program, and the written program may be stored in a machine-readable storage medium.

A machine-readable storage medium may be provided in the form of a non-transitory storage medium. When the storage medium is 'non-transitory', it means that the storage medium is tangible and does not include signals (e.g., electromagnetic waves), and it does not limit that data is semi-permanently or temporarily stored in the storage medium. For example, the 'non-transitory storage medium' may include a buffer storing data temporarily.

According to an embodiment of the disclosure, the method according to various embodiments of the disclosure may be included and provided in a computer program product. The computer program product may be traded as a commercial product between sellers and purchasers. The computer program product may be distributed in the form of a machine-readable storage medium (e.g., a compact disc read only memory (CD-ROM)), or be electronically distributed (e.g., downloaded or uploaded) via an application store or directly between two user devices (e.g., smartphones). For electronic distribution, at least a part of the computer program product (e.g., a downloadable app) may be temporarily generated or be at least temporarily stored in a machine-readable storage medium, e.g., a memory of a server of a manufacturer, a server of an application store, or a relay server.

While the disclosure has been particularly shown and described with reference to embodiments of the disclosure, it will be understood by one of ordinary skill in the art that various changes in form and details may be made therein without departing from the scope of the disclosure as defined by the following claims.

What is claimed is:

1. A method of decoding an image based on cross-channel prediction using artificial intelligence (AI), the method comprising:
   obtaining feature data for cross-channel prediction from a bitstream;
   obtaining feature data of a luma image in a current image and feature data of a chroma image in the current image, from the bitstream;
   reconstructing the luma image by applying the feature data of the luma image to a neural-network-based luma decoder;
   obtaining cross-channel prediction information by applying the feature data for cross-channel prediction to a neural-network-based cross-channel decoder;
   obtaining a predicted image of the chroma image by performing cross-channel prediction based on the reconstructed luma image and the cross-channel prediction information;
   obtaining a residual image of the chroma image by applying the feature data of the chroma image to a neural-network-based chroma residual decoder; and
   reconstructing the chroma image based on the predicted image and the residual image,
   wherein the cross-channel prediction information includes a scale parameter value and a bias parameter value,
   wherein the scale parameter value is a value on which a multiplication operation is performed for each element with a sample value of the reconstructed luma image,
   wherein the bias parameter value is a value obtained by performing an addition operation for each element on a result obtained by performing a multiplication operation for each element on the scale parameter value and the sample value of the reconstructed luma image,
   wherein the feature data of the luma image is generated from a neural-network-based luma encoder,
   wherein the feature data of the chroma image is generated from a neural-network-based chroma encoder,
   wherein the feature data for cross-channel prediction is generated from a neural-network-based cross-channel encoder, and
   wherein the neural-network-based luma encoder, the neural-network-based chroma encoder, and the neural-network-based cross-channel encoder are different neural networks from each other.

2. The method of claim 1, wherein at least one of the feature data for cross-channel prediction, the feature data of the luma image, or the feature data of the chroma image is obtained through entropy-decoding and inverse-quantization on the bitstream.

3. The method of claim 1, wherein the neural-network-based cross-channel decoder is trained based on:
   first loss information corresponding to a difference between a current training chroma image and a current reconstructed training chroma image corresponding to the current training chroma image; and
   second loss information corresponding to entropy of the feature data for cross-channel prediction of the current training chroma image.

4. The method of claim 1, further comprising performing down-sampling on the reconstructed luma image when a chroma sub-sampling format of the current image is not YUV (YCbCr) 4:4:4,
   wherein the obtaining of the predicted image of the chroma image comprises obtaining the predicted image of the chroma image by performing cross-channel prediction based on the down-sampled luma image and the cross-channel prediction information.

5. The method of claim 1, further comprising generating multi-channel luma image data by performing space-to-depth transformation on the reconstructed luma image when a chroma sub-sampling format of the current image is not YCbCr 4:4:4,
wherein the obtaining of the predicted image of the chroma image comprises obtaining the predicted image of the chroma image by performing cross-channel prediction based on the multi-channel luma image data and the cross-channel prediction information.

6. The method of claim 1, wherein the luma image comprises an image of a Y component, and the chroma image comprises an image of at least one of a Cb component or a Cr component.

7. The method of claim 1, wherein the obtaining of the cross-channel prediction information by applying the feature data for cross-channel prediction to the neural-network-based cross-channel decoder comprises obtaining the cross-channel prediction information by applying the feature data for cross-channel prediction and the feature data of the luma image to the neural-network-based cross-channel decoder.

8. The method of claim 1, wherein the obtaining of the residual image of the chroma image by applying the feature data of the chroma image to the neural-network-based chroma residual decoder comprises obtaining the residual image of the chroma image by further applying at least one of the feature data of the luma image or the feature data for cross-channel prediction to the neural-network-based chroma residual decoder.

9. A non-transitory computer-readable recording medium having recorded thereon a program for executing the method of claim 1 on a computer.

10. An apparatus for decoding an image based on cross-channel prediction using artificial intelligence (AI), the apparatus comprising:
an obtainer configured to:
obtain feature data for cross-channel prediction from a bitstream, and
obtain feature data of a luma image in a current image and feature data of a chroma image in the current image, from the bitstream; and
an image decoder configured to:
reconstruct the luma image by applying the feature data of the luma image to a neural-network-based luma decoder,
obtain cross-channel prediction information by applying the feature data for cross-channel prediction to a neural-network-based cross-channel decoder and obtain a predicted image of the chroma image by performing cross-channel prediction based on the reconstructed luma image and the cross-channel prediction information,
obtain a residual image of the chroma image by applying the feature data of the chroma image to a neural-network-based chroma residual decoder, and
reconstruct the chroma image based on the predicted image of the chroma image and the residual image of the chroma image,
wherein the cross-channel prediction information includes a scale parameter value and a bias parameter value,
wherein the scale parameter value is a value on which a multiplication operation is performed for each element with a sample value of the reconstructed luma image,
wherein the bias parameter value is a value obtained by performing an addition operation for each element on a result obtained by performing a multiplication operation for each element on the scale parameter value and the sample value of the reconstructed luma image,
wherein the feature data of the luma image is generated from a neural-network-based luma encoder,
wherein the feature data of the chroma image is generated from a neural-network-based chroma encoder,
wherein the feature data for cross-channel prediction is generated from a neural-network-based cross-channel encoder, and
wherein the neural-network-based luma encoder, the neural-network-based chroma encoder, and the neural-network-based cross-channel encoder are different neural networks from each other.

11. A method of encoding an image based on cross-channel prediction using artificial intelligence (AI), the method comprising:
obtaining feature data of a luma image in a current image by applying an original luma image in a current original image to a neural-network-based luma encoder and reconstructing the luma image by applying the feature data of the luma image to a neural-network-based luma decoder;
obtaining feature data for cross-channel prediction by applying the reconstructed luma image and an original chroma image in the current original image to a neural-network-based cross-channel encoder;
obtaining cross-channel prediction information by applying the obtained feature data for cross-channel prediction to a neural-network-based cross-channel decoder;
obtaining a predicted image of the chroma image by performing cross-channel prediction based on the reconstructed luma image and the cross-channel prediction information;
obtaining feature data of the chroma image by applying a residual image of the chroma image obtained based on the original chroma image and the predicted image of the chroma image to a neural-network-based chroma residual encoder; and
generating a bitstream comprising the feature data of the luma image, the feature data of the chroma image, and the feature data for cross-channel prediction,
wherein the cross-channel prediction information includes a scale parameter value and a bias parameter value,
wherein the scale parameter value is a value on which a multiplication operation is performed for each element with a sample value of the reconstructed luma image,
wherein the bias parameter value is a value obtained by performing an addition operation for each element on a result obtained by performing a multiplication operation for each element on the scale parameter value and the sample value of the reconstructed luma image, and
wherein the neural-network-based luma encoder, the neural-network-based chroma residual encoder, and the neural-network-based cross-channel encoder are different neural networks from each other.

12. The method of claim 11, wherein at least one of the feature data for cross-channel prediction, the feature data of the luma image, or the feature data of the chroma image is quantized and entropy-encoded.

13. The method of claim 11, wherein the neural-network-based cross-channel encoder is trained based on:
first loss information corresponding to a difference between a current training chroma image and a current reconstructed training chroma image corresponding to the current training chroma image; and second loss information corresponding to entropy of the feature data for cross-channel prediction of the current training chroma image.

14. The method of claim 11, further comprising performing down-sampling on the reconstructed luma image when a chroma sub-sampling format of the current image is not YCbCr 4:4:4, wherein the obtaining of the predicted image of the chroma image comprises obtaining the predicted image of the chroma image by performing cross-channel prediction based on the down-sampled luma image and the cross-channel prediction information.

* * * * *